United States Patent [19]

Itoyama et al.

[11] Patent Number: 5,918,582
[45] Date of Patent: Jul. 6, 1999

[54] INTEGRATED INTERNAL COMBUSTION ENGINE CONTROL SYSTEM WITH HIGH-PRECISION EMISSION CONTROLS

[76] Inventors: Hiroyuki Itoyama, 92-116, Uragocho 2-chome; Kaname Naganuma, Nissanuragoryo B-401, 3-68, Oppamahigashi-cho, both of Yokosuka-shi, Kanagawa 237, Japan

[21] Appl. No.: 08/678,590

[22] Filed: Jul. 12, 1996

[30] Foreign Application Priority Data

| Jul. 13, 1995 | [JP] | Japan | 7-177600 |
| Aug. 17, 1995 | [JP] | Japan | 7-209527 |
| Sep. 7, 1995 | [JP] | Japan | 7-230496 |
| Sep. 22, 1995 | [JP] | Japan | 7-244606 |
| Sep. 22, 1995 | [JP] | Japan | 7-245001 |

[51] Int. Cl.[6] ............ F02D 21/08; F02D 41/18; F02D 43/04
[52] U.S. Cl. .................... 123/571; 123/480; 73/118.2
[58] Field of Search ............................. 123/571

[56] References Cited

U.S. PATENT DOCUMENTS 4,790,286  12/1988  Nishida et al. ................. 123/571

FOREIGN PATENT DOCUMENTS

| 3145527A1 | 5/1983 | Germany . |
| 3545811A1 | 7/1986 | Germany . |
| 3828742A1 | 3/1989 | Germany . |
| 4222414A1 | 1/1993 | Germany . |
| 4231316A1 | 4/1993 | Germany . |
| 4239773A1 | 6/1994 | Germany . |
| 57-56632 | 4/1982 | Japan . |
| 58-35255 | 3/1983 | Japan . |
| 58-138236 | 8/1983 | Japan . |
| 60-219444 | 11/1985 | Japan . |
| 60-222551 | 11/1985 | Japan . |

*Primary Examiner*—Andrew M. Dolinar
*Attorney, Agent, or Firm*—McDermott, Will & Emery

[57] ABSTRACT

An integrated internal combustion engine control system in combination with an automotive emission control system, comprises an exhaust-gas recirculation valve (EGR valve) employed in an EGR system. A target EGR amount is calculated as a function of an intake-air flow rate measured by an air-flow meter and a target EGR rate based on engine operating conditions such as engine speed and engine load. The opening of the EGR valve is adjusted by a command from a control unit so that the target EGR amount is attained. The target EGR rate is preferably calculated depending on an intake pressure as well as the engine speed and the engine load. In combination with the above-mentioned EGR control, a throttle valve disposed in the induction system is effectively controlled in response to an actual valve lift of the EGR valve and a differential pressure between an exhaust pressure and the intake pressure. A fuel-injection amount is accurately controlled in consideration of a variation of an excess-air factor. To compensate a phase lag a predetermined advance processing is made to a signal from a typical air-flow meter, and then the advance-processed signal is effectively signal-processed to invert a reverse-flow component in the output signal.

4 Claims, 52 Drawing Sheets

CALCULATION OF COMMAND LIFT Liftt OF EGR CONTROL VALVE

S101: READ Pm, Pexh, Tqe, Te

S102: $Tav = Tqe / \sqrt{Pexh - Pm} / KR\# \times Te / TA\#$

S103: DERIVE Mlift FROM Tav

S104: DERIVE Liftt FROM Mlift THROUGH ADVANCE PROCESSING

END

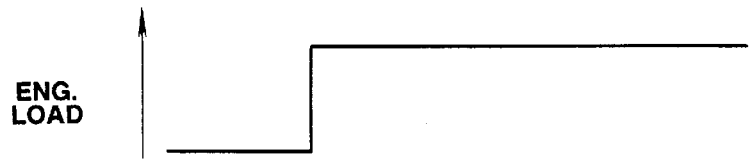
FIG.43A  ENG. LOAD
FIG.43B  INTAKE PRESSURE
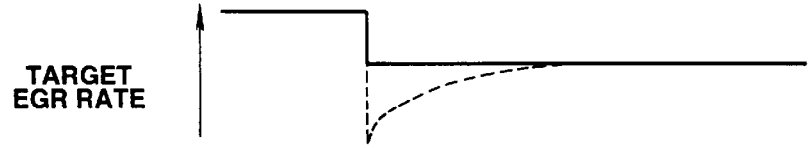
FIG.43C  TARGET EGR RATE
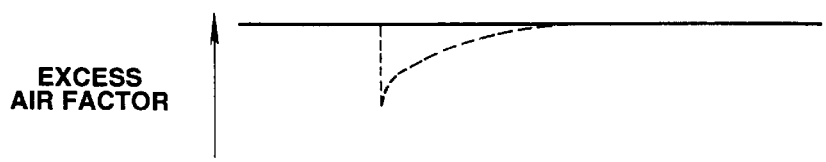
FIG.43D  EXCESS AIR FACTOR
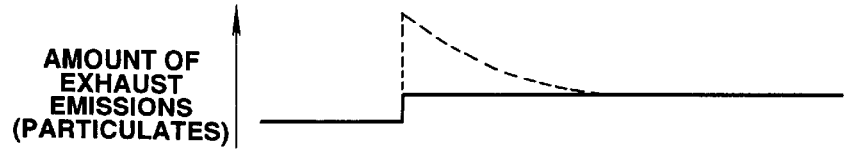
FIG.43E  AMOUNT OF EXHAUST EMISSIONS (PARTICULATES)
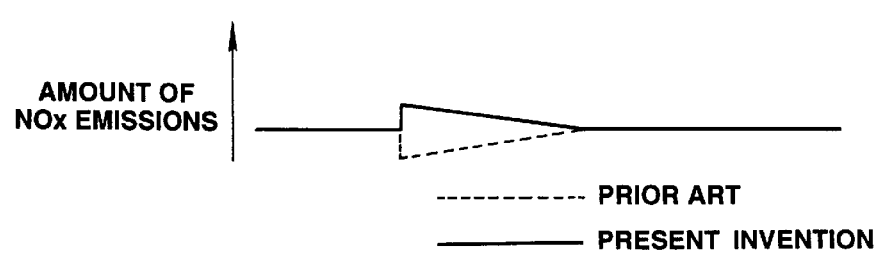
FIG.43F  AMOUNT OF NOx EMISSIONS
---- PRIOR ART
—— PRESENT INVENTION

OUTPUT WAVEFORM OF HOT-WIRE TYPE AIR FLOW METER

WAVEFORM AFTER ADVANCE-PROCESSING

WAVEFORM AFTER REVERSE-FLOW CORRECTION

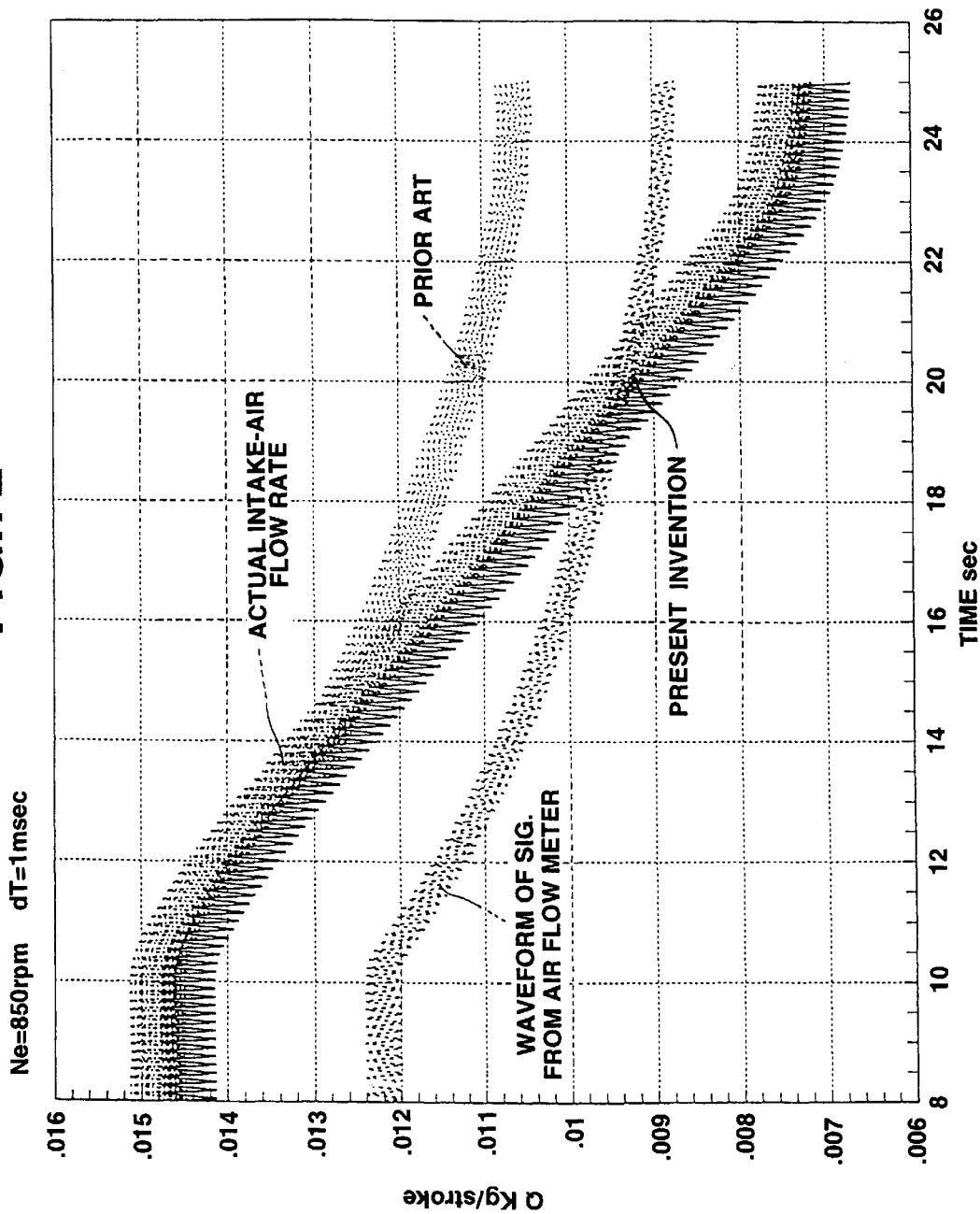

INTEGRATED INTERNAL COMBUSTION ENGINE CONTROL SYSTEM WITH HIGH-PRECISION EMISSION CONTROLS

BACKGROUND OF THE INVENTION

1. Field of the Invention

The present invention relates to an automotive emission control system suitable for use in internal combustion engines, and specifically to an electronic centralized engine control system which performs various engine controls, such as an exhaust-gas-recirculation control, a fuel injection control, a precise detection of flow rate of intake air drawn into an intake manifold or the like.

2. Description of the Prior Art

As is generally known, in order to minimize or eliminate atmospheric pollution from automotive vehicles, there have been proposed and developed various automotive tune-up and exhaust-emission control techniques. For example, an exhaust-gas-recirculation control system, often abbreviated simply as an "EGR system", is used to reduce nitrogen oxide (NOx) emissions from exhaust gases of the internal combustion engine. On late-model diesel-engine cars, the EGR system is almost all employed to decrease formation of NOx. In typical EGR systems, a target EGR rate or a target EGR amount is determined depending on engine operating conditions, namely engine speed and load on the engine. The engine load can be generally estimated by a fuel-injection amount, an opening of an accelerator (an accelerator-pedal position) or the like. One such prior art EGR system has been disclosed in Japanese Patent Provisional Publication No. 58-35255. In an EGR system incorporated in diesel engines, it is desired to properly and precisely control the amount of exhaust-gas recirculation (EGR) or the rate of EGR, in a transition state for example a transition from normal straight-ahead driving of the vehicle to heavy acceleration, or in case of changes in air density resulting from changes in environment from low-land driving to high-land driving even under constant engine speed and engine load. Also, in a diesel engine with a turbocharger, there is the additional problem that the acceleration versus super-charged induction pressure (often called boost pressure) characteristics is affected by degradation of lubricating oil for lubrication of the same turbine-wheel shaft as the compressor-pump rotor. As is well known, in the event that the amount of EGR becomes excessively great, black smoke and particulates tend to increase. On the other hand, in the event that the amount of EGR is excessively less, the combustion temperature cannot be lowered satisfactorily owing to less inert exhaust gases recirculated, and thus the amount of NOx emissions cannot be sufficiently reduced. Particularly when quickly accelerating, the fuel-injection amount tends to be rapidly increased, and thus an excess-air factor tends to be greatly lowered, thereby resulting in increase in emissions of smoke and particulates. In order to avoid the undesired lowering of excess-air factor, resulting from the rapid increase in fuel injection amount when quickly accelerating, the exhaust-gas recirculation would be intendedly cut. The conventional EGR system could not timely perform the EGR-cut operation in the previously-noted transition state. The improper EGR-cut timings produce the increased amount of nitrogen oxide emissions (in case of lack of the EGR) or the increased amount of smoke and particulates (in case of excessively increased amount of the EGR). Specifically, in the case of an engine with a turbocharger, there is a greatly increased tendency for the previously-described improper EGR-cut timings to occur due to fluctuations in the acceleration versus super-charged induction pressure characteristics resulting from degraded lubricating oil. To ensure the EGR control or to reduce NOx emissions in the transition state such as during acceleration, the prior art EGR control system is equipped with an induction-air throttle valve and/or an exhaust throttle valve to properly adjust the differential pressure between the intake pressure and the exhaust pressure and consequently to adjust the EGR rate toward a target EGR rate. For example, Japanese Patent Provisional Publication No. 60-219444 has taught the provision of an EGR control which is in dependent on acceleration (or a rate of change in engine load). According to the EGR control disclosed in the Japanese Patent Provisional Publication No. 60-219444, an exhaust throttle valve is shifted to its fully-open position when the rate of change in engine load is held greater than a predetermined threshold for a preset period of time. However, in case of an engine with a turbocharger, the optimal EGR rate would vary depending on degradation of lubricating oil as well as the engine load. Japanese Patent Provisional Publication No. 60-222551 has taught the provision of an exhaust throttle valve control based on a back pressure measured upstream of the exhaust throttle valve. According to the Japanese Patent Provisional Publication No. 60-222551, the opening of the exhaust throttle valve is adjusted depending on the deviation between the back pressure measured and a target back pressure which is predetermined by both engine load and engine speed, such that the measured back pressure is adjusted towards the target back pressure. As may be appreciated, it is troublesome to precisely preset control characteristics of openings of the intake throttle and/or the exhaust throttle, because the control characteristics are affected by characteristics of an EGR control valve, different operating requirements of the engine and the like. In order to avoid excessive lowering of excess-air factor during acceleration of the vehicle, Japanese Patent Provisional Publication No. 58-138236 has taught the stepwise increasing adjustment of a fuel injection amount from the time when the vehicle begins to accelerate. Actually the fuel injection amount and/or the fuel-injection timings must be varied depending on the presence or absence of exhaust-gas recirculation (EGR) or on the EGR rate. In the system disclosed in the Japanese Patent Provisional Publication No. 58-138236, assuming that the fuel-injection amount and timings are adjusted to meet in the presence of the EGR during acceleration, the fuel-injection timing tends to delay in absence of the EGR, thus making a sacrifice of an acceleration performance. In contrast to the above, assuming that the fuel-injection amount and timings are adjusted to meet in the absence of the EGR during acceleration, the excess-air factor tends to be excessively lowered in presence of the EGR, thus increasing exhaust emissions such as black smoke and particulates. As appreciated, it is important to precisely detect or measure a flow rate of intake air or induction air which is drawn into an intake manifold. As is generally known, on late-model cars, a precise measurement of intake air is required to determine a fuel-injection amount in case of an electronically-controlled fuel-injection system for gasoline engines, and to determine a maximum fuel-injection amount in case of an electronically-controlled fuel-injection system for diesel engines. In recent years, a hot-wire type air-flow meter is widely used to detect the flow rate of intake air flowing through the air-intake pipe disposed just downstream of an air cleaner. The hot-wire type air-flow meter is inexpensive and has a relatively wider dynamic range for flow-rate measurement. Owing to a so-called valve overlap during which the open periods of both intake and exhaust valves are overlapped, the intake valve opens from before completion of the exhaust stroke, that is, prior to the top dead center (T. D. C.) position and the exhaust valve remains open after the T. D. C. position. During the valve overlap, there is a possibility of back-flow or reverse-flow of some of intake air drawn into the intake-valve port. Particularly in case of a low flow rate of intake air or a high engine load, there is a tendency for pulsation flow of intake air or pulsation of the manifold pressure to occur. The previously-noted conventional hot-wire type air-flow meter can measure the flow rate of intake air but not detect directions of the intake-air flow. The flow rate of air flowing from the intake-valve port back to the intake manifold would be measured erroneously as a positive flow rate. Thus, in case of occurrence of pulsation flow resulting from a low flow rate of intake air, there is a tendency that the measured value of intake air may be increased as compared with the actual flow rate. The erroneously-measured flow rate of intake air may exert a bad influence on the fuel-injection control, and whereby the engine performance or the driveability of the vehicle may be degraded. In diesel engines, such a measurement error results in deterioration in an exhaust-emission control performance, because the target EGR rate is usually determined depending on the differential pressure between the exhaust pressure and the intake pressure (or the manifold pressure). For example, in the case that the measured value of the air-flow meter exceeds an actual intake-air flow rate, the EGR rate is set at a greater value than an optimal EGR rate, thus increasing exhaust emissions for example particulates. Conversely, in the case that the measured value is less than the actual intake-air flow rate, the EGR rate is set at a less value than the optimal EGR rate, thus increasing the amount of NOx emissions. In these cases, the emission control performance tends to be lowered. Also to avoid an erroneous measurement of the intake-air flow rate, occurring due to pulsation of the manifold pressure during high engine load, Japanese Patent Provisional Publication No. 57-56632 has taught the use of an estimate of intake-air flow in place of a measured value of the hot-wire type air-flow meter during the high engine load, i.e., when the throttle opening exceeds a predetermined threshold value. The estimate of intake-air flow is preset on the basis of both a throttle opening and an engine revolution speed. It is desirable that the deviation (the error) between the actual flow rate of intake air and the estimate of intake-air flow is less as much as possible. However, when there are changes in air density due to a change in driving condition from low-land driving to high-land driving, the previously-noted deviation tends to increase. The increased deviation may exert a bad influence on an accuracy of the fuel-injection control or the EGR control.

SUMMARY OF THE INVENTION

Accordingly, it is an object of the invention to provide an improved automotive emission control system for internal combustion engines which avoids the foregoing disadvantages of the prior art.

It is another object of the invention to optimally tune up an internal combustion engine by enhancing an exhaust-emission control performance without sacrificing an acceleration performance.

It is a further object of the invention to provide an automotive emission control system suitable for internal combustion engines, particularly suitable for diesel engines with a turbocharger, which is capable of ensuring an optimal exhaust-gas recirculation control, an optimal fuel injection control and a precise detection of flow rate of intake air.

In order to accomplish the aforementioned and other objects of the invention, an integrated internal combustion engine control system in combination with an automotive emission control system, the engine control system comprises an exhaust-gas recirculation valve employed in an exhaust-gas recirculation system for sending some of exhaust gas back through an internal combustion engine, air flow rate detection means for detecting a flow rate of intake air drawn into the engine, engine-operating-condition detection means for detecting an operating condition of the engine, target exhaust-gas recirculation rate setting means for setting a target exhaust-gas recirculation rate depending on the operating condition of the engine, target exhaust-gas recirculation amount setting means for setting a target exhaust-gas recirculation amount as a function of the flow rate of intake air and the target exhaust-gas recirculation rate, and valve-opening control means responsive to the target exhaust-gas recirculation amount for controlling an opening of the exhaust-gas recirculation valve. The valve-opening control means may comprise a command exhaust-gas recirculation amount setting means for setting a command exhaust-gas recirculation amount (Tqec) by performing a predetermined advance processing with respect to the target exhaust-gas recirculation amount (Tqec0), and a controlled variable setting means for setting a controlled variable (Liftt) of the opening of the exhaust-gas recirculation valve depending on the command exhaust-gas recirculation amount. A time constant of the predetermined advance processing is set depending on a volumetric capacity in an induction system from the exhaust-gas recirculation valve to an inlet of an engine cylinder and a volumetric capacity of the engine cylinder. It is preferable that the command exhaust-gas recirculation amount is determined through the predetermined advance processing which is defined by a first expression represented by Tqec= GKQE#×Tqec0+(GKQE#−1)×Rqecn−1, a second expression represented by Rqec=Rqecn−1×(1−Kv)+Tqec0×Kv, and a third expression represented by Kv=Kin×Vc/Vm/CYLN#, where Tqec denotes the command exhaust-gas recirculation amount, GKQE# denotes an advance-processing gain constant, Tqec0 denotes the target exhaust-gas recirculation amount, Kv denotes a predetermined lag coefficient, Kin denotes a value equivalent to a volumetric efficiency, Vc denotes a volumetric capacity per cylinder, Vm denotes a volumetric capacity of the induction system including an intake manifold and a collector, and CYLN# denotes the number of engine cylinders. The command exhaust-gas recirculation amount setting means may comprise a response-characteristic time constant setting means for setting a response characteristic between a target exhaust-gas recirculation amount (MQce) which is intended to be drawn into the cylinder and an actual exhaust-gas recirculation amount (Qce) which is actually drawn into the engine cylinder, and a dynamic-characteristic time constant estimation means for estimating dynamic characteristics of a recirculated exhaust gas, flowing through the exhaust-gas recirculation valve into the engine cylinder, and wherein the command exhaust-gas recirculation amount which is intended to be passed through the exhaust-gas recirculation valve is set by making the predetermined advance processing to the target exhaust-gas recirculation amount (MQce) in accordance with the dynamic characteristics estimated by the dynamic-characteristic time constant estimation means so that the response characteristic set by the response-characteristic time constant setting means is reached. Preferably, the dynamic-characteristic time constant estimation means estimates a dynamic-characteristic time constant (τa) from an engine speed (Ne), a volumetric efficiency (ηv), and a volumetric capacity in an induction system from the exhaust-gas recirculation valve to an inlet of an engine cylinder and a volumetric capacity of the engine cylinder, and whereas the response-characteristic time constant setting means sets a response-characteristic time constant (τs) at a positive number less than the dynamic-characteristic time constant (τa). An integrated internal combustion engine control system may further comprise an intake-pressure detection means for detecting an intake pressure and an exhaust-pressure detection means for detecting an exhaust pressure, and the controlled variable setting means calculates a required fluid-flow passage area (Tav) defined by the exhaust-gas recirculation valve as a function of the command exhaust-gas recirculation amount (Tqec), the intake pressure (Pm) and the exhaust pressure (Pexh), and sets a target opening (Mlift) of the exhaust-gas recirculation valve so that the target opening (Mlift) is equivalent to the required flow passage area (Tav), and controlled variable setting means including an advance-processing means through which the controlled variable (Liftt) is set by making a predetermined advance processing to the target opening (Mlift).

According to another aspect of the invention, an integrated internal combustion engine control system in combination with an automotive emission control system, the engine control system comprises an exhaust-gas recirculation valve employed in an exhaust-gas recirculation system for sending some of exhaust gas back through an internal combustion engine, exhaust-gas recirculation amount calculation means for calculating a desired exhaust-gas recirculation amount, exhaust-gas recirculation valve control means for controlling the exhaust-gas recirculation valve so that the desired exhaust-gas recirculation amount is reached, intake-pressure detection means for detecting an intake pressure, exhaust-pressure detection means for detecting an exhaust pressure, lift detection means for detecting a lift of a valve stem of the exhaust-gas recirculation valve, a throttle valve provided in an induction system for variably throttling intake air drawn into the engine, and throttle valve control means for controlling the throttle valve depending on the intake pressure, the exhaust pressure, and the lift of the exhaust-gas recirculation valve. An integrated internal combustion engine control system may further comprise a differential pressure calculation means for calculating a differential pressure (Dpl) between the exhaust pressure (Pexh) and the intake pressure (Pm), and a maximum recirculated exhaust-gas flow rate calculation means for calculating a maximum recirculated exhaust-gas flow rate (Qemax) as a function of the differential pressure (Dpl) and a maximum opening area (Avmax) of the exhaust-gas recirculation valve. The throttle valve control means decreasingly adjusts an opening of the throttle valve when a desired recirculated exhaust-gas flow rate (Tqe) exceeds the maximum recirculated exhaust-gas flow rate. The throttle valve control means increasingly adjusts the opening of the throttle valve when the desired recirculated exhaust-gas flow rate (Tqe) is below the maximum recirculated exhaust-gas flow rate, the differential pressure (Dpl) is above a predetermined slice level, and/or the lift (Lifts) detected by the lift detection means is less than a predetermined slice level.

According to a further aspect of the invention, an integrated internal combustion engine control system in combination with an automotive emission control system, the engine control system comprises an exhaust-gas recirculation valve employed in an exhaust-gas recirculation system for sending some of exhaust gas back through an internal combustion engine, engine-operating-condition detection means for detecting an operating condition of the engine, intake-pressure detection means for detecting an intake pressure, desired exhaust-gas recirculation rate calculation means for calculating a desired exhaust-gas recirculation rate or a desired exhaust-gas-recirculation valve lift (Tlift) based on the operating condition of the engine and the intake pressure (Pm), and exhaust-gas recirculation valve control means for adjusting an opening of the exhaust-gas recirculation valve towards the desired exhaust-gas recirculation rate or the desired exhaust-gas-recirculation valve lift (Tlift).

According to a still further aspect of the invention, an integrated internal combustion engine control system in combination with an automotive emission control system, the engine control system comprises a fuel-injection control system for controlling a fuel-injection amount injected into a cylinder of an internal combustion engine, the fuel-injection control system including fuel-injection means provided at each engine cylinder to deliver fuel from a fuel-injection pump, engine-operating-condition detection means for detecting an operating condition of the engine, basic fuel-injection amount calculation means for calculating a basic fuel-injection amount (Mqdrv) depending on the operating condition of the engine, first correction means for primarily correcting the basic fuel-injection amount (Mqdrv) by at least a water-temperature dependent correction factor to produce a primarily corrected fuel-injection amount (Drvq), second correction means for secondarily correcting the primarily corrected fuel-injection amount (Drvq) to produce a secondarily corrected fuel-injection amount (Qsolb) so that a variation of an excess-air factor is kept within an allowable value, and fuel-injection amount control means responsive to the secondarily corrected fuel-injection amount (Qsolb) for controlling a fuel-injection amount injected from the fuel-injection means.

According to another aspect of the invention, an intake-air flow rate detection system for detecting a flow rate of an intake air drawn into an internal combustion engine, the system comprises air flow rate detection means for detecting a flow rate of intake air drawn into an internal combustion engine without distinction of forward flow and reverse flow to output an air flow rate indicative signal (Qo), extreme value detection means for detecting each of maximal values and minimal values from a signal wave of the air flow rate indicative signal, engine-operating-condition detection means for detecting an operating condition of the engine, slice-level setting means for setting a slice level (Qa2sl) depending on the operating condition of the engine, and reverse-flow decision means for comparing each of the maximal values with the slice level and for determining that, when a maximal value in the signal wave is less than the slice level, a portion ranging within two adjacent minimal values in close proximity to the maximal value less than the slice level corresponds to a reverse-flow component.

According to a further aspect of the invention, an intake-air flow rate detection system for detecting a flow rate of an intake air drawn into an internal combustion engine, the system comprises air flow rate detection means for detecting a flow rate of intake air drawn into an internal combustion engine without distinction of forward flow and reverse flow to output an air flow rate indicative signal, count means for individually counting a signal-value increasing time interval (C_Inc) and a signal-value decreasing time interval (C_Dec) with respect to a signal wave of the air flow rate indicative signal, and reverse-flow decision means for making a distinction between forward flow and reverse flow by comparing the signal-value increasing time interval (C_Inc)

with the signal-value decreasing time interval (C_Dec). Preferably, an intake-air flow rate detection system may further comprise an advance-processing means for making a predetermined advance processing to the air flow rate indicative signal to produce an advance-processed signal. The count means individually counts the signal-value increasing time interval (C_Inc) and the signal-value decreasing time interval (C_Dec) with respect to a signal wave of the advance-processed signal. It is preferable that the reverse-flow decision means makes a distinction between forward flow and reverse flow on the basis of the deviation (DC) between the signal-value decreasing time interval (C_Dec) and the signal-value increasing time interval (C_Inc).

BRIEF DESCRIPTION OF THE DRAWINGS

FIGS. 43A to 43F are timing charts explaining comparative results (i.e., the amount of particulates and the amount of NOx emissions) of the EGR control in case of both the improved system (as indicated by the solid line) of the present invention and the prior art system (as indicated by the broken line).

FIG. 72 is a graph illustrating simulation results representative of the relation among an actual intake-air flow rate, a waveform of the output signal from the air-flow meter, a waveform of an intake-air flow rate indicative signal properly corrected through the system of the fifth embodiment, and a waveform of an intake-air flow rate indicative signal obtained through the prior art system.

DESCRIPTION OF THE PREFERRED EMBODIMENTS

First embodiment

Figure 1:
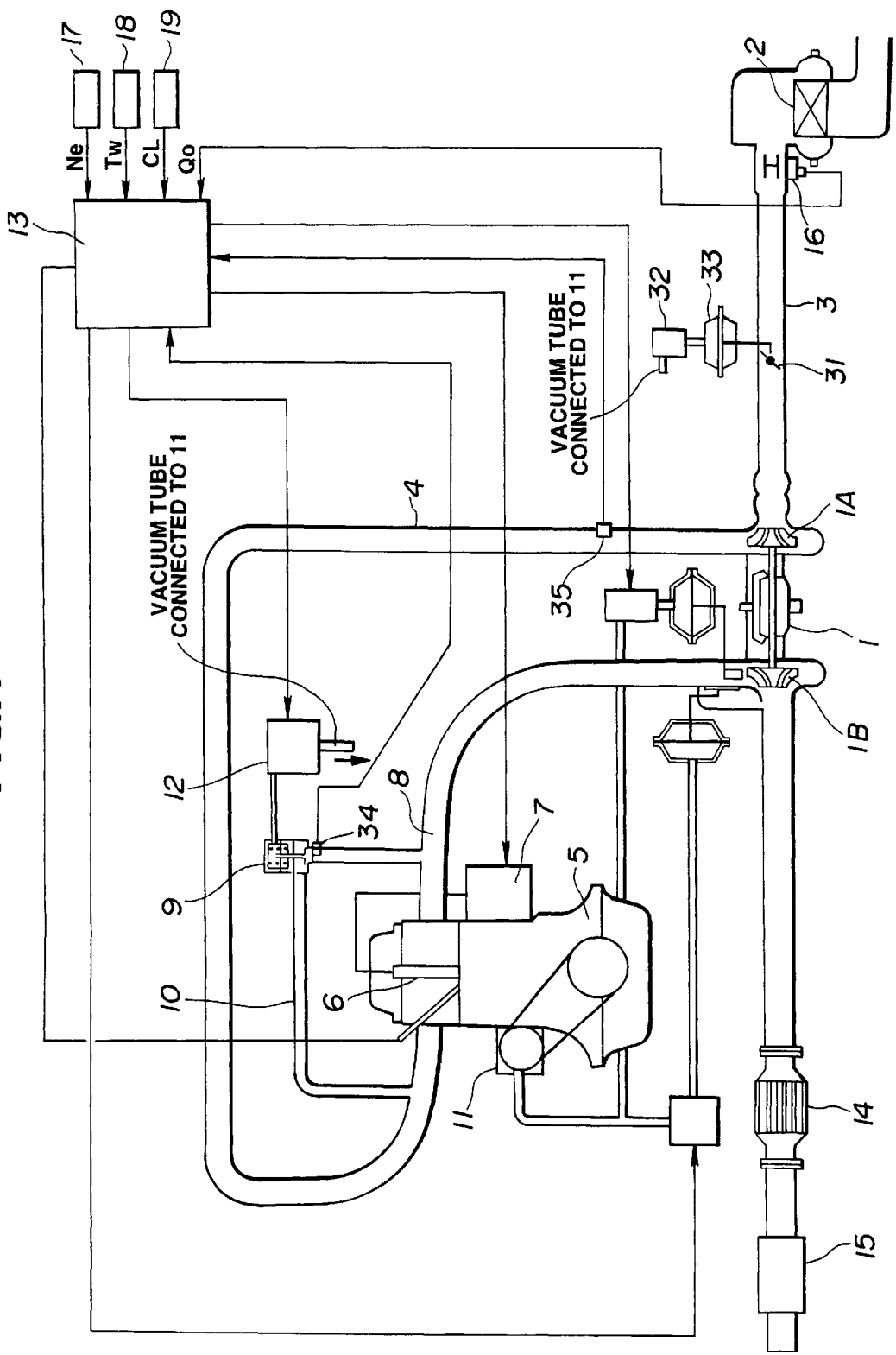
FIG. 1 is a system diagram illustrating a first embodiment of an automotive emission control system made according to the present invention.
Figure 29:
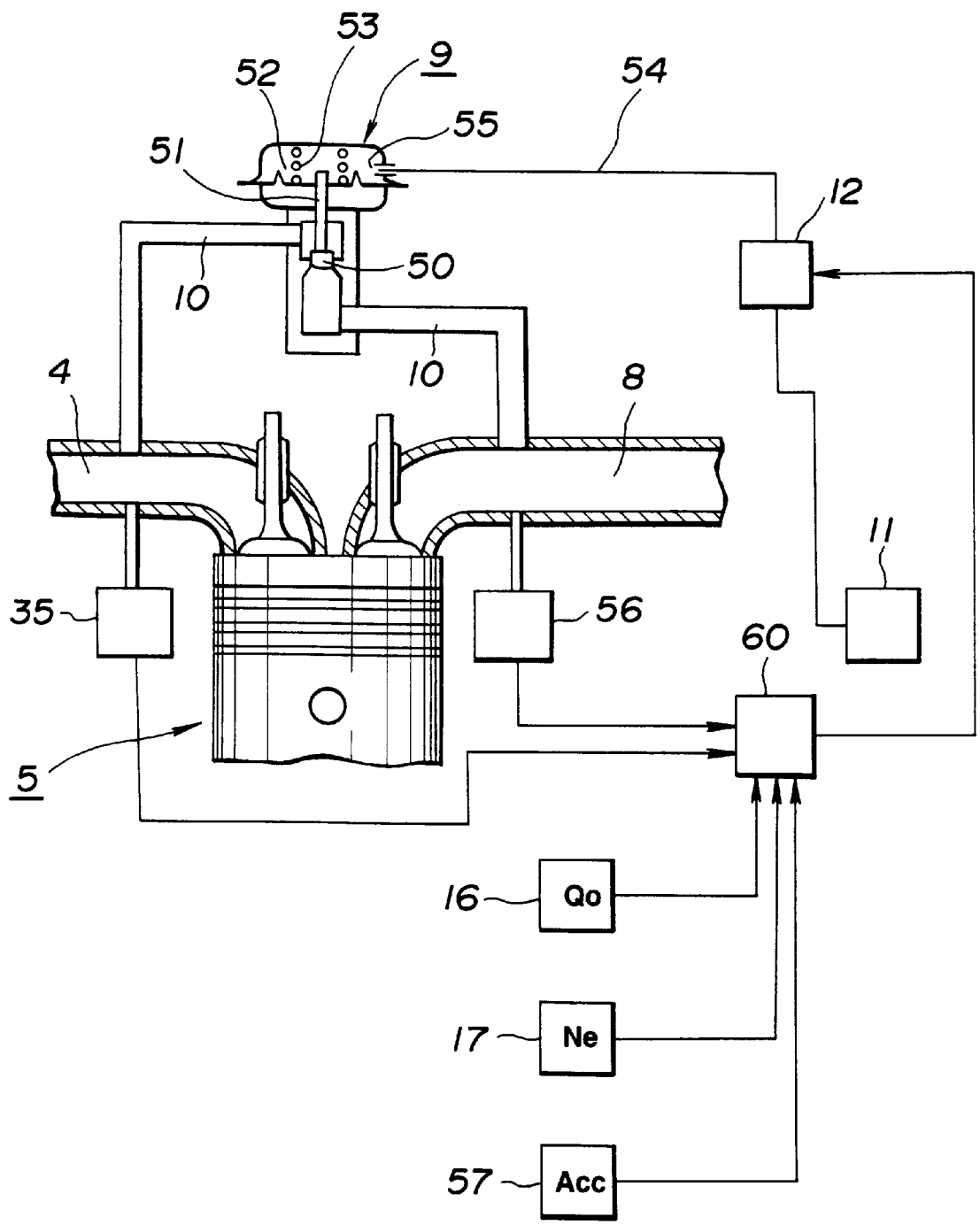
FIG. 29 is a system diagram illustrating a second embodiment of an automotive emission control system made according to the invention.
Figure 30:
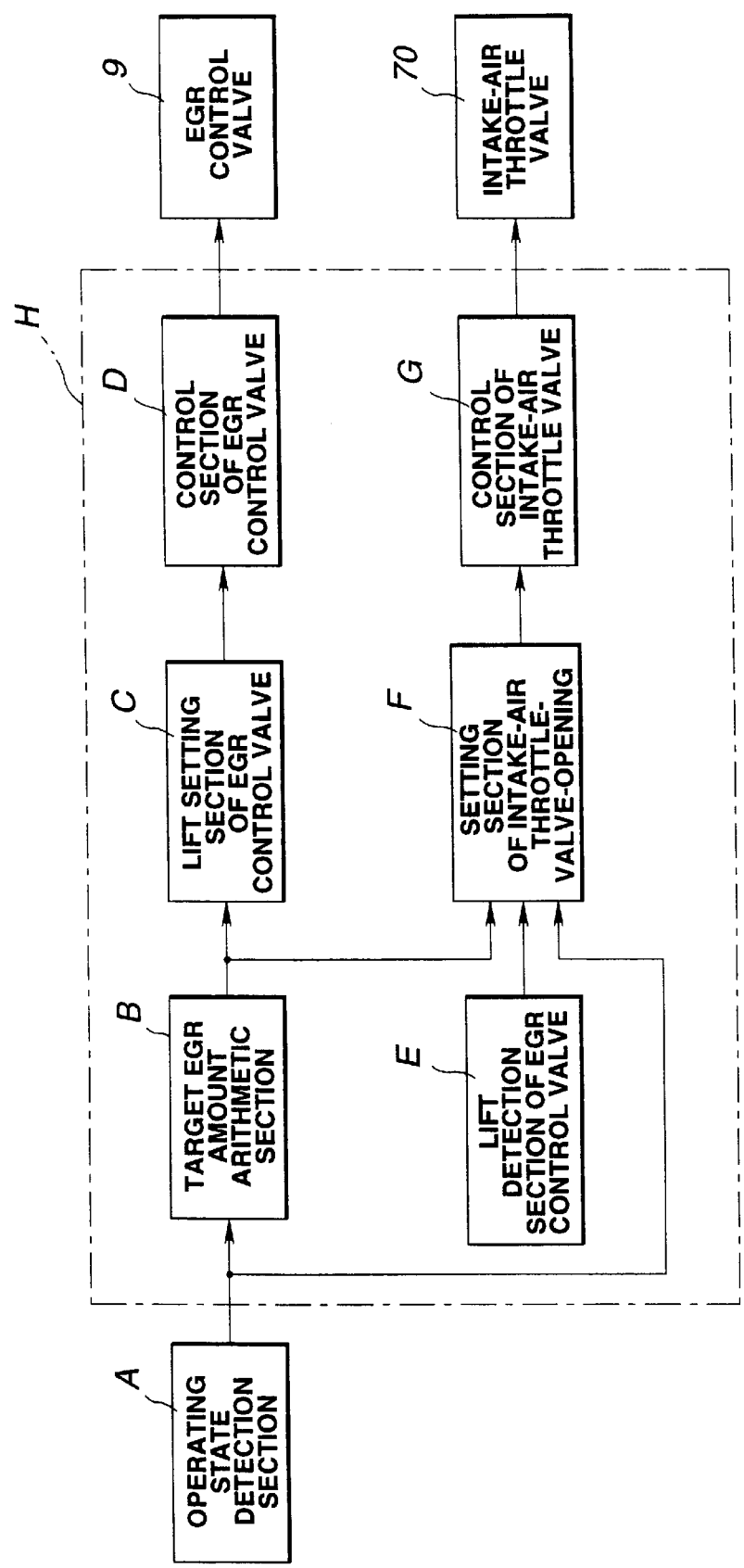
FIG. 30 is a block diagram illustrating a control unit employed in the emission control system of the second embodiment.

Referring now to the drawings, particularly to FIGS. 1 through 25, the automotive emission control system of the invention is exemplified in case of a diesel engine with a turbocharger. As seen in FIG. 1, reference numeral 1 denotes a typical turbocharger with a compressor pump 1A and a turbine 1B. In a conventional manner, the turbine wheel is spun by the exhaust gas. The turbine wheel is the same shaft as the compressor-pump rotor, and so the compressor pump is driven in synchronization with rotation of the turbine wheel so as to produce a high pressure on fresh air which is introduced through an air filter 2 into an air intake passage or an induction passage 3. The super-charged air is directed into an intake manifold 4. The engine 5 is equipped with fuel-injection nozzles 6 at each cylinder to deliver fuel from a fuel-injection pump 7 directly into combustion chambers of the engine cylinders near the top dead center (T. D. C.) position on the compression stroke. The emission control system of the embodiment includes an exhaust-gas recirculation (abbreviated simply as "EGR") passage 10 which connects the exhaust manifold 8 with the intake manifold 4, and an EGR control valve 9 (EGR valve) fluidly disposed in the EGR passage 10. The EGR passage 10 and the EGR valve 9 are provided to send some of the exhaust gas back through the engine to the intake manifold 4, thereby reducing the formation of nitrogen oxides (NOx). Disposed in the induction passage 3 upstream of the compressor pump 1A is an intake-air throttle valve 31, simply called a throttle valve, so as to constrict the fresh-air flow during the EGR control and consequently to enlarge the differential pressure between the exhaust pressure and the intake pressure, for the purpose of facilitating recirculation of the exhaust gas. The EGR control is effective to reduce exhaust emissions and exhaust noise particularly during the engine idling or during the low engine load. The EGR control is actually performed by decreasingly adjusting the opening of the throttle valve 31 and simultaneously by properly adjusting the opening of the EGR valve 9. As seen in FIG. 1, the throttle valve 31 is usually comprised of a butterfly valve. The butterfly-type throttle valve 31 is linked to a vacuum-operated mechanism which consists of a diaphragm unit 33 and an electromagnetic valve 32, so that the angular position (or the opening) of the throttle valve 31 is adjusted by way of the vacuum fed into the diaphragm chamber of the diaphragm unit 33 through the valve 32. The vacuum is produced by a vacuum pump 11, which is located near the engine cylinder block, and delivered through a vacuum line (a vacuum tube) to the inlet port of the valve 32. Although a signal line for the electromagnetic valve 32 is not shown in FIG. 1, the valve 32 can be opened or closed depending on a control signal from a control unit 13, in order to open or close the vacuum line. With the valve 32 fully opened, the vacuum raises the diaphragm (see reference sign 52 of FIG. 29 showing the detail of the EGR valve) of the unit 33 and as a result the opening of the throttle valve 31 decreases and thus the fresh air flow is constricted properly. On the other hand, the EGR valve 9 has a signal port or a pilot pressure port (corresponding to reference sign 54 of FIG. 29) connected to an outlet port of a duty-cycle controlled electromagnetic solenoid valve 12, to introduce a pressure that is properly adjusted by the valve 12 into the diaphragm chamber (see reference sign 55 of FIG. 29) of the EGR valve. Although it is not clearly shown in the drawing, the duty-cycle controlled valve 12 has an atmospheric-pressure inlet port, such that the atmospheric-pressure inlet port (an air bleed) is cyclically opened and closed according to a duty cycle or a duty factor which is determined by the control unit 13. In other words, the duty-cycle controlled valve 12 is provided to suitably dilute the incoming vacuum with the atmosphere. So, air of the partial vacuum (the negative pressure) in the pressure chamber of the valve 12 is properly mixed with the atmosphere of a normal atmospheric pressure, and thus the outgoing vacuum (the negative gauge pressure) from the valve 12 can be properly adjusted at a higher pressure level than the incoming vacuum. The lower a reading of vacuum in the diaphragm chamber of the EGR valve 9, the greater the lift of the valve 9. That is, when more of the vacuum fed into the valve 12 is delivered into the EGR valve 9 through the signal line, the vacuum raises the diaphragm of the EGR valve 9 almost to the uppermost position at which the lift of the valve 9 reaches approximately the maximum amount, because of the EGR valve shaft firmly connected to the diaphragm. In such a case, the EGR valve 9 may produce a substantially maximum exhaust-gas-recirculation rate (EGR rate). In this manner, the lift of the EGR valve 9 can be properly adjusted and whereby the EGR rate can be varied properly depending on the duty factor determined by the control unit 13. As seen in FIG. 1, a lift sensor 34 may be located at the EGR valve 9 for directly sensing the actual lift (Lifts) of the EGR valve 9. After the combustion stroke (or the power stroke), burnt gases are forced from the individual cylinder to the exhaust manifold 8 and then the exhaust gas flow rotates the exhaust turbine 1B. Thereafter, the exhaust gases are exhausted through a filter 14 and a muffler 15 into the atmosphere. The filter 14 is provided to remove particulates and smoke included in the exhaust gases, whereas the muffler 15 is provided to reduce the exhaust noise. An air-flow meter 16 is disposed in the induction passage 3 upstream of the air compressor 1A, for detecting a flow rate Qo of the fresh air passing through the air cleaner 2 which is provided for filtering dust and dirt out of the fresh air drawn into the engine. Also provided are various sensors, namely an engine speed sensor 17 (for sensing the engine speed Ne), a water-temperature sensor 18 (for sensing the water temperature Tw), and a lever-opening sensor 19 (for sensing an opening CL of the control lever of the fuel-injection pump 7). As will be hereinafter described in detail, a pressure in the induction system (including the intake manifold and the collector), simply abbreviated "intake pressure", and a pressure in the exhaust system, simply abbreviated "exhaust pressure" are derived or estimated on the basis of the signals from the respective sensors 16, 17, 18 and 19 by means of the control unit 13, so as to properly set the maximum permissible fuel-injection amount. Alternatively, the above-mentioned intake pressure may be sensed by means of an intake-pressure sensor 35 which is attached to the intake manifold 4 downstream of the air compressor 1A. The control unit 13 employed in the system of the first embodiment operates as follows.

Figure 2:
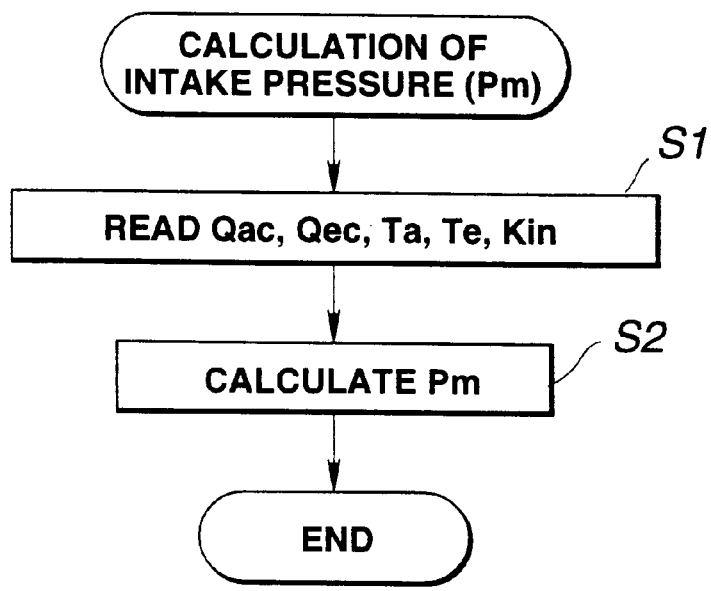
FIG. 2 is a flow chart illustrating a routine for calculation of an intake pressure (Pm) of an induction system in a first embodiment of the emission control system.

Referring now to FIG. 2, there is shown a routine for calculation of the intake pressure Pm. In step S1, read are an induced fresh-air flow per cylinder Qac, an EGR amount per cylinder Qec, an induced fresh-air temperature Ta, a recirculated exhaust-gas temperature Te which will be hereinafter referred to simply as an "EGR temperature", and a value Kin corresponding to a volumetric efficiency which will be hereinafter referred to as a "volumetric-efficiency equivalent value". As discussed later, these parameters Qac, Qec, Ta, Te, and Kin are determined through another arithmetic-operation routines. In step S2, the intake pressure Pm is calculated on the basis of a predetermined volumetric ratio (Vc/Vm) of the volumetric capacity/cylinder (Vc) with respect to the collector and intake-manifold volumetric capacity Vm in the induction system, according to the following expression, for example.

$$Pm = (Qac \times Ta + Qec \times Te) / Kin / Kvol \times KPM$$
$$= KPM \cdot (Qac \times Ta + Qec \times Te) \cdot (1 / Kin) \cdot (1 / Kvol)$$

where Kvol is equal to the volumetric ratio (Vc/Vm), KPM is a predetermined constant.

Figure 3:
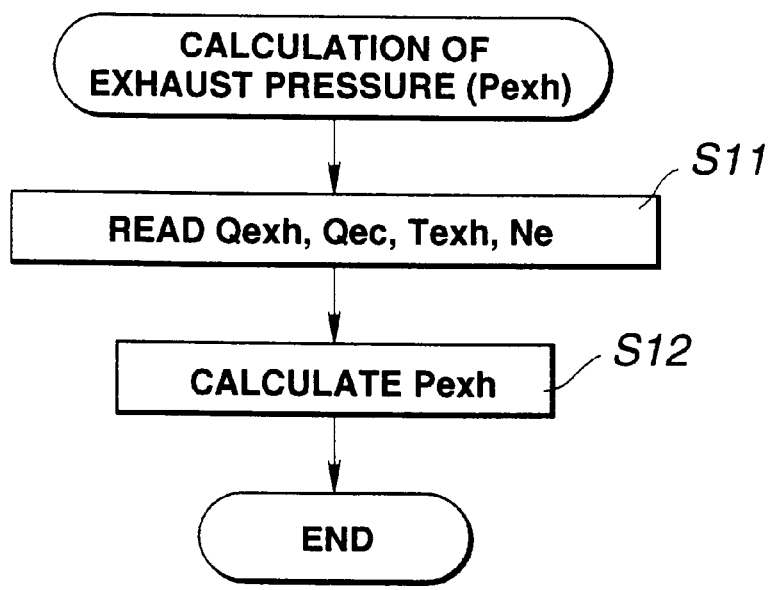
FIG. 3 is a flow chart illustrating a routine for calculation of an exhaust pressure (Pexh) of an exhaust system in the first embodiment.

Referring to FIG. 3, there is shown a routine for calculation of the exhaust pressure Pexh. In step S11, read are a displacement per cylinder Qexh which is exhausted from one cylinder, the EGR amount per cylinder Qec, an exhaust-gas temperature Texh, and the engine speed Ne. In step S12, on the basis of the above parameters Qexh, Qec, Texh, and Ne, the exhaust pressure Pexh is calculated from the following expression.

$$Pexh = (Qexh - Qec) \times Texh \times Ne \times Kpexh + Opexh$$

where the values Kpexh and Opexh are predetermined constants.

Figure 4:
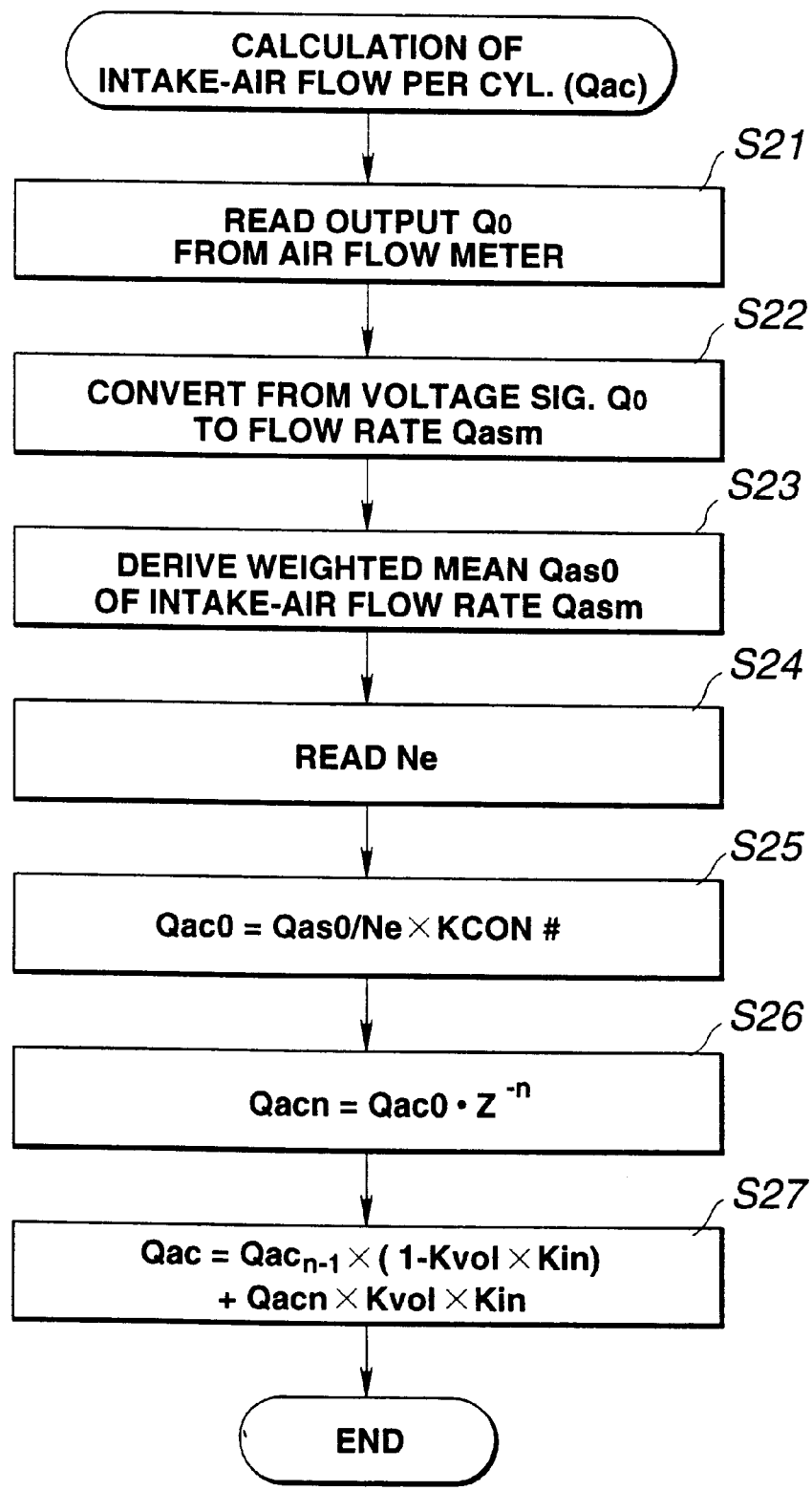
FIG. 4 is a flow chart illustrating a main routine for calculation of an induced fresh-air flow (Qac) per cylinder.

The previously-noted induced fresh-air flow per cylinder Qac is calculated in accordance with the routine indicated by the flow chart of FIG. 4.

In step S21, read is an output signal value Qo (in the form of a voltage signal) generated from the air-flow meter 16.

Figure 53:
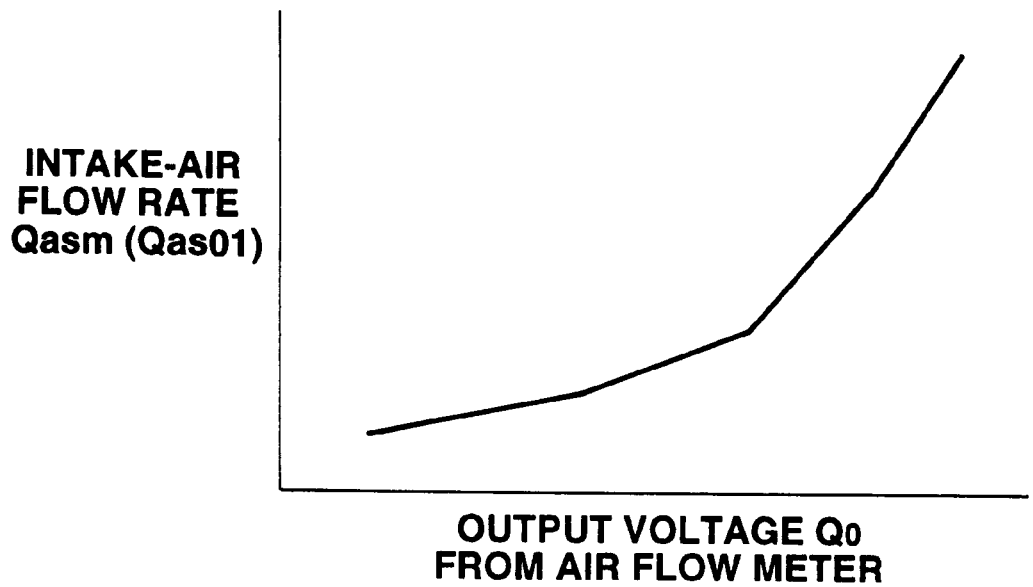
FIG. 53 is a look-up table used for linearization from an output voltage signal value (Qo) from the air-flow meter to an intake-air flow rate (Qasm).
Figure 54:
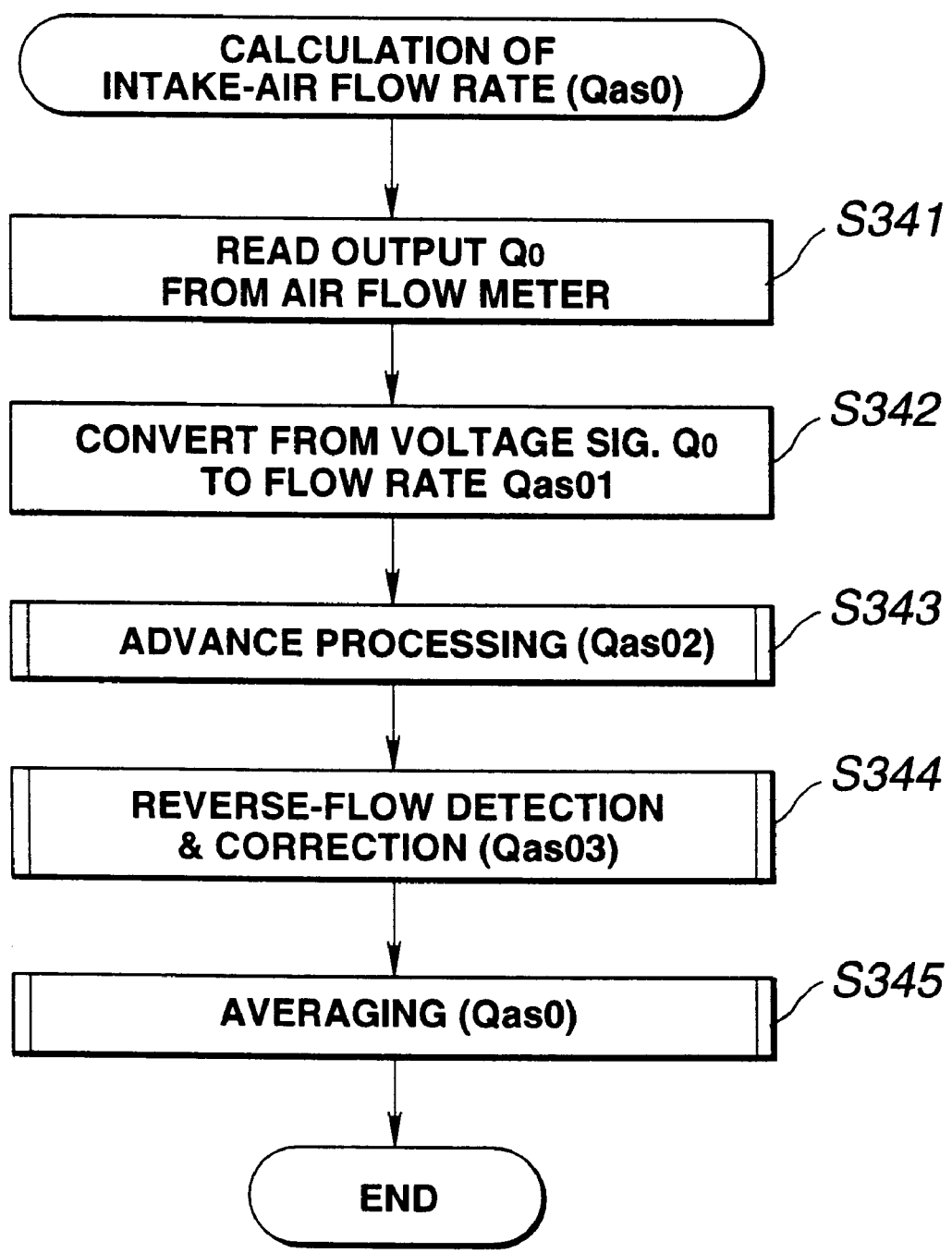
FIG. 54 is a flow chart illustrating a main routine for calculation of a weighted average (Qas0) of the intake-air flow rate or an induced-air flow rate in case of the emission control system of a fifth embodiment.

In step S22, the voltage signal value Qo is converted into an intake-air flow rate (an induced fresh-air flow rate) Qasm through linearization according to a predetermined conversion table or a linearization table (see FIG. 53).

In step S23, a weighted mean processing is executed to derive a weighted mean Qas0 from the intake-air flow rate Qasm.

In step S24, read is a value of an engine-speed indicative signal Ne from the engine speed sensor 17.

In step S25, an intake-air (induced-air) flow per cylinder Qac0 is calculated on the basis of the weighted mean Qas0 of the induced fresh-air flow rate and the engine-speed indicative signal value Ne, according to the following expression.

$$Qac0=Qas0/Ne \times KCON\#$$

where KCON# is a predetermined constant.

In step S26, a so-called delay processing is executed, since the fresh air having the induced-air flow rate detected instantaneously by the air-flow meter 16 is fed into the induction-collector inlet with a certain lag time. Usually, the routine shown in FIG. 4 is executed as time-triggered interrupt routines to be triggered every predetermined time intervals. Actually, n data of the induced fresh-air flow per cylinder, namely Qac0(1), Qac0(2), Qac0(3), ..., Qac0(n-2), Qac0(n-1) and Qac0(n) are stored in predetermined memory addresses of the control unit 13. The data Qac0(1) represents a fresh-air flow per cylinder derived through the arithmetic operation (see the flow from step S21 to step S25) of FIG. 4 before n cycles, whereas the data Qac0(n) represents a fresh-air flow per cylinder derived at the current cycle. In consideration of the cycle delay (or the phase delay), the data Qac0(1) is regarded and read as a fresh-air flow Qacn currently drawn into the induction-collector inlet. Thus, Qacn means the current value of the induced fresh-air flow drawn into the collector inlet, while Qacn-1 means the previous value of the induced fresh-air flow. The current value Qacn of the induced fresh-air flow is represented as the expression $Qacn=Qac0 \cdot Z^{-n}$.

In step S27, a final induced fresh-air flow per cylinder Qac is estimated and derived from the volumetric ratio Kvol (=Vc/Vm) and the volumetric-efficiency equivalent value Kin according to the following expression which corresponds to an expression of first-order lag.

$$Qac=Qacn-1 \times (1-Kvol \times Kin)+Qacn \times Kvol \times Kin$$

where the product (Kvol×Kin) of the volumetric ratio Kvol and the volumetric-efficiency equivalent value Kin means what percent of the fresh air currently induced into the induction collector can be actually drawn into the cylinder. Therefore, owing to the first-order lag, the first term {Qacn-1×(1-Kvol×Kin)} corresponds essentially to the rate of fresh air flow which will be drawn into the cylinder from within the induced fresh-air flow measured by the air-flow meter at the previous arithmetic-operation cycle (see FIG. 4), while the second term (Qacn×Kvol×Kin) corresponds essentially to the rate of fresh air flow which will be drawn into the cylinder from within the induced fresh-air flow measured by the air-flow meter at the current arithmetic-operation cycle.

As may be appreciated from the above, the induced fresh-air flow rate can be estimated accurately.

Figure 5:
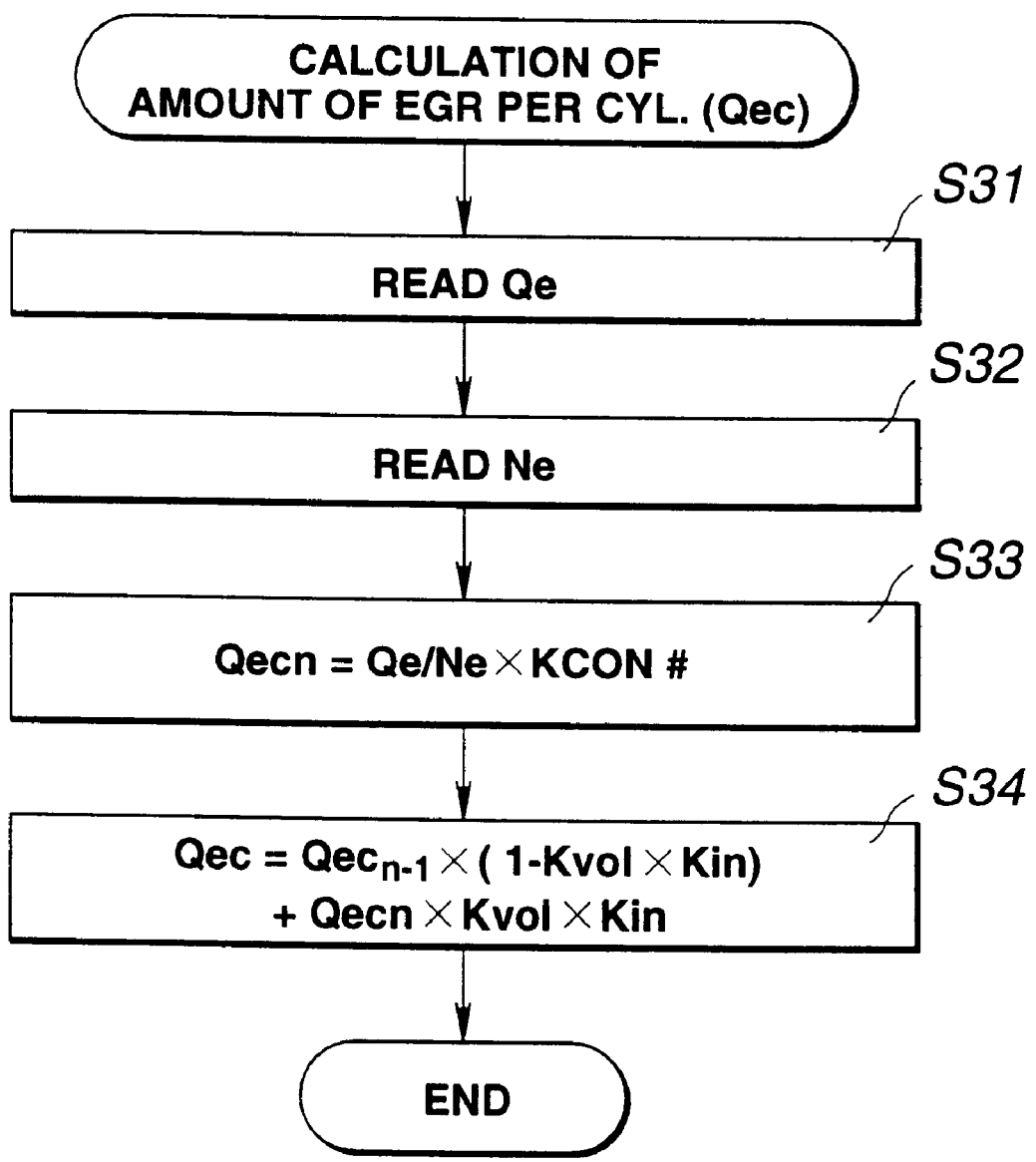
FIG. 5 is a flow chart illustrating a routine for calculation of an EGR amount (Qec) per cylinder.

During the EGR control, the EGR amount per cylinder Qec is calculated in accordance with the routine shown in FIG. 5.

In step S31, read is the flow rate Qe of exhaust gas recirculated into the induction system (into the intake manifold 4). The flow rate Qe of recirculated exhaust gas will be hereinafter referred to simply as an "EGR flow rate". As will be discussed later, the EGR flow rate Qe can be derived through another sub-routine.

In step S32, the engine speed Ne is read.

In step S33, an EGR amount per cylinder Qecn is calculated on the basis of the EGR flow rate Qe, the engine speed Ne and the predetermined constant KCON# according to the following expression.

$$Qecn=Qe/Ne \times KCON\#$$

In step S34 similar to step S27, a final EGR amount per cylinder Qec is estimated and derived from the volumetric ratio Kvol (=Vc/Vm) and the volumetric-efficiency equivalent value Kin according to the following expression.

Qec=Qecn-1×(1-Kvol×Kin)+Qecn×Kvol×Kin where the product (Kvol×Kin) means what percent of the EGR amount per cylinder currently calculated is actually drawn into the cylinder. Therefore, the first term {Qecn-1×(1-Kvol×Kin)} corresponds essentially to the rate of the EGR amount per cylinder which will be drawn into the cylinder from within the EGR amount per cylinder Qecn-1 calculated at the previous arithmetic-operation cycle (see FIG. 5), while the second term (Qecn×Kvol×Kin) corresponds essentially to the rate of the EGR amount per cylinder which will be drawn into the cylinder from within the EGR amount per cylinder Qecn calculated at the current arithmetic-operation cycle.

Figure 6:
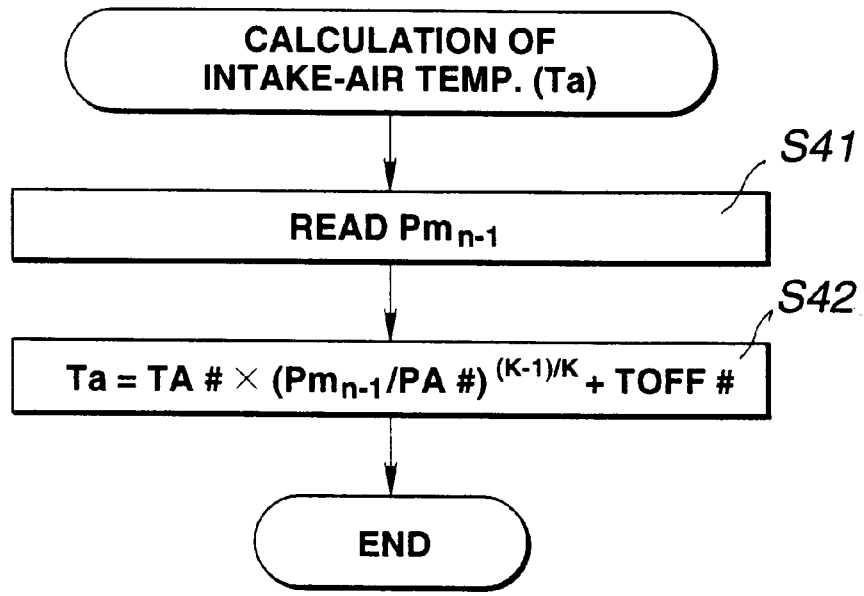
FIG. 6 is a flow chart illustrating a routine for calculation of an induced fresh-air temperature (Ta).

Referring now to FIG. 6, the induced fresh-air temperature Ta can be derived from the previous value Pmn-1 of the intake pressure. That is, in step S41, the previous value Pmn-1 of the intake pressure is read. Thereafter, in step S42, the fresh-air temperature Ta is derived from the following expression, based on the well-known law of thermodynamics (an adiabatic law).

$$Ta=TA\# \times (Pmn-1/PA\#)^{(K-1)/K}+TOFF\#$$

where TA# and PA# respectively denote a predetermined standard temperature (a predetermined constant) and a predetermined standard pressure (a predetermined constant), both being constants, K denotes a ratio of specific heats, and TOFF# denotes a temperature rise occurring due to a pressure rise in the intake pressure risen while the fresh air is drawn through the air cleaner into the induction collector. To more precisely estimate the fresh-air temperature Ta, the standard temperature TA# and the temperature rise TOFF# may be corrected by multiplying them by respective correction factors KtA and KtOFF, which are usually determined to be proportional to a rise in the water temperature Tw.

Figure 7:
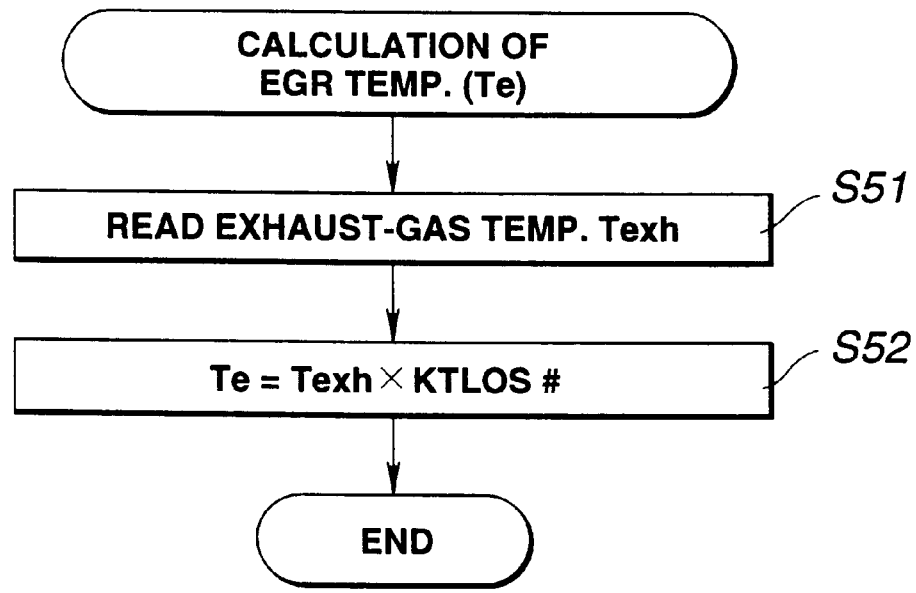
FIG. 7 is a flow chart illustrating a routine for calculation of a recirculated exhaust-gas temperature (Te).

Referring now to FIG. 7, there is shown a routine for calculation of the temperature Te of the exhaust gas recirculated into the induction-collector inlet. In step S51, read is the exhaust-gas temperature Texh which is derived by another sub-routine as will be explained later. In step S52, the EGR temperature Te is calculated in accordance with the following expression.

$$Te=Texh \times KTLOS\#$$

where KTLOS# denotes a temperature-drop factor correlated to a rate of temperature drop of the recirculated exhaust gas flowing from the exhaust manifold to the intake manifold.

Figure 8:
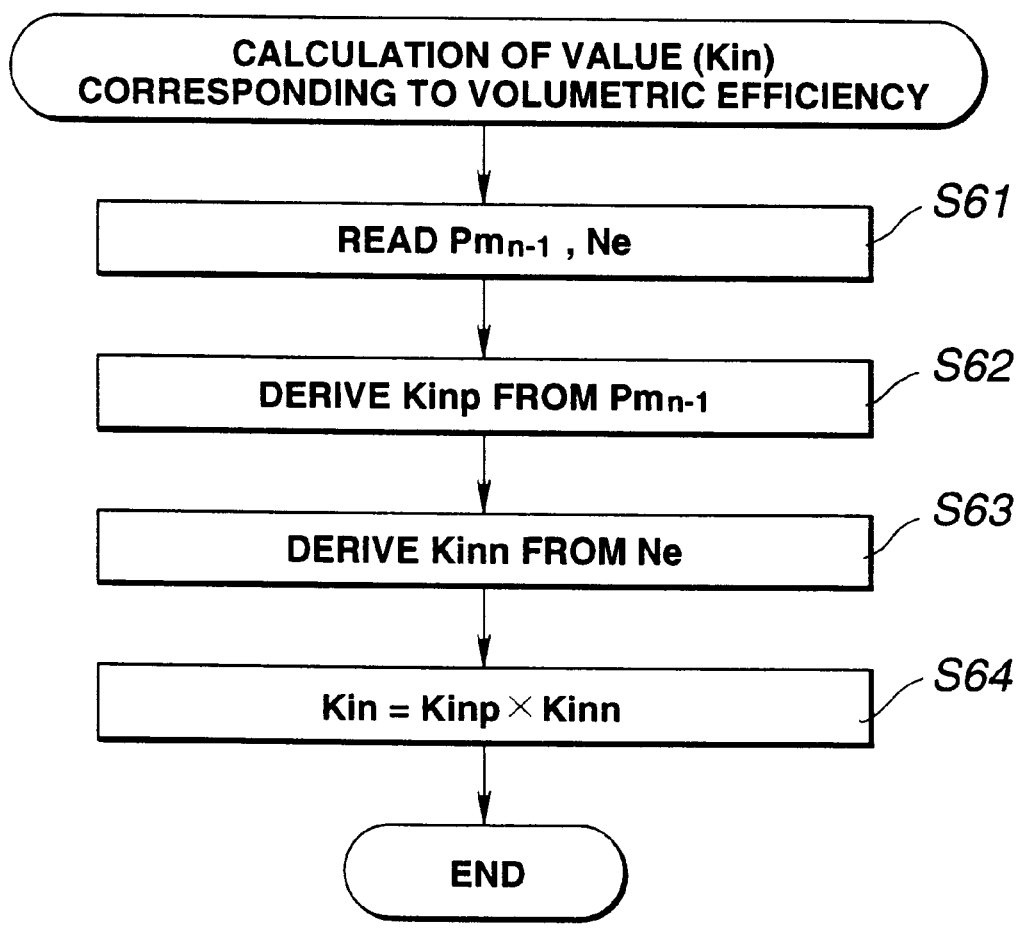
FIG. 8 is a flow chart illustrating a routine for calculation of a value (Kin) corresponding to a volumetric efficiency.
Figure 9:
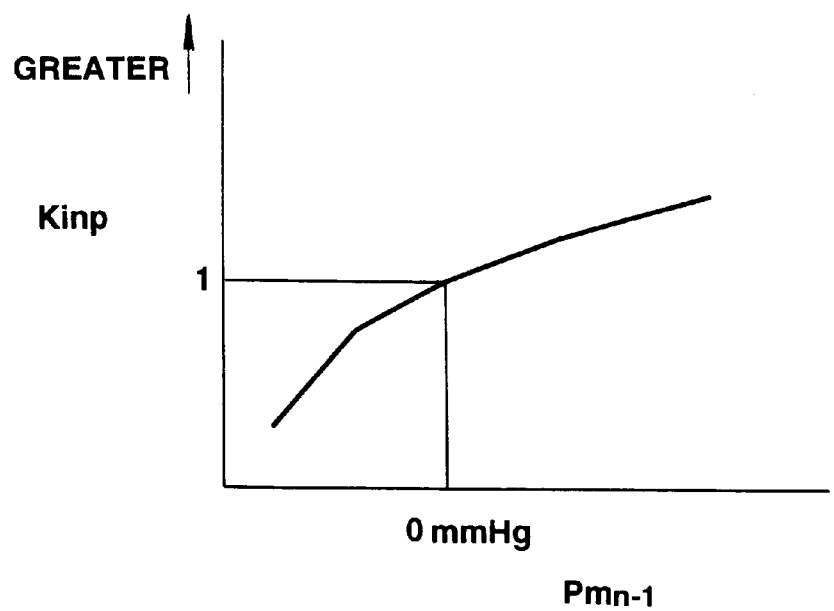
FIG. 9 is a graph illustrating the relationship between the previous value (Pmn-1) of the intake pressure and an intake-pressure dependent retrieved correction factor (Kinp).
Figure 10:
FIG. 10 is a graph illustrating the relationship between an engine speed (Ne) and an engine-speed dependent retrieved correction factor (Kinn).

Referring now to FIG. 8, there is shown a routine for calculation of the volumetric-efficiency equivalent value Kin. In step S61, read are the previous value Pmn-1 of the intake pressure and the engine speed Ne. In step S62, the intake-pressure dependent retrieved correction factor Kinp is derived from the previous value Pmn−1 of the intake pressure in accordance with the look-up table as shown in FIG. 9. In step S63, the engine-speed dependent retrieved correction factor Kinn is derived from the engine speed Ne in accordance with the look-up table as shown in FIG. 10. In step S64, the volumetric-efficiency equivalent value Kin is calculated or estimated as the product (Kinp×Kinn) of both the intake-pressure dependent retrieved correction factor Kinp and the engine-speed dependent retrieved correction factor Kinn. If the engine system employs a swirl control valve, the volumetric-efficiency equivalent value Kin may be corrected by a swirl-control-valve-opening dependent correction factor Kins which is usually determined in proportion to the opening of the swirl control valve. In this case, the volumetric-efficiency equivalent value Kin is expressed as the following equation.

$$Kin = Kinp \times Kinn \times Kins$$

Figure 11:
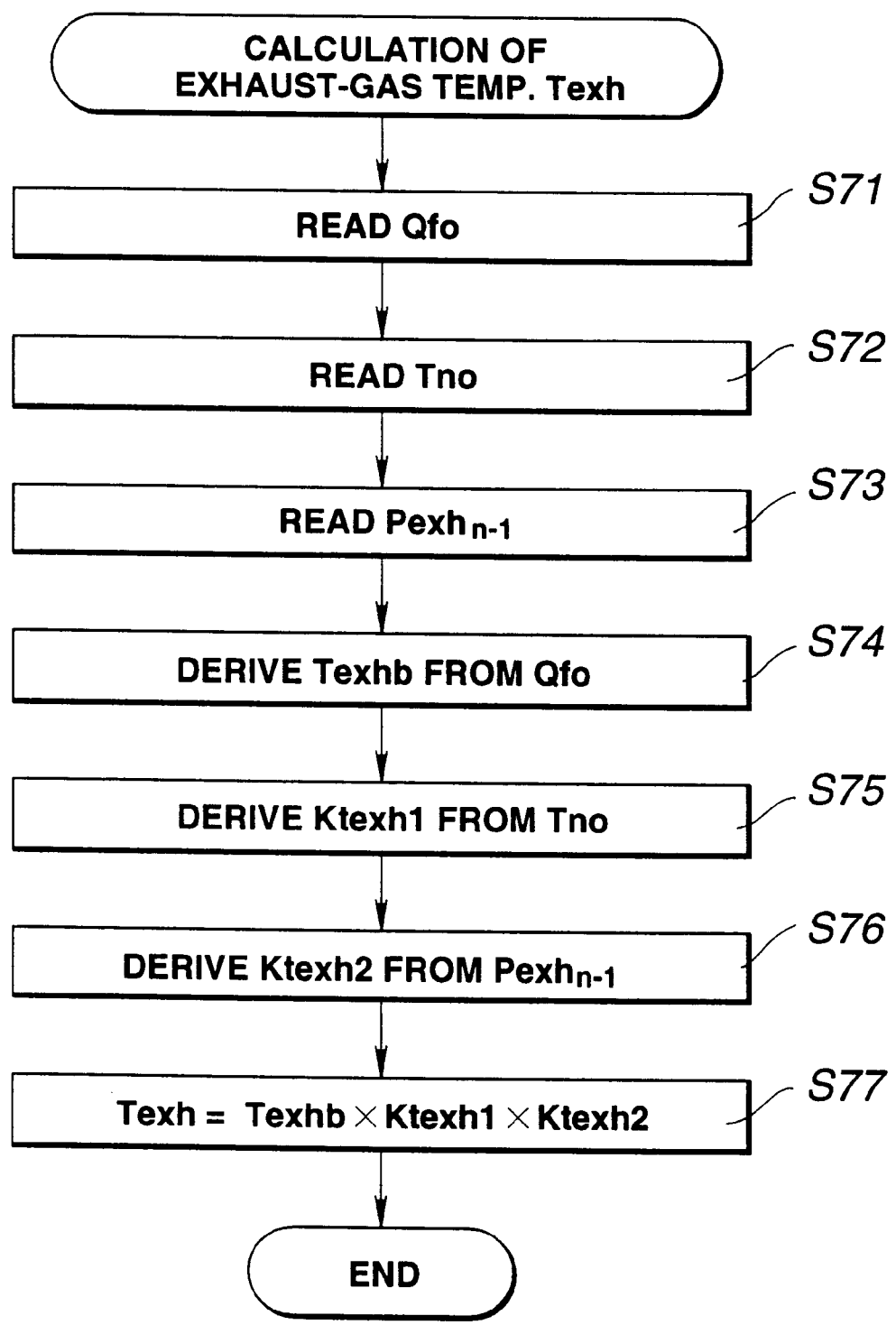
FIG. 11 is a flow chart illustrating a routine for calculation of an exhaust-gas temperature (Texh).
Figure 15:
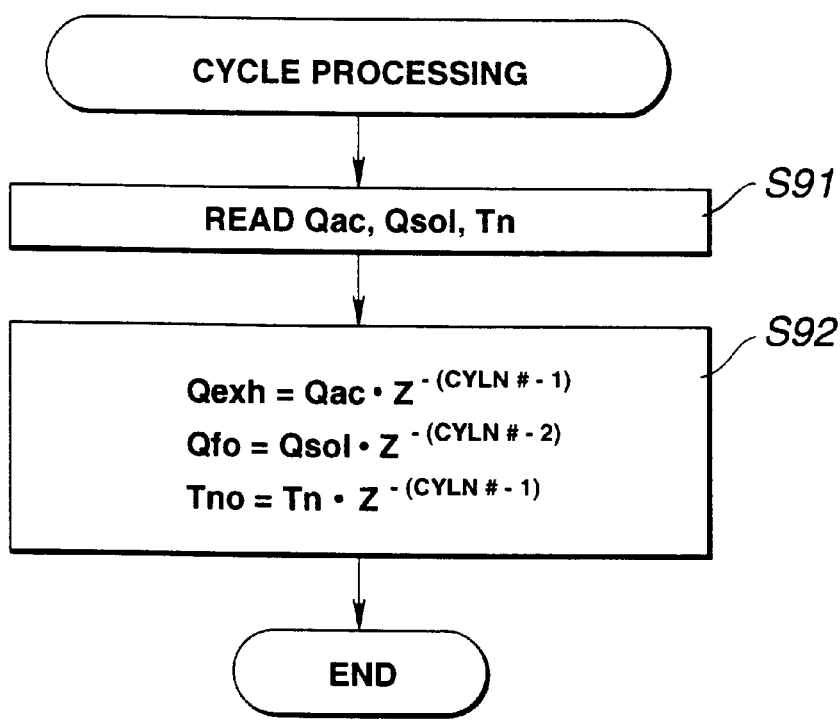
FIG. 15 is a flow chart illustrating a routine for a cycle-processing for each of an induced fresh-air flow (Qac) per cylinder, a fuel-injection amount (Qsol), and an intake-air temperature (Tn) of the mixture of fresh air (intake air) and exhaust gas delivered from the EGR control valve into the intake manifold.

Referring now to FIG. 11, there is shown a routine for calculation of the exhaust-gas temperature Texh. As may be appreciated, this arithmetic operation of FIG. 11 is unnecessary in case that an exhaust-gas temperature sensor is provided for directly sensing the temperature of the exhaust gas. For the purpose of calculating the exhaust-gas temperature Texh, two data Qfo and Tno, both obtained through a so-called cycle processing shown in FIG. 15, are used. As will be hereinafter detailed, the cycle-processing shown in FIG. 15 is similar to the delay-processing previously explained in step S26 of the flow chart shown in FIG. 4.

In step S71, a so-called cycle-processed fuel-injection amount Qfo is read. The cycle-processed fuel-injection amount Qfo can be derived in consideration of the cycle delay (the phase delay) from the time when the nozzle injects fuel on the intake stroke up to the exhaust stroke, in accordance with step S92 of FIG. 15.

In step S72, a so-called cycle-processed intake-air temperature Tno is read. Similarly to step S71, the cycle-processed intake-air temperature Tno can be derived in consideration of the cycle delay, according to step S92 of FIG. 15.

In step S73, read is the previous value Pexhn−1 of the exhaust pressure which is calculated one cycle before according to the arithmetic operation of FIG. 3.

Figure 12:
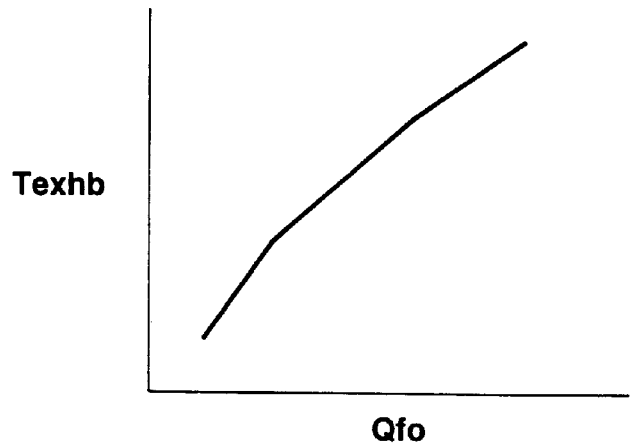
FIG. 12 is a graph illustrating the relationship between a cycle-processed fuel-injection amount (Qfo) and a basic exhaust-gas temperature (Texhb).

In step S74, a basic exhaust-gas temperature Texhb is derived or retrieved from the above-noted cycle-processed fuel-injection amount Qfo by reference to the look-up table as shown in FIG. 12.

In step S75, an intake-air temperature dependent correction factor Ktexh1 is derived from the cycle-processed intake-air temperature Tno by the following expression.

$$Ktexh1 = (Tno/TA\#)^{KN}$$

where TA# denotes the standard temperature previously discussed, and KN denotes an exponent of a ratio (Tno/TA#) of the cycle-processed intake-air temperature Tno to the standard temperature TA# and preset at a predetermined constant. The intake-air temperature dependent correction factor Ktexh1 corresponds essentially to a rate of the exhaust-gas temperature-rise occurring due to the rise in the intake-air temperature.

In step S76, an exhaust-pressure dependent correction factor Ktexh2 is derived from the previous value Pexhn−1 of the exhaust pressure by the following expression based on an well-known adiabatic law (an adiabatic change).

$$Ktexh2 = (Pexhn-1/PA\#)^{(Ke-1)/Ke}$$

where PA# denotes the standard pressure previously discussed, (Ke−1)/Ke denotes an exponent of a ratio (Pexhn−1/PA#), and Ke is preset at a predetermined constant. The exhaust-pressure dependent correction factor Ktexh2 corresponds essentially to a rate of the exhaust-gas temperature-rise occurring due to the rise in the exhaust pressure.

In step S77, the exhaust-gas temperature Texh is derived from the basic exhaust-gas temperature Texhb, the two correction factors Ktexh1 and Ktexh2, according to the following expression.

$$Texh = Texhb \times Ktexh1 \times Ktexh2$$

Figure 13:
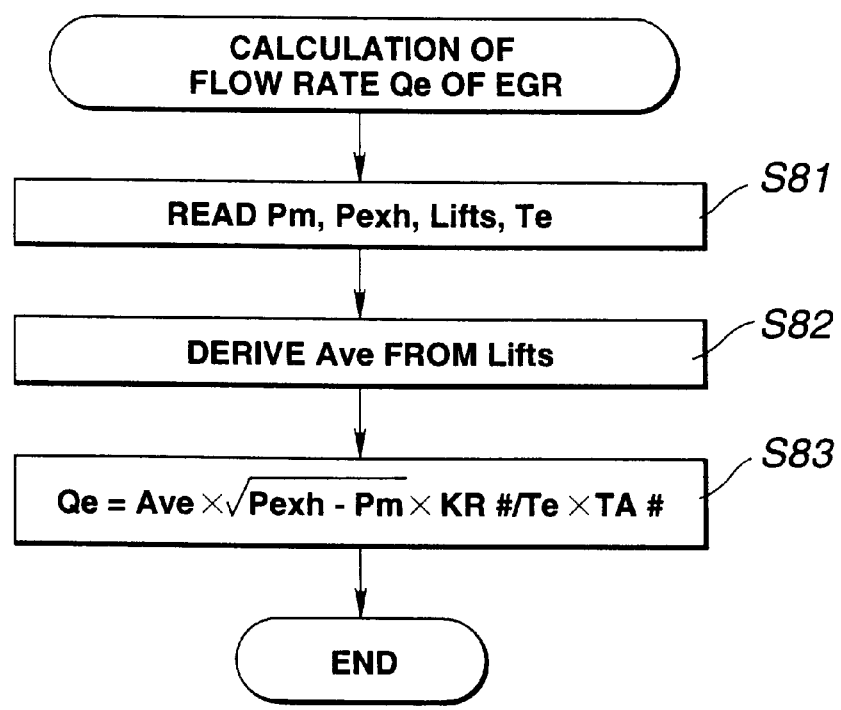
FIG. 13 is a flow chart illustrating a routine for calculation of a flow rate (Qe) of EGR.

Referring to FIG. 13, there is shown a routine for calculation of the EGR flow rate Qe. In step S81, are read the intake pressure Pm, the exhaust pressure Pexh, an actual lift (Lifts) of the EGR valve 9, and the EGR temperature Te. The actual lift Lifts is sensed by the lift sensor 34 and the sensed lift indicative signal is transferred into the input interface of the control unit 13.

Figure 14:
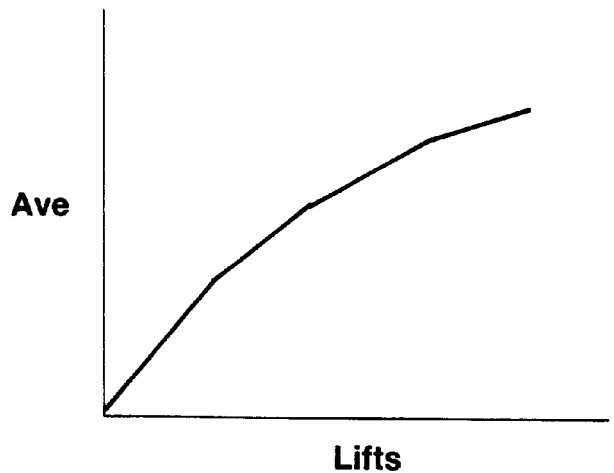
FIG. 14 is a characteristic curve illustrating the relationship between an actual lift (Lifts) of the EGR control valve and an opening area (Ave) of the EGR passage.

In step S82, an opening area (Ave) of the EGR passage or the EGR valve is retrieved from the actual lift Lifts of the EGR valve in accordance with the look-up table as shown in FIG. 14. In step S83, the EGR flow rate Qe is calculated on the basis of the four parameters Pm, Pexh, Lifts (or Ave), and Te, in accordance with the following expression.

$$Qe = Ave \times (Pexh - Pm)^{1/2} \times KR\#/Te \times TA\#$$

where KR# is a predetermined constant. As is fluid-flow velocity q is expressed as $q = (\Delta P \cdot 2\rho)^{1/2}$, where $\Delta P$ denotes a differential pressure for example between a pressure in the inlet of the EGR passage and a pressure in the outlet of the EGR passage, and $\rho$ denotes a mass density of the recirculated exhaust gas flow. The above-mentioned predetermined constant KR# is selected to be essentially equivalent to the value $(2\rho)^{1/2}$. In the previously-discussed expression, although the four parameters Pm, Pexh, Lifts (or Ave), and Te are used for deriving the EGR flow rate Qe, the parameter Te is often omitted. That is, the EGR flow rate Qe may be expressed simply as $Qe = Ave \times (Pexh - Pm)^{1/2} \times KR\#$, because the EGR flow rate Qe is slightly affected by the rise in the EGR temperature.

Referring to FIG. 15, there is shown the cycle-processing similar to the delay-processing (see step S26 of FIG. 4). In step S91, first of all, read are the induced fresh-air flow per cylinder Qac, the fuel-injection amount Qsol and the intake-air temperature Tn. In the shown embodiment, the intake-air temperature Tn is calculated in accordance with the expression $Tn = (Qac \times Ta + Qec \times Te)/(Qac + Qec)$, where Qac denotes the induced fresh-air flow per cylinder, Ta denotes the fresh-air temperature, Qec denotes the EGR amount per cylinder, and Te denotes the EGR temperature.

In step S92, the cycle-processing is executed as follows.

As per the induced fresh-air flow per cylinder Qac related to the intake stroke, for the purpose of phase matching (or cycle matching) to the exhaust stroke, the previously-noted delay-processing is executed so that the number (CYLN#−1), obtained by subtracting "1" from the number (CYLN#) of engine cylinders, is selected as a value equivalent to the phase delay of the induced fresh-air flow per cylinder Qac derived through the arithmetic-operation routine of FIG. 4. That is, the data $Qac \cdot Z^{-(CYLN\#-1)}$ which is derived through the arithmetic operation (see the flow of step S21 to step S27) of FIG. 4 before (CYLN#−1) cycles, is regarded as the displacement per cylinder Qexh exhausted from one cylinder during the exhaust stroke.

As per the fuel-injection amount Qsol related to the compression stroke, for the purpose of phase matching to the exhaust stroke, the previously-noted delay-processing is executed so that the number (CYLN#−2), obtained by subtracting "2" from the number (CYLN#) of engine cylinders, is selected as a value equivalent to the phase delay of the fuel-injection amount Qsol which amount is derived through the routine of FIG. 21 as will be explained later. That is, the data $Qsol \cdot Z^{-(CYLN\#-2)}$ which is derived through the arithmetic operation (see the flow of step S131 to step S134) of FIG. 21 before (CYLN#−2) cycles, is regarded as the cycle-processed fuel-injection amount Qfo.

As per the intake-air temperature Tn related to the intake stroke, for the purpose of phase matching to the exhaust stroke, the previously-noted delay-processing is executed so that the number (CYLN#−1), obtained by subtracting "1" from the number (CYLN#) of engine cylinders, is selected as a value equivalent to the phase delay of the intake-air temperature Tn derived through step 91 of FIG. 15. That is, the data $Tn \cdot Z^{-(CYLN\#-1)}$ which is derived through the arithmetic operation of FIG. 15 before (CYLN#−1) cycles, is regarded as the cycle-processed intake-air temperature Tno.

Figure 16:
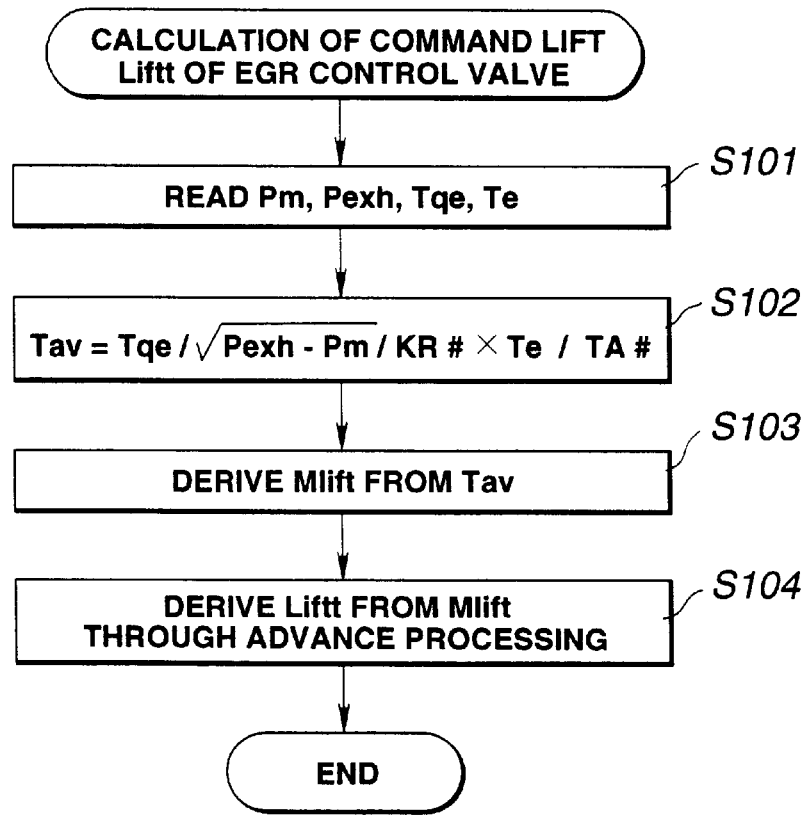
FIG. 16 is a flow chart illustrating a routine for calculation of a command lift (Liftt) of the EGR control valve.
Figure 17:
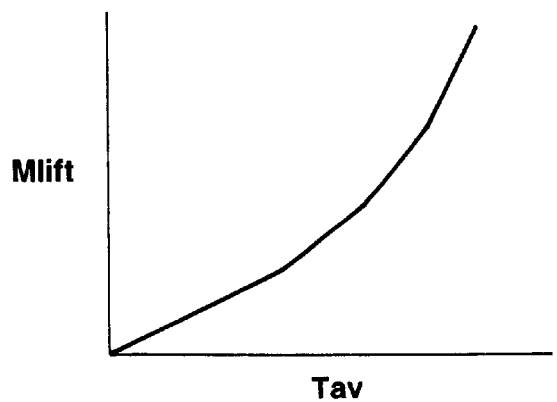
FIG. 17 is a characteristic curve illustrating the relationship between a required flow-passage area (Tav) and a target lift (Mlift).
Figure 18:
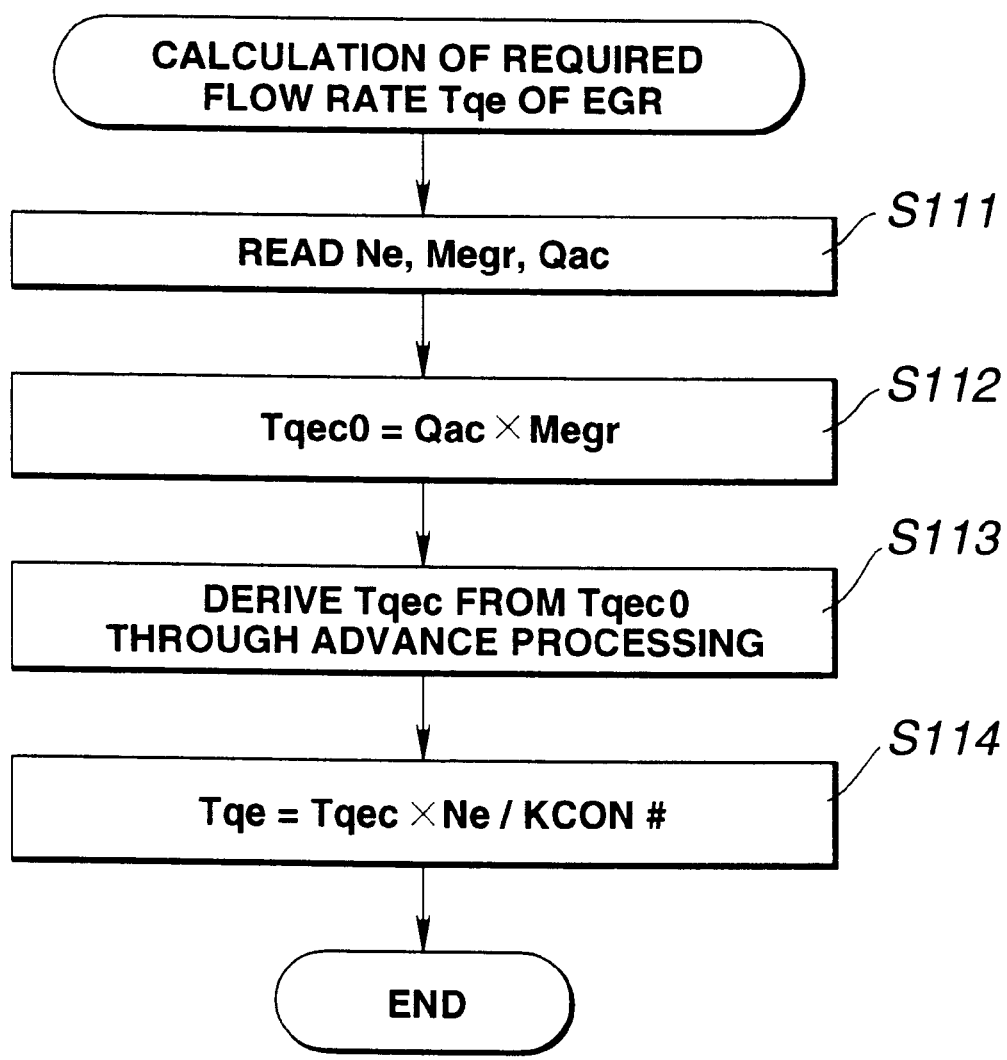
FIG. 18 is a flow chart illustrating a routine for calculation of a required flow rate (Tqe) of EGR.

Referring now to FIGS. 16 to 18, there is shown an EGR control executed by the system of the first embodiment. A command lift Liftt of the EGR valve 9 is calculated according to the routine shown in FIG. 16. In step S101, read are the intake pressure Pm, the exhaust pressure Pexh, a required EGR flow rate Tqe, and the EGR temperature Te. In step S102, a required fluid-flow passage area Tav defined by the EGR valve 9 is calculated as a function of the four parameters Pm, Pexh, Tqe and Te, as follows.

$$Tav = Tqe/(Pexh-Pm)^{1/2}/KR\# \times Te/TA\#$$

where KR# and TA# are predetermined constants as previously discussed. As already explained in step S83 of FIG. 13, the parameter Te may be omitted. In this case, the required fluid-flow passage Tav is expressed simply as $Tav=Tqe/(Pexh-Pm)^{1/2}/KR\#$.

In step S103, a target lift Mlift of the EGR valve is derived or retrieved from the required fluid-flow passage Tav in accordance with the look-up table as shown in FIG. 17.

In step S104, a so-called advance processing or lead processing (as will be hereinbelow explained in detail with respect to the sub-routine shown in FIG. 23) is made to the target lift Mlift in consideration of the delay in actuating timing of the EGR valve. The advance-processed target lift Mlift is regarded as the command lift Liftt, and then a control signal equivalent to the command lift Liftt is output from the control unit 13 to the duty-cycle controlled electromagnetic valve 12.

Referring to FIG. 18, there is shown a routine for calculation of the required EGR flow rate Tqe. In step S111, read are the engine speed Ne, a target EGR rate Megr, and the induced fresh-air flow per cylinder Qac. In step S112, a target EGR amount Tqec0 is derived as the product (Qac× Megr) of the induced fresh-air flow per cylinder Qac and the target EGR rate Megr. In step S113, to derive a command EGR amount Tqec, a so-called advance processing is made to the target EGR amount Tqec0 derived in step S112, in consideration of the volumetric capacity in the induction system from the EGR control valve to the inlet of the engine cylinder and the volumetric capacity of the cylinder. The detail of the advance processing will be discussed later with respect to the flow chart of FIG. 24. In step S114, the required EGR flow rate Tqe is derived as a function of the command EGR amount Tqec and the engine speed Ne, according to the following expression.

$$Tqe = Tqec \times Ne/KCON\#$$

where KCON# is the same predetermined constant as discussed in step S25 of FIG. 4 and in step S33 of FIG. 5.

Figure 19:
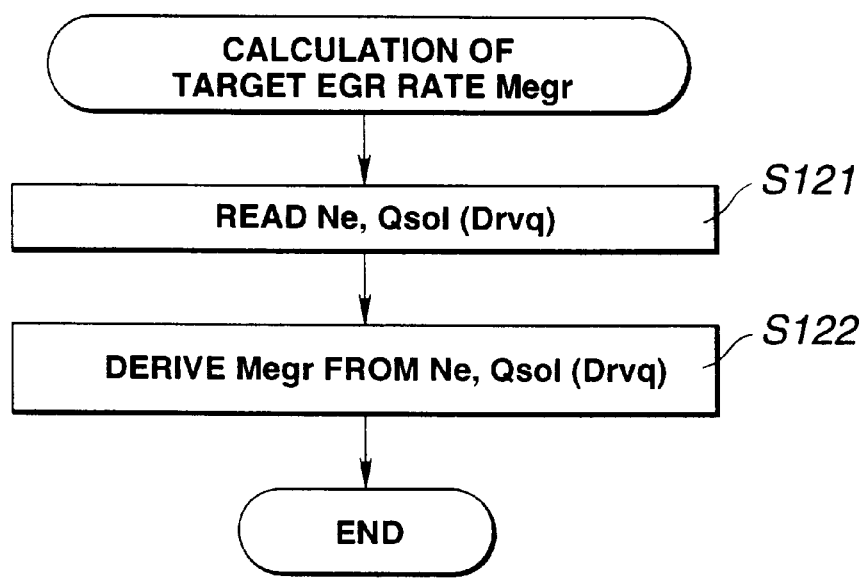
FIG. 19 is a flow chart illustrating a routine for calculation of a target EGR rate (Megr).
Figure 20:
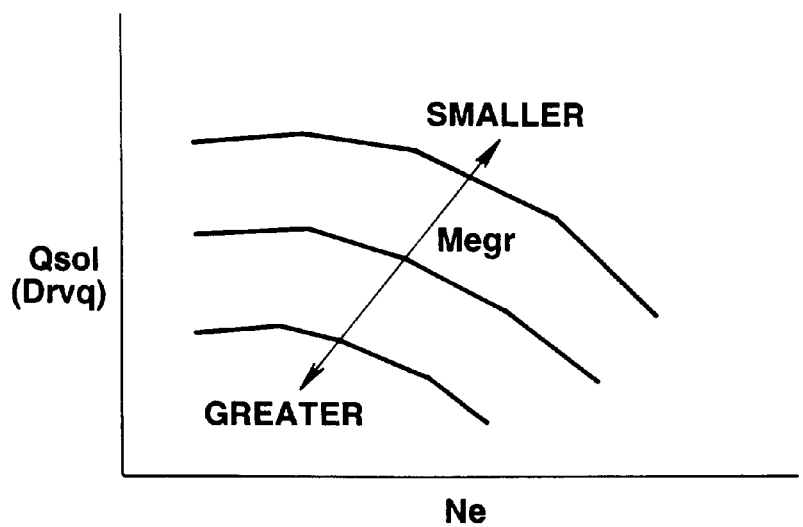
FIG. 20 is a look-up table illustrating the relationship among the engine speed (Ne), the fuel-injection amount (Qsol), and the target EGR rate (Megr).

Referring to FIG. 19, there is shown a routine for calculation of the EGR rate Megr. In step S121, read are the engine speed Ne and the fuel-injection amount Qsol. In step S122, the target EGR rate Megr is retrieved from both the engine speed Ne and the fuel-injection amount Qsol, which injection amount is substantially representative of the engine load, by reference to the look-up table as shown in FIG. 20.

Figure 21:
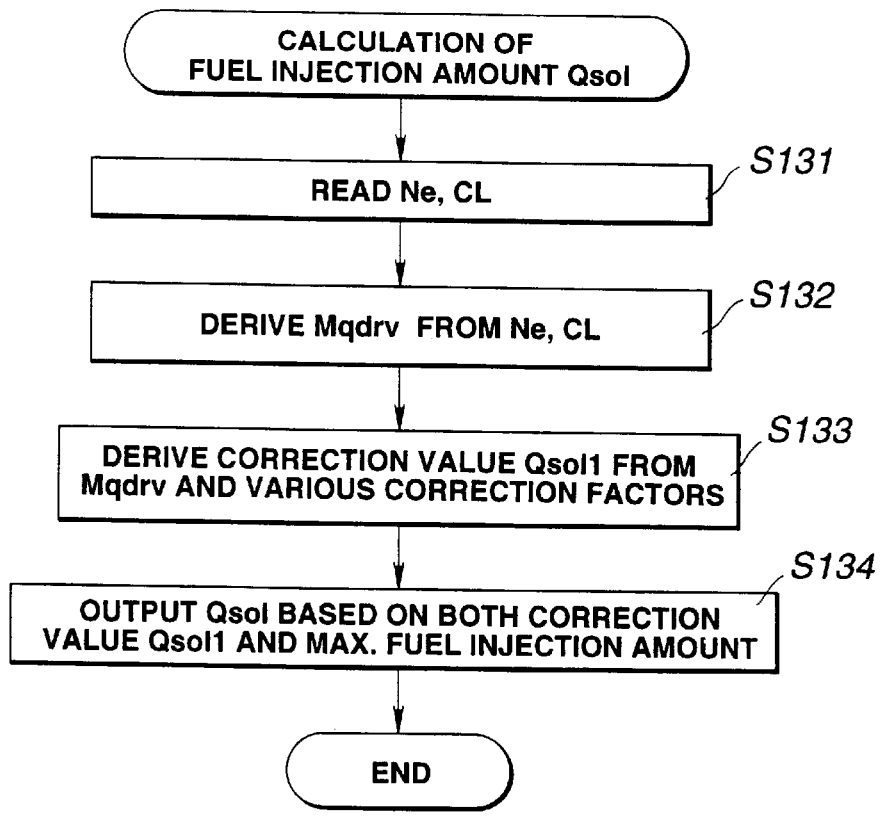
FIG. 21 is a flow chart illustrating a routine for calculation of the fuel-injection amount (Qsol).
Figure 22:
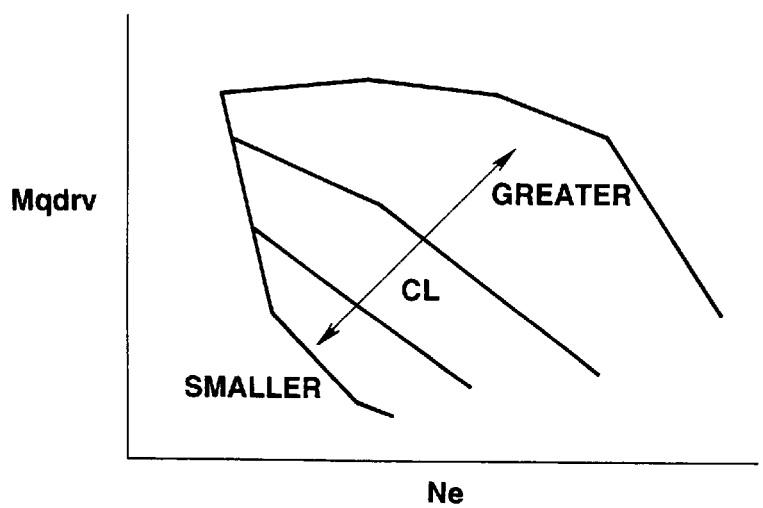
FIG. 22 is a look-up table illustrating the relationship among the engine speed (Ne), a control-lever opening (CL), and a basic fuel-injection amount (Mqdrv).

Referring to FIG. 21, there is shown a routine for calculation of the fuel-injection amount Qsol. In step S131, read are the engine speed Ne and the control-lever opening CL of the injection pump 7. In step S132, a basic fuel-injection amount Mqdrv is retrieved from both the engine speed Ne and the control-lever opening CL, according to the look-up table as shown in FIG. 22. In step S133, the basic fuel-injection amount Mqdrv is corrected by various correction factors such as a water-temperature dependent correction factor and the like, to produce a corrected fuel-injection amount Qsol1. In step S134, in the event that the corrected fuel-injection amount Qsol1 exceeds an upper limit (a given maximum fuel-injection amount Qful as calculated through another sub-routine shown in FIG. 50), the corrected fuel-injection amount Qsol1 is replaced with the upper limit to keep the actual output value of the fuel-injection amount Qsol within the upper limit. When the corrected fuel-injection amount Qsol1 is below the upper limit, the corrected fuel-injection amount Qsol1 is regarded as the actual output value of the injection amount Qsol.

Figure 23:
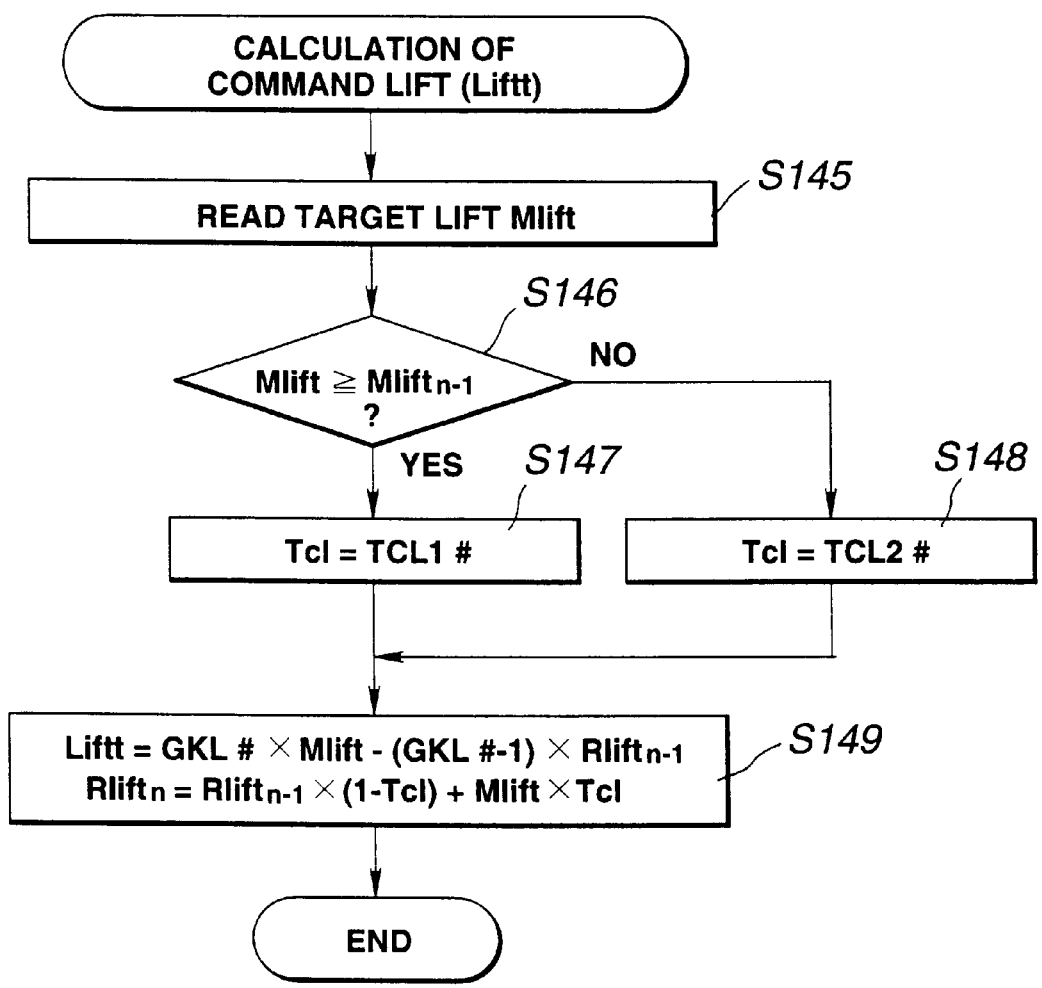
FIG. 23 is a flow chart illustrating a routine for calculation of the command lift (Liftt) of the EGR control valve.

FIG. 23 shows the advance processing (see step S104 of FIG. 16) necessary to derive the command lift Liftt for the EGR valve from the target lift Mlift. In step S145, read is the target lift Mlift derived through step S103. In step S146, a test is made to determine whether the current value Mliftn of the target lift Mlift is greater than or equal to the previous value Mliftn−1 of the target lift. The current value Mliftn of the target lift will be hereinafter abbreviated simply as "Mlift". When the answer to step S146 is affirmative (YES), step S147 proceeds in which a time constant Tcl is set at a first predetermined time constant TCL1# corresponding to a time constant or a lag coefficient in case that the valve lift of the EGR valve 9 increases. When the answer to step S146 is negative (NO), step S148 proceeds in which the time constant Tcl is set at a second predetermined time constant TCL2# corresponding to a time constant or a lag coefficient in case that the valve lift decreases. In step S149, on the basis of the current target lift Mlift and the time constant Tcl obtained through step S147 or S148, a time-constant dependent function Rlift is expressed as Rliftn=Rliftn−1×(1−Tcl)+ Mlift×Tcl, where Rliftn denotes the current value of the function Rlift, Rliftn−1 denotes the previous value of the function Rlift, and Tcl is the selected time constant. The command lift Liftt is derived from both the current target lift Mlift and the previous value Rliftn−1 of the function Rlift, according to the following expression.

$$Liftt = GKL\# \times Mlift - (GKL\#-1) \times Rliftn-1$$

where GKL# is an advance-processing gain (a predetermined constant).

Figure 24:
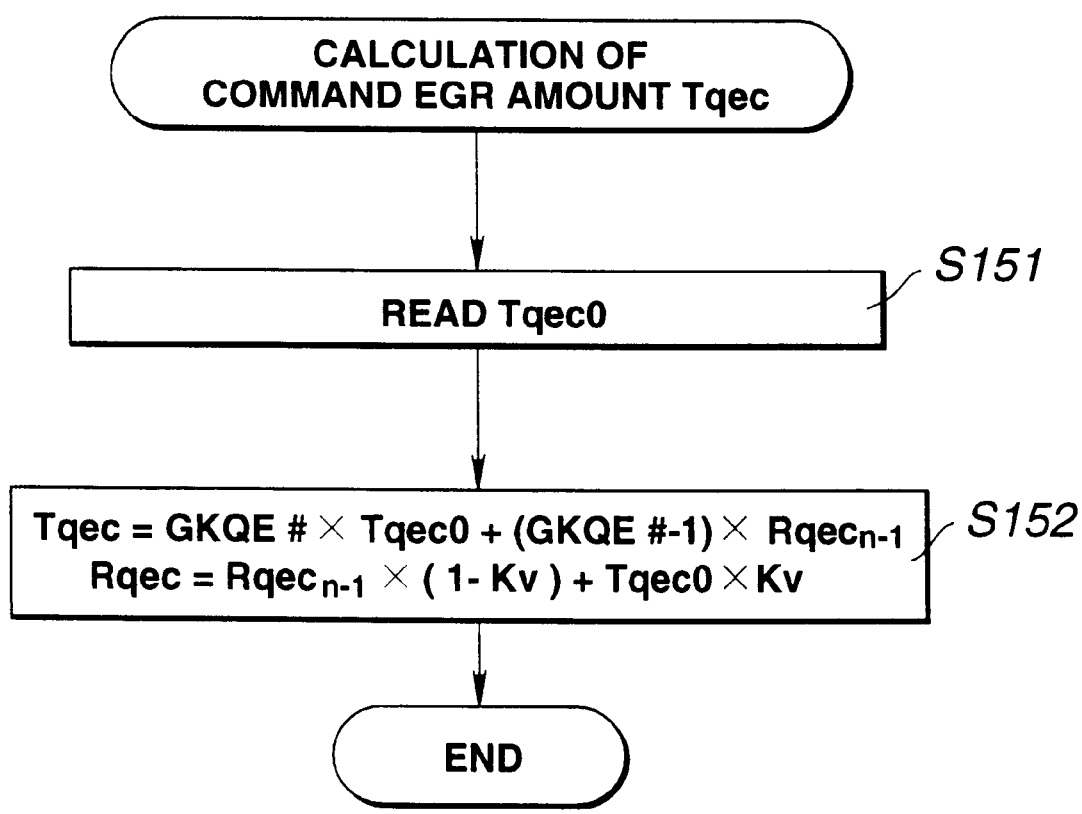
FIG. 24 is a flow chart illustrating a routine for calculation of a command EGR amount (Tqec).

Referring to FIG. 24, there is shown the advance processing (see step S113 of FIG. 18) necessary to derive the command EGR amount Tqec. In step S151, read is the target EGR amount Tqec0 (=Qac×Megr) derived through step S112 of FIG. 18. In step S152, on the basis of the current target EGR amount Tqec0 and a predetermined correction factor (a constant) Kv, a volumetric-efficiency dependent function Rqec is expressed as Rqec (=Rqecn)=Rqecn−1× (1−Kv)+Tqec0×Kv, where Rqecn denotes the current value of the function Rqec, Rqecn−1 denotes the previous value of the function Rqec, and the correction factor Kv is expressed as Kv=Kin×Vc/Vm/CYLN# (=Kin×Kvol/CYLN#). In this case, the product (Kin×Kvol) represents a percentage of the EGR amount which will be actually drawn into the cylinder. That is to say, the correction factor corresponds to a predetermined lag coefficient. The character CYLN# denotes the number of engine cylinders. The command EGR amount Tqec is derived from both the current target EGR amount Tqec0 and the previous value Rqecn−1 of the function Rqec, according to the following expression.

$$Tqec=GKQE\#\times Tqec0+(GKQE\#-1)\cdot Rqecn\times 1$$

where GKQE# means an advance-processing gain constant (a predetermined constant).

As will be appreciated from the above, the induced fresh-air flow per cylinder Qac is precisely estimated in consideration of the first-order lag on the basis of the fresh-air flow rate indicative signal Qo from the air-flow meter 16, and the target EGR amount Tqec0 is calculated as a function of the induced fresh-air flow per cylinder Qac and the target EGR rate Megr based on both the engine speed Ne and the fuel-injection amount Qsol, and in consideration of both the volumetric capacity in the induction system from the EGR valve to the inlet of the cylinder and the volumetric capacity of the cylinder the advance-processed target EGR amount Tqec0 is updated as the command EGR amount Tqec. Additionally, the required fluid-flow area Tav for the EGR passage or the EGR valve is properly determined depending on the differential pressure (Pexh−Pm) between the exhaust pressure and the intake pressure as well as the required EGR flow rate Tqe, and the target lift Mlift of the EGR valve is derived from the required fluid-flow area, and thereafter the advance-processing is made to the target lift Mlift in consideration of the delay in actuating timing of the EGR valve, and finally the advance-processed target lift Mlift is updated as the command lift Liftt (the actual duty-cycle signal value to be output to the valve 12) for the EGR valve. That is, the target EGR amount is determined depending on the induced fresh-air flow rate as well as the target EGR rate. The induced fresh-air flow rate (the flow rate per cylinder Qac) based on the measured value of the air-flow meter 16 varies in response to the change in the density of the induced fresh air, while the EGR rate Megr based on the engine speed Ne and the engine load (the fuel-injection amount Qsol) is not influenced by the change in air density. Thus, the target EGR amount can be effectively optimized in response to the environmental change (the change in air density). Although there is a response delay (a phase delay between the recirculated exhaust-gas flow passing through the EGR valve and the recirculated exhaust-gas flow actually drawn into the inlet of the engine cylinder) owing to a dynamic characteristic of the recirculated exhaust gas from the EGR valve to the cylinder inlet particularly in a transition state such as during hard acceleration, a command EGR amount is derived from the target EGR amount through an advance processing reflecting the dynamic characteristic and thus the system prevents the response delay from producing a bad influence on the EGR control. The time constant often called lag coefficient is determined depending on the volumetric capacity in the induction system from the EGR control valve to the engine-cylinder inlet and the volumetric capacity of the cylinder, and thus the advance processing effectively compensates the phase delay. Accordingly, the system of the first embodiment can provide a high-precision EGR control as previously explained and thus ensure an optimal exhaust emission control. So, harmful exhaust emissions such as NOx emissions, particulates, and the like, are effectively reduced by virtue of the optimal EGR control of the system of the first embodiment, even in case of the transition state of the vehicle driving such as in a transition from a constant-speed driving to a hard acceleration, or in the presence of a remarkable change in air density, occurring due to the environmental change from low-land driving to high-land driving.

Briefly speaking, according to the system of the first embodiment, firstly a first target EGR amount which is intended to be drawn into the cylinder is set, and secondly the time constant of the dynamic characteristics of the recirculated exhaust gas, flowing from the EGR valve through the EGR passage to the engine cylinder, is estimated on the basis of the estimated volumetric efficiency (the volumetric-efficiency equivalent value Kin) based on at least the engine speed Ne. Thirdly, a second target EGR amount which is intended to be passed through the EGR valve is arithmetically derived through a first advance processing reflecting the estimated time constant. Thereafter, the target lift Mlift for the EGR valve is estimated based on the second target EGR amount. In the first embodiment, a second advance processing reflecting the delay in actuating timing of the EGR valve is made to the target lift Mlift to derive the command lift Liftt. As regards the first advance processing, assuming that the time constant of the dynamic characteristics of the recirculated exhaust-gas flow is represented as $\tau a$, the second target EGR amount $M_2Qe$ is expressed as the following Laplace-transformation operation expression (1).

$$M_2Qe=\{(1+G\cdot \tau a\cdot s)/(1+\tau a\cdot s)\}\cdot MQce \quad (1)$$

where $M_2Qe$ (kg/stroke) denotes the second target EGR amount which is intended to be passed through the EGR valve, G denotes a predetermined advance-processing gain, $\tau a$ (sec) denotes the time constant indicative of dynamic characteristics of the recirculated exhaust gas, flowing from the EGR valve through the EGR passage to the engine cylinder, s denotes a Laplace operator (Laplacian), and MQce (kg/stroke) denotes the first target EGR amount which is intended to be drawn into the engine cylinder. As a result of the above Laplace-transformation operation expression (1), an actual EGR amount Qce which will be actually drawn into the cylinder, is expressed as the following approximate expression (2) on the assumption that the above-noted second target EGR amount $M_2Qe$ is equal to the EGR amount actually passing through the EGR valve.

$$Qce=\{(1+G\cdot \tau a)/(1+\tau a)^2\}\cdot MQce \quad (2)$$

Figure 25:
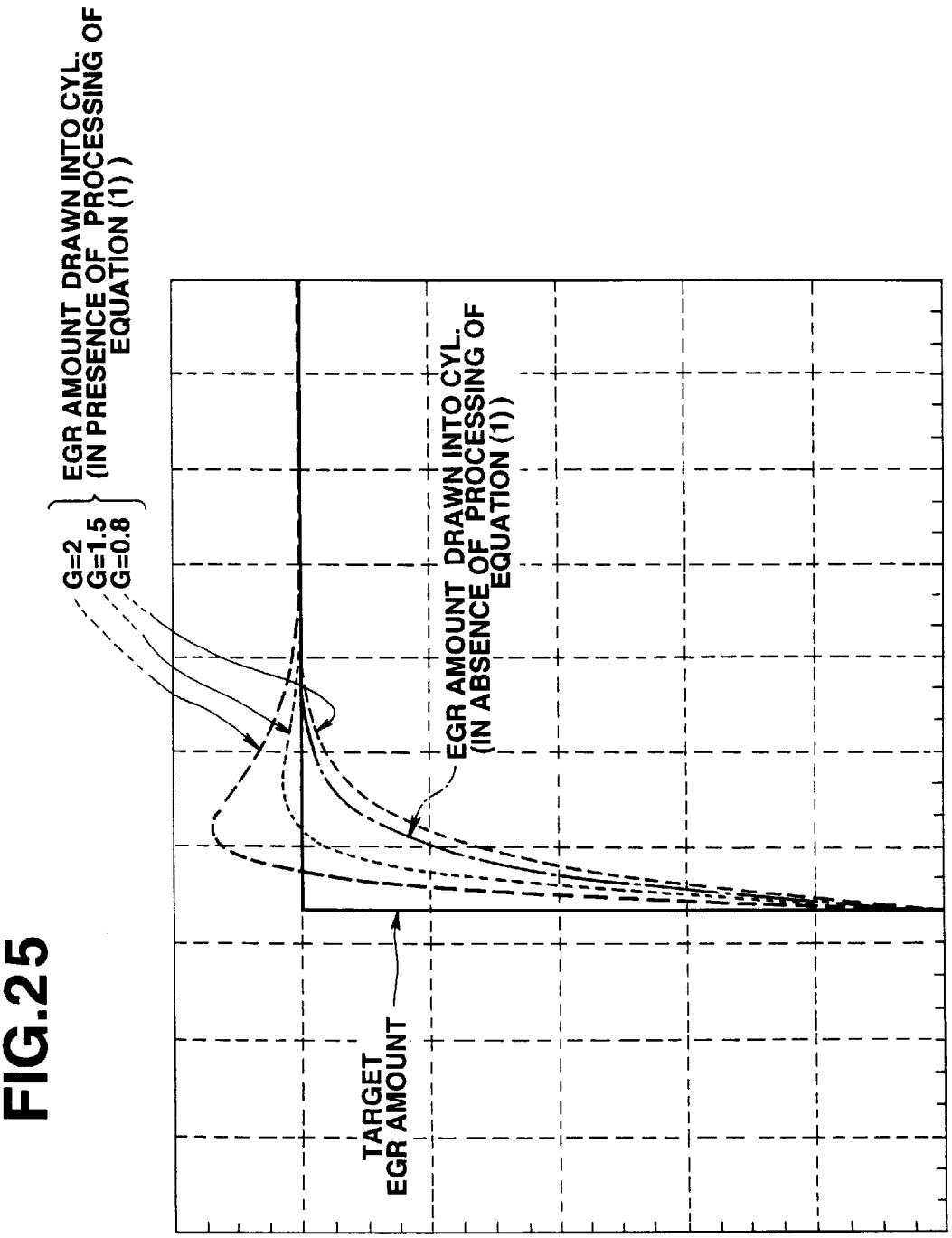
FIG. 25 is a step-response characteristic curve illustrating simulation results of the EGR control system included in the emission control system of the first embodiment.

As may be appreciated from the expressions (1) and (2), there is a possibility that the actual EGR amount Qce overshoots the first target EGR amount MQce, depending on the magnitude of the advance-processing gain G. Supposing the excessively less gain G is selected in order to reduce such an overshoot, the responsibility of the EGR control may be deteriorated. FIG. 25 shows simulation results of the actual EGR amount Qce when a so-called step input is applied as the first target EGR amount MQce in a conventional step-response method, in the presence of the advance-processing of the expression (1) at various gains such as 2, 1.5 and 0.8 and in the absence of the processing of the expression (1). As can be appreciated from the simulation results of FIG. 25, in the presence of the processing of the expression (1), there is a tendency for the overshoot to occur at a gain G (for example G=2, G=1.5) above "1", while there is a tendency for the responsibility of the EGR control to deteriorate at a gain (for example G=0.8) below "1". To eliminate the above-noted points, FIG. 26 shows a further improved system (a modification) of the first embodiment.

Figure 26:
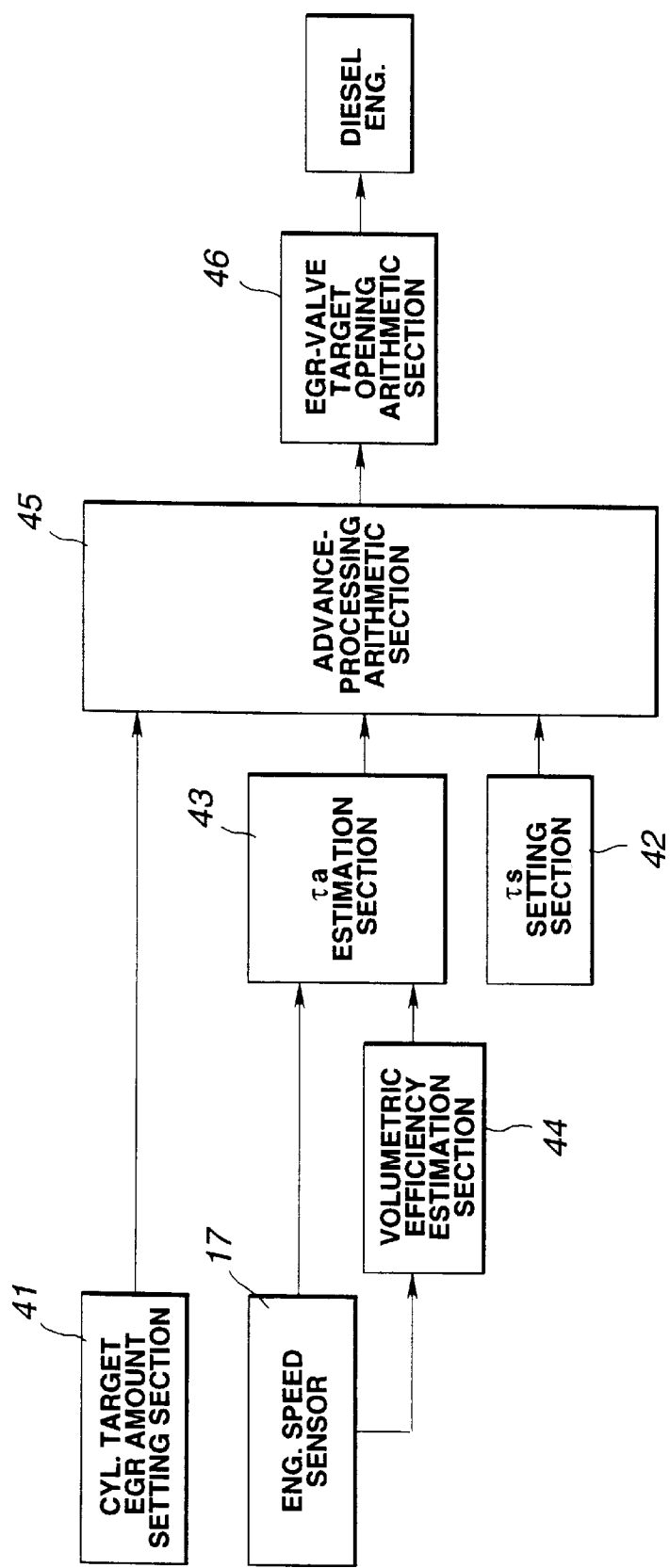
FIG. 26 is a block diagram illustrating a modification of the automotive emission control system of the invention.
Figure 27:
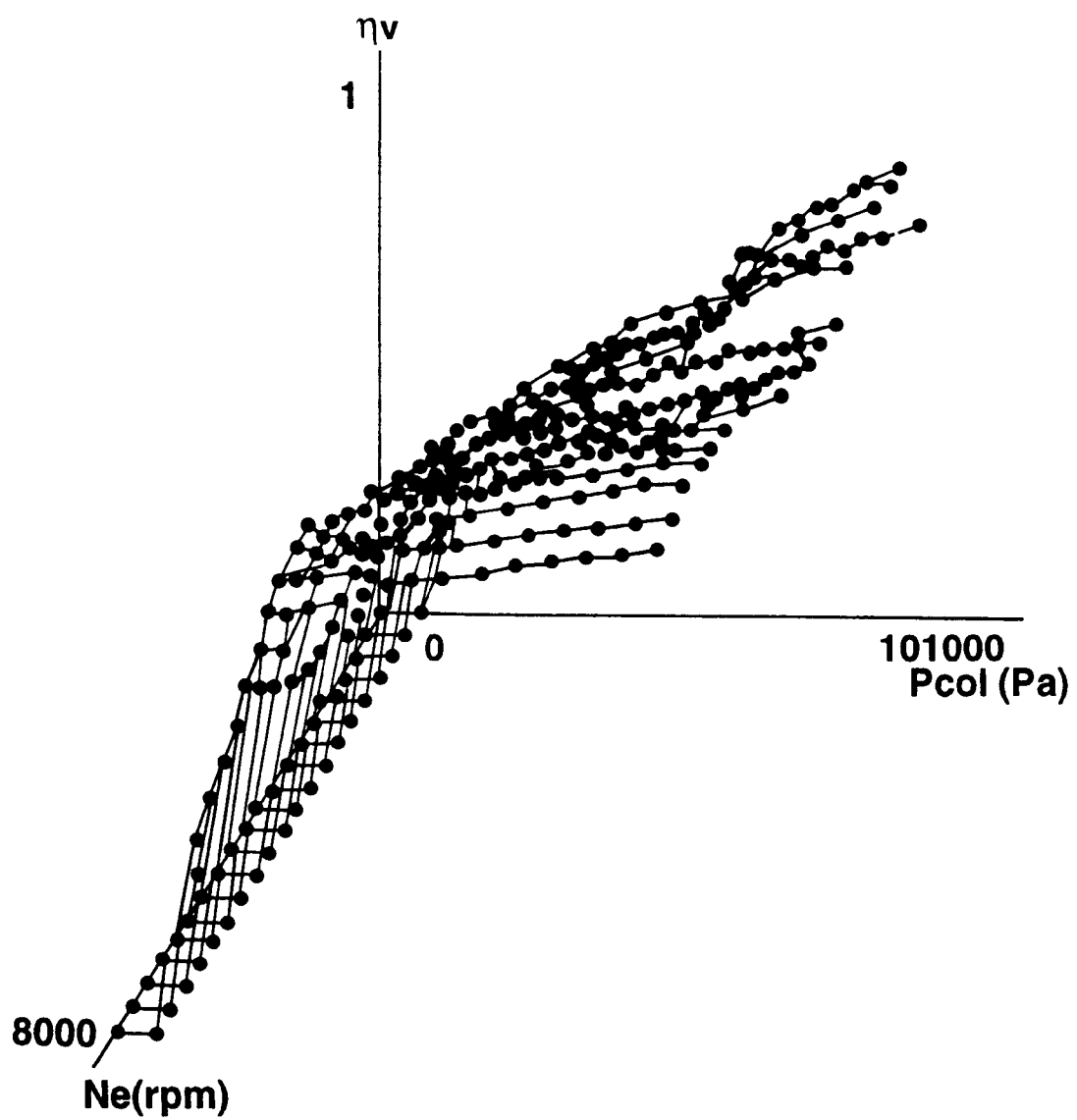
FIG. 27 is a data map used to set the volumetric efficiency (ηv) based on both the engine speed (Ne) and an induction-collector internal-pressure (Pcol).

Referring now to FIG. 26, there is shown the system diagram of the further improved EGR control system. The system of FIG. 26 includes a target EGR amount per cylinder setting section 41, a response-characteristic time constant $\tau s$ setting section 42, a dynamic-characteristic time constant $\tau a$ estimation section 43, a volumetric-efficiency estimation section 44, an advance-processing arithmetic operation section 45, and a target EGR-valve-opening arithmetic operation section 46. The target EGR amount per cylinder setting section 41 acts to set the first target EGR amount MQce. The response-characteristic time constant $\tau s$ setting section 42 functions to set a response characteristic (a time constant $\tau s$) between the first target EGR amount MQce and the actual EGR amount Qce. The dynamic-characteristic time constant $\tau a$ estimation section 43 functions to estimate a dynamic characteristic (a time constant $\tau a$) from the time when the recirculated exhaust gas flow passes through the EGR control valve to the time when the recirculated exhaust gas flow is drawn into the inlet of the engine cylinder, on the basis of both the engine speed Ne detected by the sensor 17 and a volumetric efficiency which efficiency is estimated by the volumetric-efficiency estimation section 44. The advance-processing arithmetic operation section 45 functions to calculate the second target EGR amount (the advance-processed target EGR amount) $M_2Qe$ from the first target EGR amount MQce through the advance processing based on the dynamic characteristic (the time constant $\tau a$) estimated by the dynamic-characteristic time constant $\tau a$ estimation section 43 so that the response characteristic (the time constant $\tau s$) set by the setting section 42 is reached. The target EGR-valve-opening arithmetic operation section 46 derives a target EGR valve opening or a target fluid-flow passage area (correlated to a target lift of the EGR valve) from the second target EGR amount $M_2Qe$. The volumetric-efficiency estimation section 44 estimates a volumetric efficiency $\eta v$ from both the engine speed Ne and the collector internal-pressure Pcol. Actually, the volumetric efficiency $\eta v$ is retrieved from the engine speed Ne and the collector internal-pressure Pcol in accordance with the experimentally determined data map as shown in FIG. 27. For instance in case of a four-cylinder diesel engine, the system of the modification shown in FIG. 26 operates as follows.

In the system of the modification, the dynamic-characteristic time constant $\tau a$ estimation section 43 estimates a dynamic characteristic (a time constant $\tau a$) from the engine speed Ne and the estimated volumetric efficiency $\eta v$, whereas the response-characteristic time constant $\tau s$ setting section 42 sets a response characteristic (a time constant $\tau s$) such that the response-characteristic time constant $\tau s$ is a positive number less than the dynamic-characteristic time constant $\tau a$ (see the following inequality).

$$0<\tau s<\tau a \qquad (3)$$

The advance-processing arithmetic operation section 45 of the system shown in FIG. 26 calculates the advance-processed target EGR amount (the second target EGR amount $M_2Qe$) in accordance with the following Laplace-transformation operation expression (4), using the response-characteristic time constant $\tau s$, the dynamic-characteristic time constant $\tau a$, and the first target EGR amount MQce.

$$M_2Qe=\{(1+\tau a \cdot s)/(1+\tau s \cdot s)\}\cdot MQce \qquad (4)$$

where s denotes a Laplace operator.

As a result of the above Laplace-transformation operation expression (4), an actual EGR amount Qce which will be actually drawn into the cylinder, is expressed as the following approximate expression (5) on the assumption that the above-noted second target EGR amount $M_2Qe$ is equal to the EGR amount Qce actually passing through the EGR valve.

$$Qce=\{1/(1+\tau s \cdot s)\}\cdot MQce \qquad (5)$$

Figure 28:
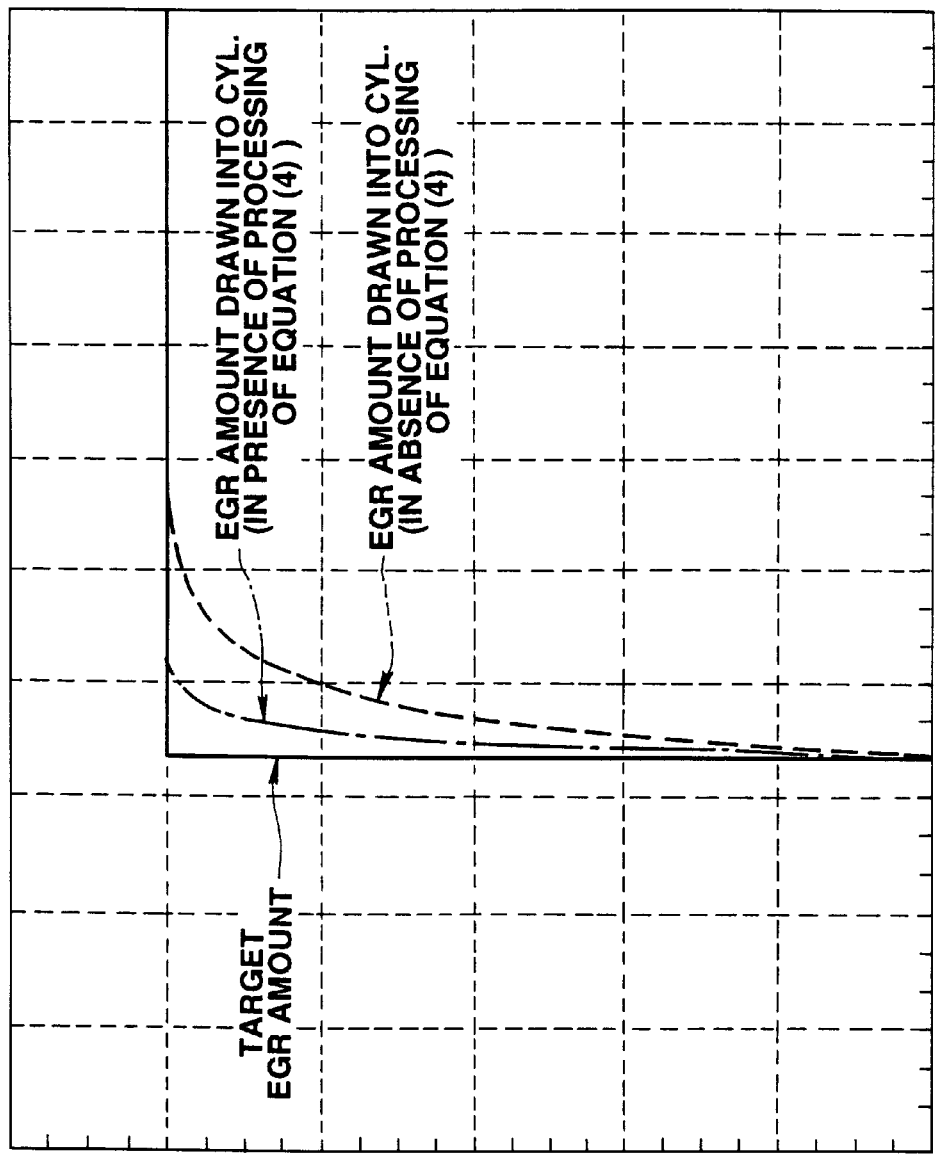
FIG. 28 is a step-response characteristic curve illustrating simulation results of the EGR control system included in the emission control system of the modification shown in FIG. 26.

FIG. 28 shows simulation results of the actual EGR amount Qce when a so-called step input is applied as the first target EGR amount MQce, in the presence of the advance-processing of the expression (4) with the time constant $\tau s$ set at 0.05 sec and the time constant $\tau s$ set at 0.13 sec and in the absence of the processing of the expression (4). As can be appreciated from the simulation results of FIG. 28, in the presence of the processing of the expression (4), the responsibility of the EGR control is enhanced. As appreciated from the approximate expression (5), the smaller the response-characteristic time constant $\tau s$, the greater the responsibility of the EGR control. However, if the time constant $\tau s$ is set at an excessively less value, the amplitude of the second target EGR amount $M_2Qe$ (=the actual EGR amount Qce) becomes extremely greater as compared with the first target EGR amount and thus there is an increased tendency for the required opening of the EGR valve to become excessively greater. In this case, the actual EGR amount Qce may overshoot the first target EGR amount MQce. Therefore, it is preferable that the response-characteristic time constant $\tau s$ is set at a minimum possible value in view of a maximum possible opening of the EGR valve 9. As set forth above, since the system of the modification shown in FIG. 26 can more precisely perform the advance processing in consideration of the dynamic characteristic of the recirculated exhaust gas so that the desired response characteristic is satisfied, and thus a high-precision and high-stability EGR control can be assured. Furthermore, since the dynamic-characteristic time constant $\tau a$ and the response-characteristic time constant $\tau s$ ($0<\tau s<\tau a$) are determined or estimated as explained previously, there is less hunting (overshoot and/or undershoot with respect to the target EGR amount) of the EGR control. Moreover, the required fluid-flow area Tav is accurately calculated as a function of the required EGR amount (or the command EGR amount) and the differential pressure (Pexh−Pm) between the exhaust pressure and the intake pressure, and additionally another advance processing reflecting the delay in actuating timing of the EGR valve is made to the target valve lift Mlift equivalent to the required fluid-flow area Tav so as to produce the command valve lift Liftt (the control signal value required for the target EGR valve opening), thus ensuring a high-precision opening control of the EGR valve.
Second embodiment Referring now to FIGS. 29 to 35, the automotive emission control system of the second embodiment is exemplified in case of a diesel engine. The basic construction of the system of the second embodiment shown in FIGS. 29 to 35 is similar to that of the first embodiment shown in FIGS. 1 to 25. Therefore, the same reference numerals used in the first embodiment of FIG. 1 will be applied to the corresponding elements used in the second embodiment of FIG. 29, for the purpose of comparison between the first and second embodiments. The second embodiment is different from the first embodiment in that the opening of an intake-air throttle valve 70 (see FIG. 30) is accurately controlled variably depending on at least the differential pressure between the exhaust pressure (Pexh) and the intake pressure (Pm), and the actual lift (Lifts) of the EGR valve 9, in addition to the previously-noted EGR valve control. As seen in FIG. 29, the engine system 5 is equipped with the EGR passage 10 which recycles a small part of the inert exhaust gas back to the intake manifold 4. The EGR valve 9 is disposed in the EGR passage 10 for controlling the amount of the recirculated exhaust gas from the exhaust manifold 8 to the intake manifold. The EGR valve 9 is comprised of a valve 50, a valve stem 51 whose one end is fixedly connected to or integrally formed with the valve 50, a diaphragm 52 fixedly connected to the other end of the valve stem 51, a return spring 53 which biases the diaphragm downwards (viewing FIG. 29) in a manner so as to keep the valve in its fully closed position, a signal line 54, and a diaphragm chamber 55. As already explained in the accompanying FIG. 1, the signal line 54 of the EGR valve 9 is connected to the outlet port of the duty-cycle controlled electromagnetic valve 12, and thus the vacuum which is generated by a vacuum source (the vacuum pump 11) and suitably diluted with the atmosphere is fed from the valve 12 via the line 54 into the diaphragm chamber 55. Thus, depending on the degree of the incoming vacuum, the EGR valve can be raised or lowered. The intake-air throttle valve 70 (see FIG. 30) is disposed in the induction passage communicating the intake manifold 4 for properly throttling or constricting the induced fresh air flow. Disposed in the induction passage is the intake-pressure sensor 35. Also disposed in the exhaust passage (the exhaust manifold 8) is an exhaust-pressure sensor 56. In order to perform both the EGR control and the intake-air throttle-valve-opening control, a control unit 60 is provided. The input interface of the control unit 60 is connected to the air-flow meter 16, the engine-speed sensor 17 and the accel-opening sensor 57, to receive the induced fresh-air flow indicative voltage signal Qo from the air-flow meter 16, the engine-speed indicative signal Ne from the sensor 17, and the accelerator opening indicative signal Acc from the sensor 57. As seen in the block diagram of FIG. 30, the control unit 60 (indicated by the one-dotted line H in the block diagram) employed in the system of the second embodiment includes a desired EGR flow rate arithmetic operation section B, an EGR valve lift setting section C, an EGR valve control section D, an EGR valve lift detection section E, an intake-air throttle-valve-opening setting section F and an intake-air throttle valve control section G. The operation section B is connected to an engine operating-state detection section A, for calculating a desired EGR flow rate (a target EGR flow rate) on the basis of a plurality of engine operating-state indicative signals from the detection section A, namely the engine speed indicative signal Ne, the accel-opening indicative signal Acc, the intake pressure Pm, the exhaust pressure Pexh and the like. The setting section C determines a desired lift (a set point) of the EGR valve 9 on the basis of the desired EGR flow rate calculated by the section B. The control section D controls the EGR valve 9 on the basis of the set point determined by the section C. The detection section E is provided to detect an actual lift of the valve 9. The throttle-valve-opening setting section F is provided for setting a desired opening of the throttle valve 70 depending on all the engine operating-state indicative signal, the desired EGR flow rate, and the actual lift of the EGR valve. The control section G controls the throttle valve 70 in response to the desired throttle-valve-opening indicative signal from the setting section F. As detailed herebelow, the system of the second embodiment executes the throttle-valve-opening control as well as the same EGR control as the first embodiment.

Figure 31:
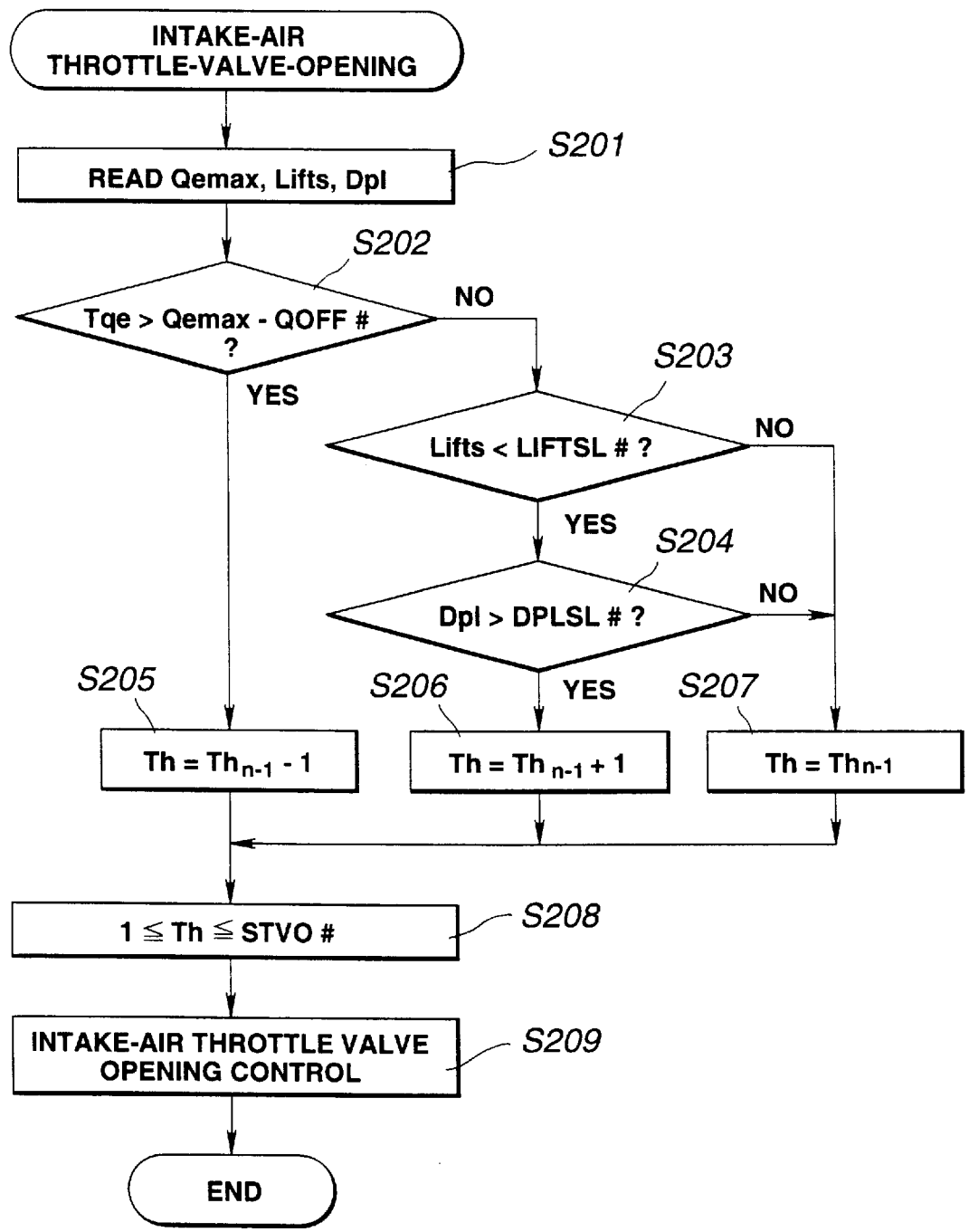
FIG. 31 is a flow chart illustrating a control routine for the intake-air throttle-valve-opening.
Figure 32:
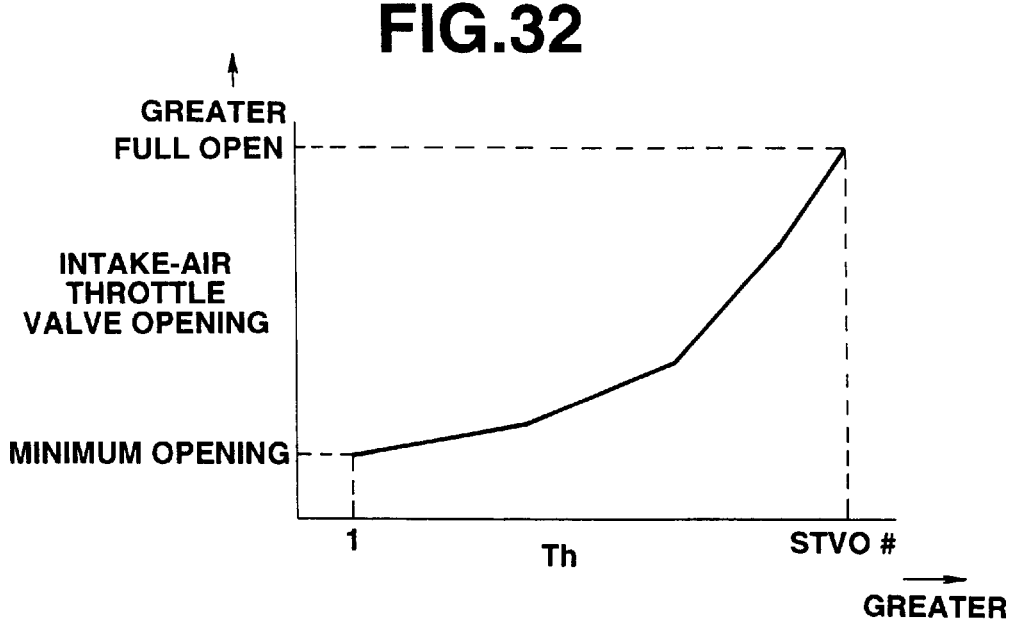
FIG. 32 is a characteristic curve illustrating the relationship between an intake-air throttle-valve-opening set parameter Th and the actual intake-air throttle-valve-opening TVO.

Referring now to FIG. 31, there is shown a control flow for the opening of the intake-air throttle valve 70. In step S201, a maximum EGR flow rate Qemax (as will be explained later with respect to the flow indicated in FIG. 33), the actual lift Lifts of the EGR valve 9, and the differential pressure Dpl (=Pexh−Pm) between the exhaust pressure Pexh and the intake pressure Pm are read. In step S202, the required EGR flow rate Tqe is compared with the difference (Qemax−QOFF#) which is obtained by subtracting a predetermined value QOFF# from the maximum EGR flow rate Qemax. In case that the inequality Tqe>Qemax−QOFF# is satisfied, step S205 proceeds in which the current value Th (Thn) of a throttle-valve set parameter (a set point) is updated by a value (Thn−1−1) obtained by subtracting "1" from the previous value Thn−1 of the set parameter so that the opening TVO of the throttle valve 70 decreases, since the desired EGR flow rate exceeds the maximum EGR flow rate Qemax. The predetermined value QOFF# is preset in consideration of fluctuations of the EGR flow rate, resulting from the EGR valve characteristics. If the answer to step S202 is negative (NO), i.e., in case of Tqe≦Qemax−QOFF#, step S203 enters in which a test is made to determine whether the actual valve lift Lifts is less than a predetermined constant LIFTSL#. In case of Lifts<LIFTSL#, step S204 proceeds in which the differential pressure Dpl (=Pexh−Pm) is compared with a predetermined constant or a predetermined slice level DPLSL#. In case of Lifts≧LIFTSL#, step S207 proceeds. When the answer to step S204 is affirmative (YES), step S206 enters. Conversely when the answer to step S204 is negative, step S207 proceeds. The flow from step S203 via step S204 to step S206 means that the actual valve lift Lifts is comparatively less and additionally the differential pressure Dpl develops sufficiently, and thus in step S206 the current value Th (Thn) of the throttle-valve set parameter is updated by a value (Thn−1+1) obtained by adding "1" to the previous value Thn−1 of the set parameter so that the opening TVO of the throttle valve 70 increases. The flow from step S202 via S203 or step S204 to step S207 means that the desired EGR flow rate is within a permissible range, and the actual lift of the EGR valve is almost satisfied or there is a proper level of the differential pressure Dpl, and thus the control unit 60 decides that the current opening of the throttle valve is proper. For the reason set for above, in step S207 the current value Th (Thn) of the throttle-valve set parameter is held at the same value as the previous value Thn−1 so that the opening TVO of the throttle valve 70 retains unchanged. In step S208, the upper and lower limits of the set parameter Th of the throttle valve opening are restricted respectively by "1" and a predetermined maximum possible valve opening set number STVO#, as expressed by the inequality 1≦Th≦STVO#. In step S209, the throttle-valve opening TVO is controlled on the basis of the set parameter finally determined through step S208. In the second embodiment, the relation between the throttle valve opening TVO and the set parameter Th is determined by the characteristic curve shown in FIG. 32. The characteristic curve is predetermined in a manner to be able to more accurately minutely set the opening TVO in the part-throttle mode, because the EGR is required mainly during a comparatively low engine speed with the throttle valve partly opened, and in such a case a slight change in the throttle-valve opening may produce a great rate of change in the induced air flow.

Figure 33:
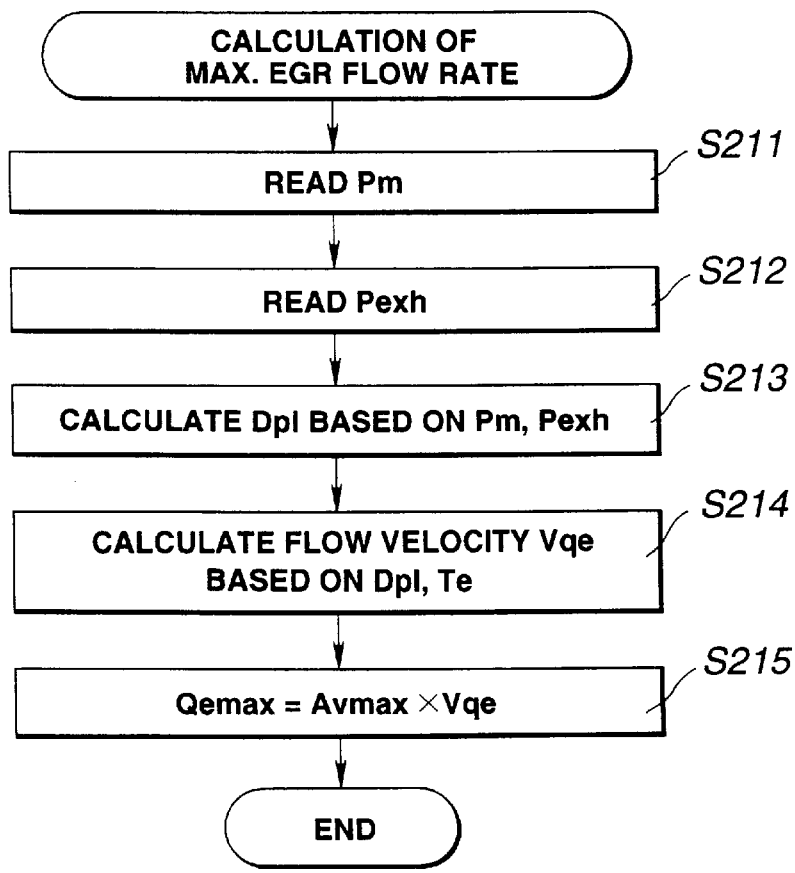
FIG. 33 is a flow chart illustrating a routine for calculation of a maximum EGR flow rate (Qemax).

Referring to FIG. 33, there is shown a routine for calculation of the maximum EGR flow rate Qemax. Through steps S211 and S212, the intake pressure Pm and the exhaust pressure Pexh are read. In step S213, the differential pressure Dpl is calculated as the difference (Pexh−Pm) between the exhaust pressure and the intake pressure. In step S214, a flow velocity Vqe of the recirculated exhaust gas flow is derived according to the following expression.

$$Vqe=(Dpl)^{1/2} \times KR\# \times Te/TA\#$$

where KR# is the predetermined constant, Te denotes the EGR temperature, and TA# denotes the predetermined standard temperature.

In step S215, in case of the maximum possible lift of the EGR valve, the maximum opening area Avmax of the EGR passage or the EGR valve is retrieved from the look-up table as shown in FIG. 14. The, the maximum EGR flow rate Qemax is calculated as the product (Avmax×Vqe) of the maximum opening area Avmax and the recirculated exhaust-gas flow velocity Vqe.

Figure 34:
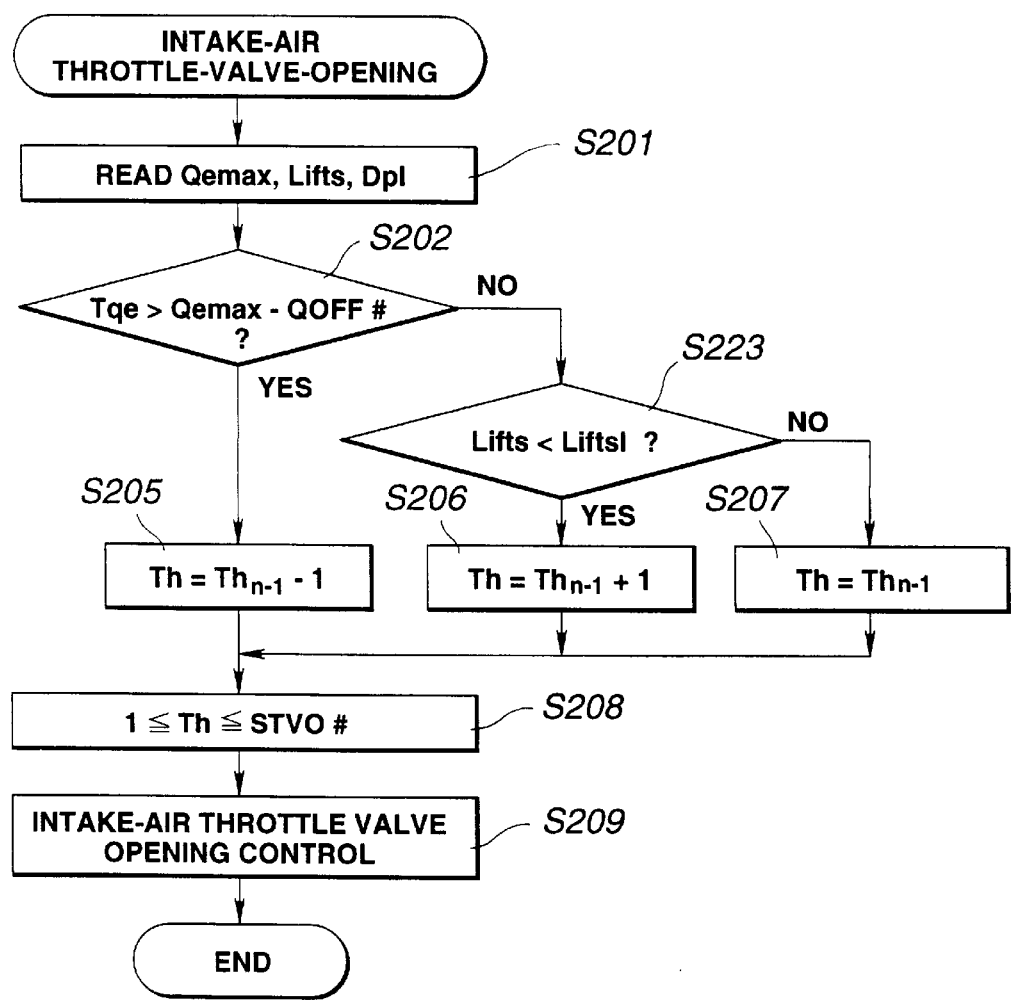
FIG. 34 is a flow chart illustrating another control routine for the intake-air throttle-valve-opening.
Figure 35:
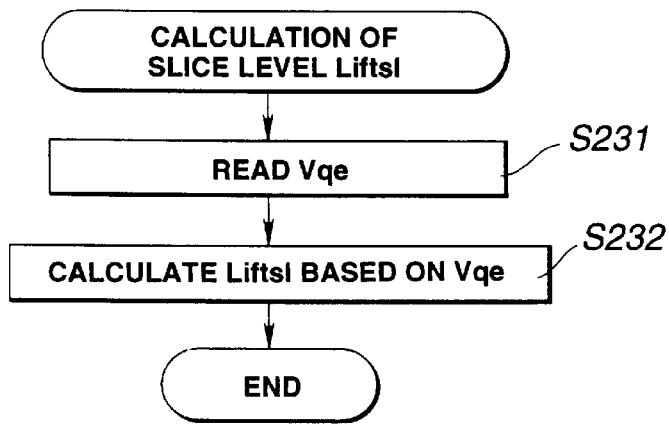
FIG. 35 is a flow chart illustrating a routine for calculation of a slice level Liftsl of the lift of the EGR control valve.
Figure 36:
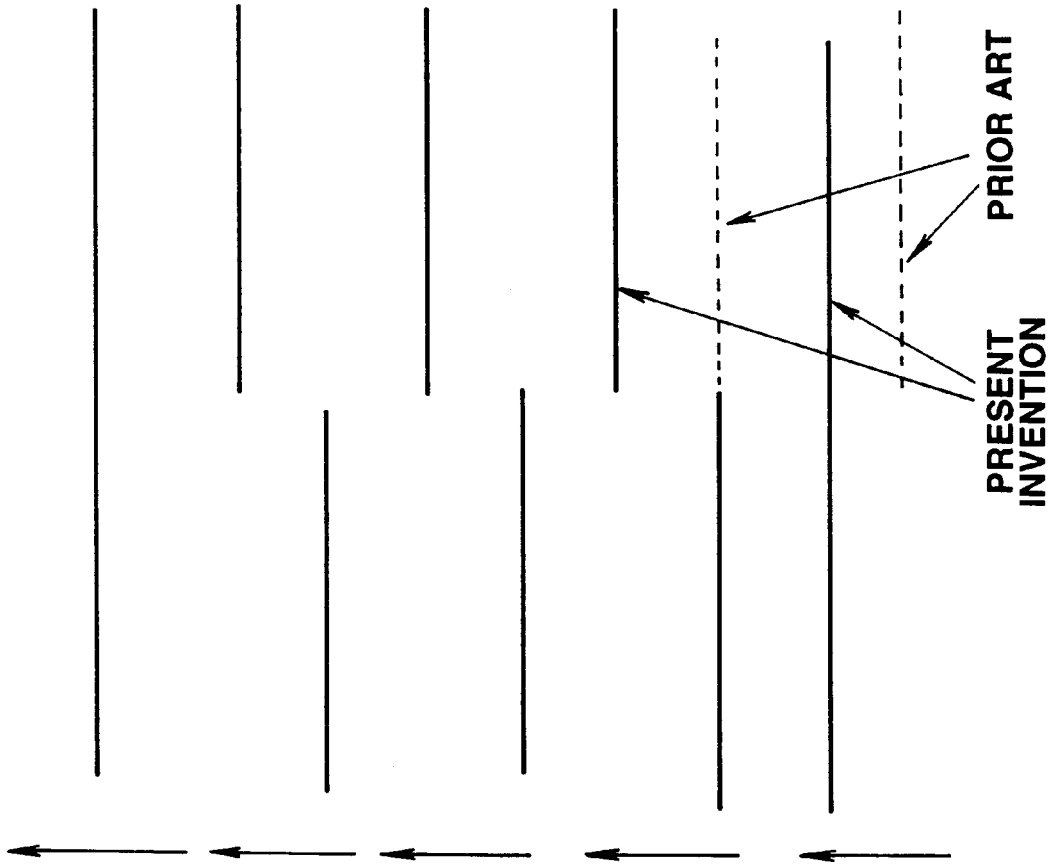
FIGS. 36A to 36E are timing charts explaining comparative results of the intake-air throttle-valve-opening control in case of both the improved system (as indicated by the solid line) of the present invention and the prior art system (as indicated by the broken line).

Referring to FIG. 34, there is shown another control flow for the opening of the intake-air throttle valve 70. The control flow shown in FIG. 34 is slightly different from the control flow shown in FIG. 31 only in that steps S203 and S204 of FIG. 31 is replaced with step S223 of FIG. 34. A comparative value Liftsl used in step S223 is a slice level which is variable depending on the previously-noted flow velocity Vqe, as may be appreciated from the flow chart of FIG. 35. In other words, the value Liftsl is a flow-velocity dependent variable. Actually, since the flow velocity Vqe itself is expressed as a function ($Vqe=(Dpl)^{1/2} \times KR\# \times Te/TA\#$) of the differential pressure Dpl, it will be appreciated that the slice level Liftsl based on the flow velocity reflects the decision box S204 as well as the decision box S203. In step S231 of FIG. 35, the flow velocity Vqe is read. In step S232, the slice level Liftsl is retrieved from a predetermined look-up table (not shown) indicative of the relationship between the flow velocity Vqe and the slide level Liftsl of the valve lift. The respective routines shown in FIGS. 31, 33 and 34 are executed as time-triggered interrupt routines to be triggered every predetermined time intervals for example 10 msec.

As clearly seen in FIGS. 36A to 36E, according to the throttle-valve opening control of the system of the second embodiment, in case that the desired EGR flow rate (the required EGR flow rate) Tqe exceeds the maximum EGR flow rate Qemax, the throttle-valve opening is decreasingly adjusted. Also, in the event that the differential pressure Dpl is above the predetermined constant DPLSL# when the desired EGR flow rate Tqe is less than the maximum EGR flow rate Qemax, the throttle-valve opening is increasingly adjusted. As compared with the prior system (indicated by the broken line in FIG. 36D and 36E), the system of the invention can keep the excess air factor at an approximately constant level.

According to the system of the second embodiment, since the opening of the intake-air throttle valve is controlled depending on the differential pressure between the exhaust pressure and the intake pressure and the actual lift of the EGR valve, it is possible to accurately and minutely control the throttle-valve opening, quickly responding to the environmental change or the change in operating conditions of the vehicle, and thus all of engine performance, fuel consumption, and exhaust-emission control performance are properly harmonized with one another. Furthermore, in the system of the second embodiment, the throttle-valve opening can be automatically optimized by determining only the flow-rate characteristic of the EGR valve based on the previously-noted differential pressure and the actual lift of the EGR valve. Therefore, the capacity of a built-in read only memory (ROM) mounted on the control unit and workhours requiring for production of the system can be greatly reduced. Moreover, the maximum EGR flow rate (Qemax) is derived from the above-mentioned differential pressure (Dpl) and the maximum opening area (Avmax) of the EGR passage (or the maximum fluid-flow passage area of the EGR valve) determined by the maximum possible lift of the EGR valve, and the throttle-valve opening is decreasingly adjusted or compensated usefully and timely in the event that the desired EGR flow rate (Tqe) exceeds the maximum EGR flow rate (Qemax). Additionally, the throttle-valve opening is increasingly adjusted or compensated in the event that the above-noted differential pressure (Dpl) is above a predetermined constant (DPLSL#) and/or the actual lift (Lifts) of the EGR valve is below a predetermined constant (LIFTSL#). This controlling operation for the throttle valve is much to the point, and thus the throttle-valve opening control may be optimized even in the presence of the environmental change or the change in the engine operating conditions.

Third embodiment

Referring now to FIGS. 37 to 42 and FIGS. 43A to 43F, the automotive emission control system of the third embodiment is exemplified in case of a diesel engine with a turbocharger. The basic construction of the EGR control system employed in the emission control system of the third embodiment is similar to that of the first embodiment shown in FIGS. 1 to 25. Only the EGR control routine which is executed by a control unit incorporated in the system of the third embodiment, is different from the first embodiment. For the purpose of simplification of the disclosure, only the EGR-control routine of the third embodiment will be hereinbelow discussed in detail.

Figure 37:
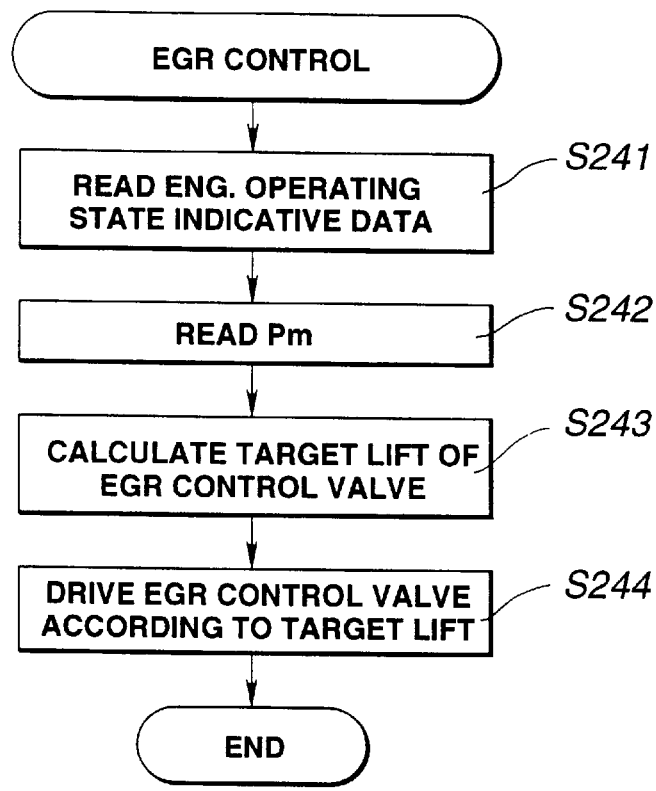
FIG. 37 is a flow chart illustrating an exhaust-gas-recirculation control routine.

The control unit employed in the system of the third embodiment performs an EGR control in accordance with the flow shown in FIG. 37.

In step S241, an engine operating-state indicative data is read. Concretely, an engine-load representative data such as an accel-opening indicative signal Acc and a fuel-injection amount Qsol, and an engine-speed indicative data Ne are read as the engine operating-state indicative data. In step S242, the intake pressure Pm is read. The intake pressure Pm is measured or detected directly by means of the intake-pressure sensor 35 located in the intake manifold or in the induction passage. Alternatively, the intake pressure Pm can be derived through the routine for the arithmetic operation as shown in FIG. 2. In step S243, a target EGR lift (a desired EGR lift) of the EGR valve 9 is calculated on the basis of both the engine operating-state indicative data and the intake pressure Pm. In step S244, the EGR valve is driven or the opening of the EGR valve is controlled, such that the target valve lift derived in step S243 is reached. In the case that the duty-cycle controlled electromagnetic solenoid valve as shown in FIG. 1 is utilized for driving the valve lift mechanism (including the diaphragm chamber) of the EGR valve, the duty factor of the solenoid valve 12 is set at a proper duty ratio based on the deviation between the actual lift of the EGR valve and the target valve lift. Alternatively, in case that a stepper motor is used for adjusting the lift of the EGR valve, the angular steps of the stepper motor are set at proper steps based on the above-mentioned deviation.

Figure 38:
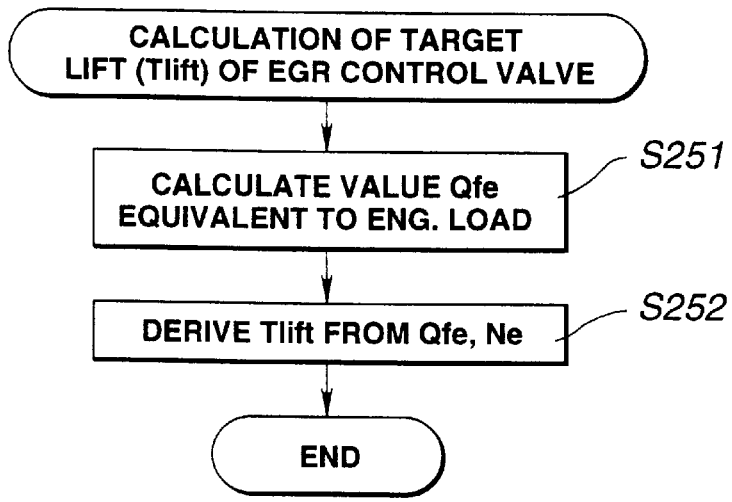
FIG. 38 is a flow chart illustrating a routine for calculation of a target lift (Tlift) of the EGR control valve.

Referring to FIG. 38, there is shown a sub-routine for calculation of the desired lift or target lift (Tlift) of the EGR valve. In step S251, en engine-load equivalent value Qfe is calculated as a function of the engine load representative data and the intake pressure Pm. The value Qfe is obtained by dividing a value of the engine-load representative data by the intake pressure Pm. That is, the value Qfe is expressed as Qfe=(a value of the engine-load representative data)/(the intake pressure Pm). As may be appreciated from this expression, in the event that the fuel-injection amount (Qsol) rapidly increases in a transient engine operating state such as when heavily accelerating, the value of the engine-load representative data tends to be increased relative to the intake pressure Pm owing to the delay in the change in the intake pressure. In step S252, a target EGR-valve lift Tlift is retrieved from both the engine speed Ne and the engine-load equivalent value Qfe, in accordance with the characteristic curves shown in FIG. 40. The engine speed Ne versus engine-load equivalent value Qfe characteristic curves are stored in a memory of the control unit in the form of the data map.

Figure 39:
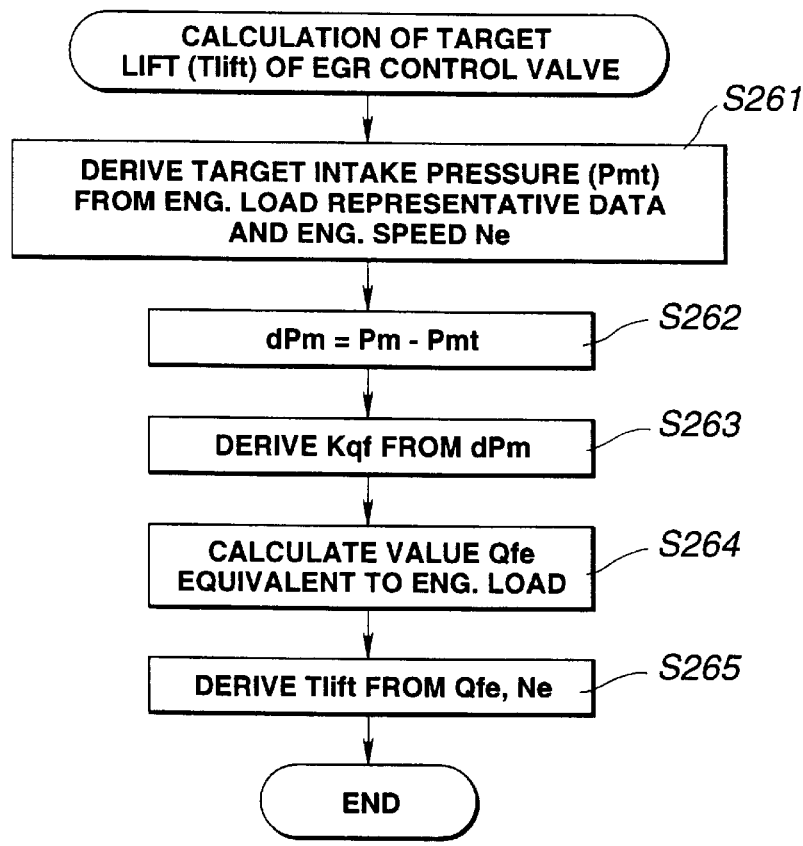
FIG. 39 is a flow chart illustrating another routine for calculation of a target lift (Tlift) of the EGR control valve.
Figure 40:
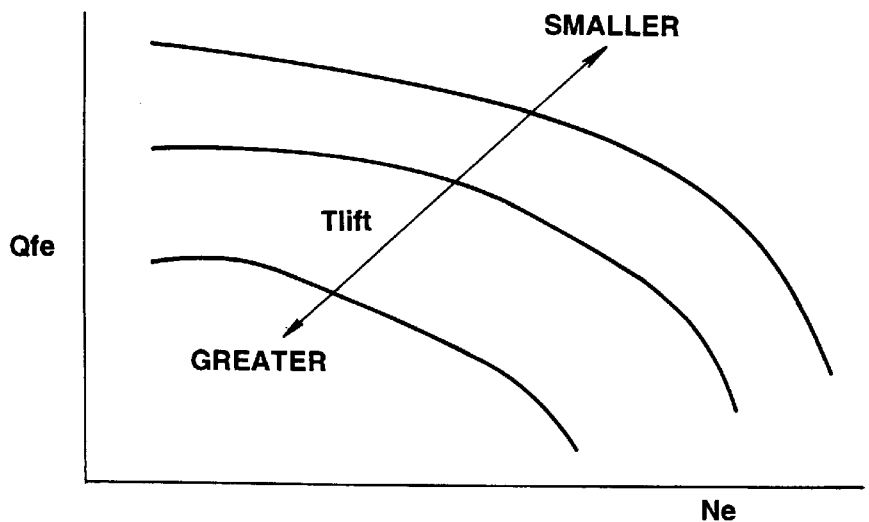
FIG. 40 is a data map illustrating the relationship among the engine speed (Ne), a value (Qfe) equivalent to engine load, and the target lift (Tlift) of the EGR control valve.
Figure 41:
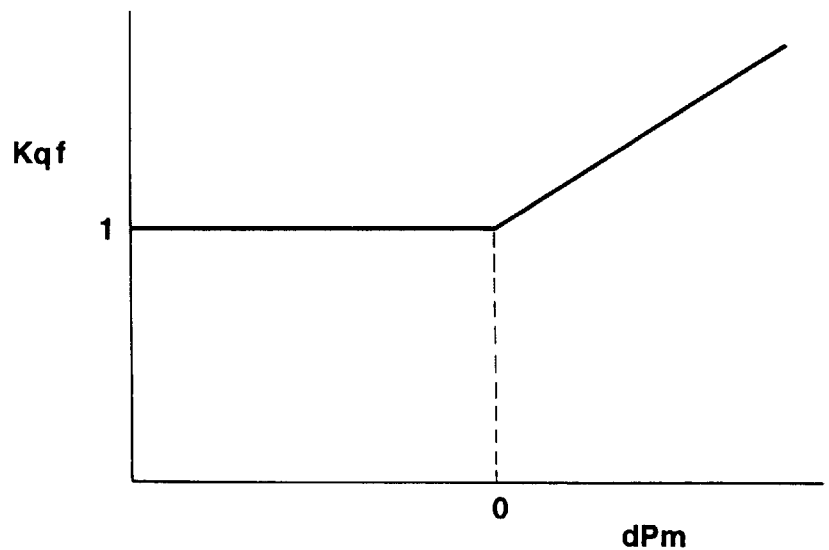
FIG. 41 is a look-up table illustrating the relationship between the differential pressure (dPm) between the actual intake pressure (Pm) and the target intake pressure (Pmt) and a correction coefficient (Kqf) for the engine load.
Figure 42:
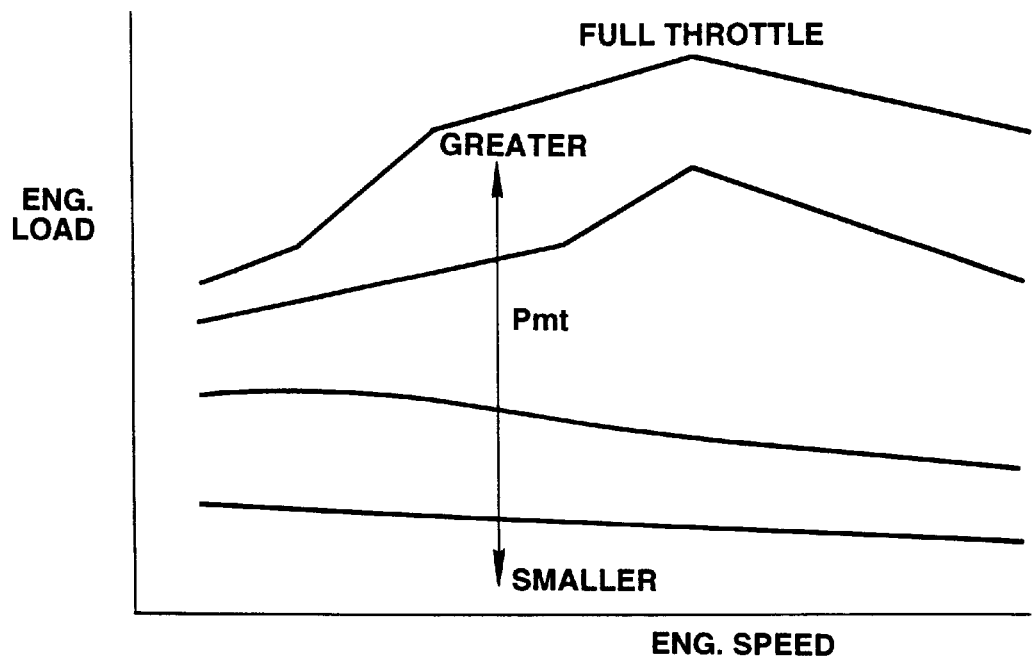
FIG. 42 is a data map illustrating the relationship among the engine speed (Ne), the engine load, and the target intake pressure (Pmt).

Referring now to FIG. 39, there is shown another sub-routine for calculation of the target EGR-valve lift (Tlift). In step S261, a target intake pressure Pmt is derived or retrieved from both the engine-load representative data such as the accel-opening indicative signal Acc, the fuel-injection amount Qsol or the like, and the engine speed indicative data Ne, in accordance with the data map shown in FIG. 42, which map is experimentally determined. In step S262, a differential pressure dPm (=Pm−Pmt) between the detected or calculated intake pressure Pm which is regarded as the actual intake pressure and the target intake pressure Pmt. In step S263, an engine-load dependent correction factor Kqf is derived or retrieved from the differential pressure dPm by reference to the look-up table as shown in FIG. 41. In step S264, the engine-load equivalent value Qfe is derived from both the engine-load representative data and the engine-load dependent correction factor Kqf, according to the expression Qfe=(a value of the engine-load representative data)×Kqf. In step S265, the target EGR-valve lift Tlift is retrieved from both the engine speed Ne and the engine-load equivalent value Qfe, by reference to the look-up table as shown in FIG. 40.

As can be appreciated from the two routines shown in FIGS. 37 and 39, according to the system of the third embodiment, the target EGR rate (or its equivalent value such as the target EGR-valve lift Tlift) is properly corrected depending on the intake pressure Pm, and thus it is possible to perform an optimal EGR control even in a transient engine operating condition such as when rapidly accelerating. This prevents the exhaust-emission control performance from being deteriorated during the transient operating mode. The previously-discussed system of the third embodiment can provide a high-precision EGR control particularly in case of a diesel engine with a turbocharger. Hitherto the target EGR rate or its corresponding value (the EGR valve lift) is set on the supposition that the intake pressure is a standard pressure such as a predetermined pressure level PA#, and thus the target EGR rate calculated through the prior art EGR control system corresponds to a desired value under a particular condition in which the intake pressure reaches the standard pressure, and thus there is a tendency of an insufficient amount of induced fresh air until the intake pressure reaches the standard pressure. In such a case it is necessary to decreasingly correct the target EGR rate derived through the prior art system. On the other hand, in the system of the third embodiment, since the engine-load equivalent value Qfe tends to become greater relative to the intake pressure in a transient engine operating condition such as during acceleration. As appreciated from the data map shown in FIG. 40, the greater the engine-load equivalent value Qfe, the smaller the target EGR-valve lift Tlift. That is to say, the target EGR-valve lift (essentially corresponding to the EGR rate) is suitably corrected depending on the change in the intake pressure Pm. Accordingly, even in a transient engine operating condition such as during hard acceleration, the system of the third embodiment can insure an optimal high-precision EGR control. Referring to FIGS. 43A to 43F, there is shown timing charts explaining effects obtained by the system of the third embodiment. As is well known, the target EGR rate (or the target EGR amount) is determined in consideration of the trade-off between suppression of formation of NOx emissions and the formation of particulates emitted from the exhaust system or between the increase in NOx emissions and the decrease in particulates. A set point of the EGR rate is generally determined that there is a comparatively low sensitiveness of formation of NOx emissions and that there is a comparatively high sensitiveness of formation of particulates. For the reasons set out above, as compared with the prior art system, in case of the system of the third embodiment there is a tendency that NOx emissions tend to slightly increase whereas there is a tendency that particulates tend to remarkably decrease in a transient engine operating condition, i.e., in case of a rapid increase in engine load (the accel-opening Acc or the fuel-injection amount Qsol).

Fourth embodiment

Referring now to FIGS. 44 to 53, the automotive emission control system of the fourth embodiment is exemplified in case of a diesel engine with a turbocharger. The basic construction of the system of the fourth embodiment is similar to that of the first embodiment shown in FIGS. 1 to 25. Only the fuel-injection amount (Qsol) arithmetic-operation routine which is executed by a control unit incorporated in the system of the fourth embodiment, is different from the first embodiment. That is, in the system of the fourth embodiment, a sub-routine for more precise correction of the fuel-injection amount is additionally inserted into the arithmetic operation for the fuel-injection amount Qsol. For the purpose of comparison between the systems of the first and fourth embodiments, such fuel-injection amount correction sub-routines will be hereinbelow explained in detail.

Figure 44:
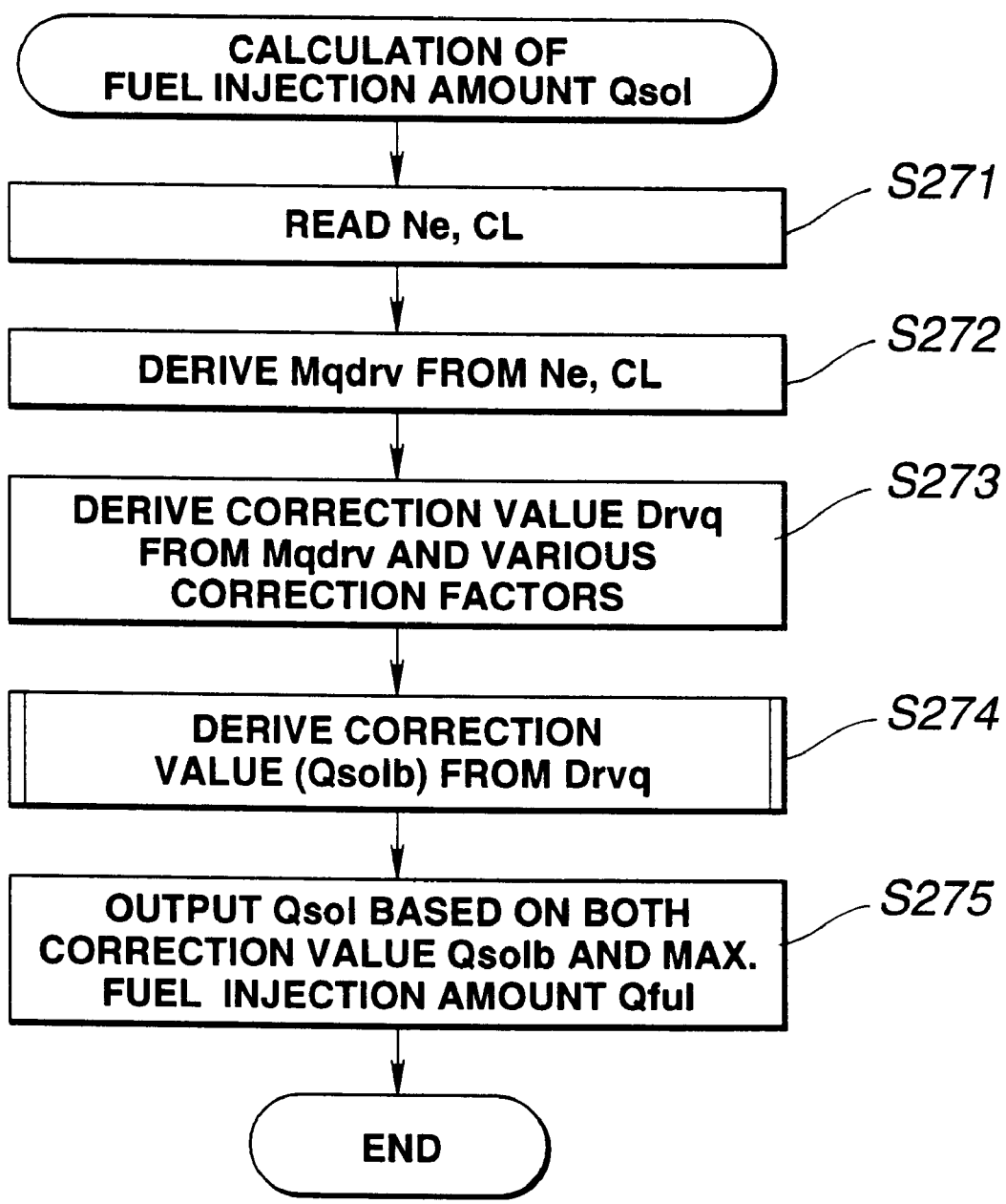
FIG. 44 is a flow chart illustrating a main routine for calculation of a fuel injection amount Qsol in case of an automotive emission control system of a fourth embodiment.

Referring now to FIG. 44, the control unit employed in the system of the fourth embodiment performs a fuel-injection amount control as follows.

Figure 45:
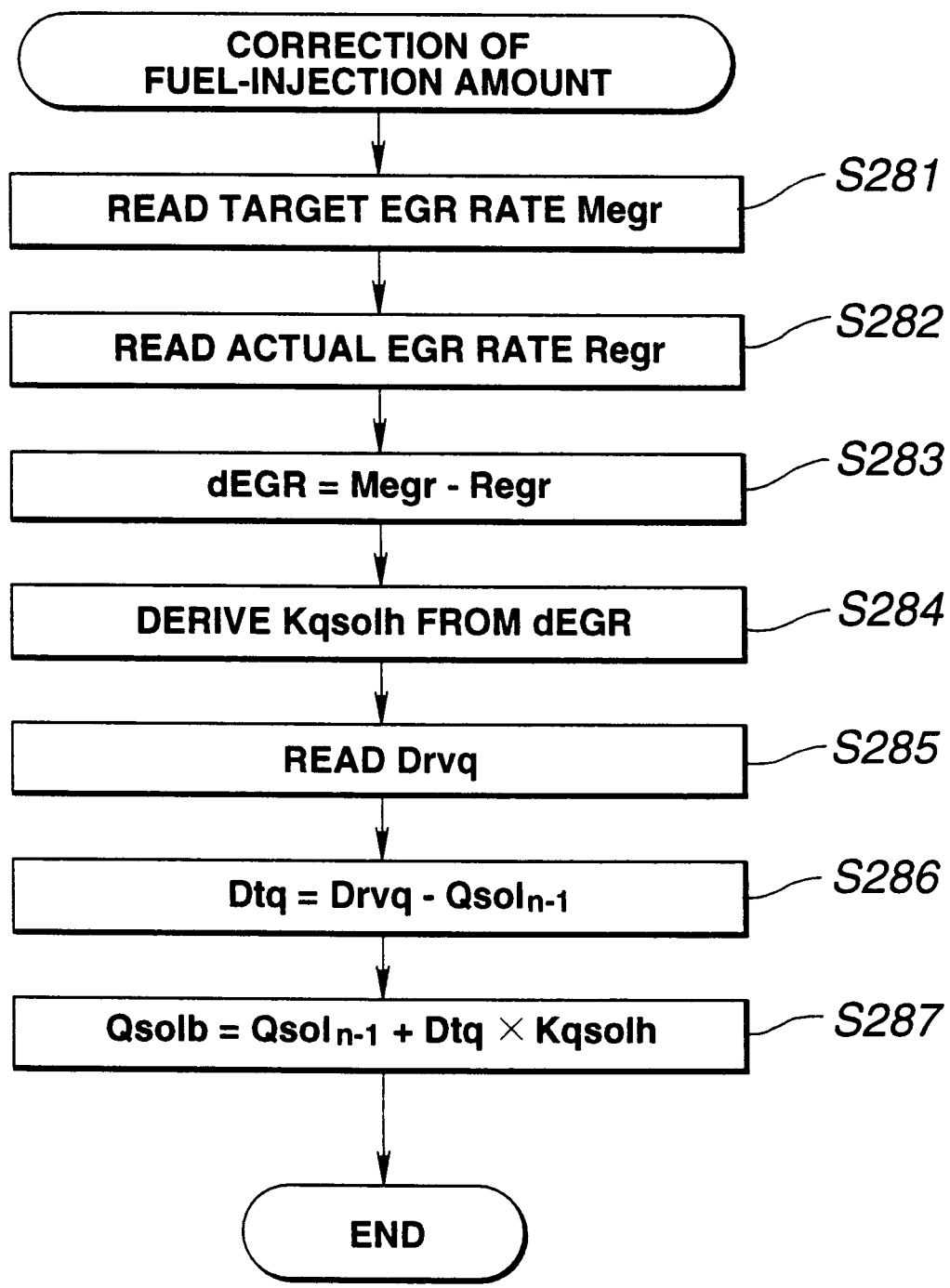
FIG. 45 is a flow chart illustrating a routine for correction of the fuel-injection amount in the system of the fourth embodiment.

In step S271, read are the engine speed Ne and the control-lever opening CL of the injection pump 7. In step S272, a basic fuel-injection amount Mqdrv is retrieved from both the engine speed Ne and the control-lever opening CL, according to the look-up table as shown in FIG. 22. In step S273, the basic fuel-injection amount Mqdrv is corrected by various correction factors such as a water-temperature dependent correction factor and the like, to produce a primarily corrected fuel-injection amount Drvq. In step S274, the primarily corrected fuel-injection amount Drvq is corrected again according to a correction sub-routine as shown in FIG. 45, so as to produce a secondarily corrected fuel-injection amount Qsolb. In step S275, in the event that the secondarily corrected fuel-injection amount Qsolb exceeds an upper limit (a given maximum fuel-injection amount Qful as calculated through another sub-routine shown in FIG. 50), the corrected fuel-injection amount Qsolb is replaced with the upper limit to keep the actual output value of the fuel-injection amount Qsol within the upper limit. When the secondarily corrected fuel-injection amount Qsolb is below the upper limit, the corrected fuel-injection amount Qsolb is regarded as the actual output value of the injection amount Qsol.

Referring now to FIG. 45, there is shown one sub-routine for correction of the fuel-injection amount.

Figure 46:
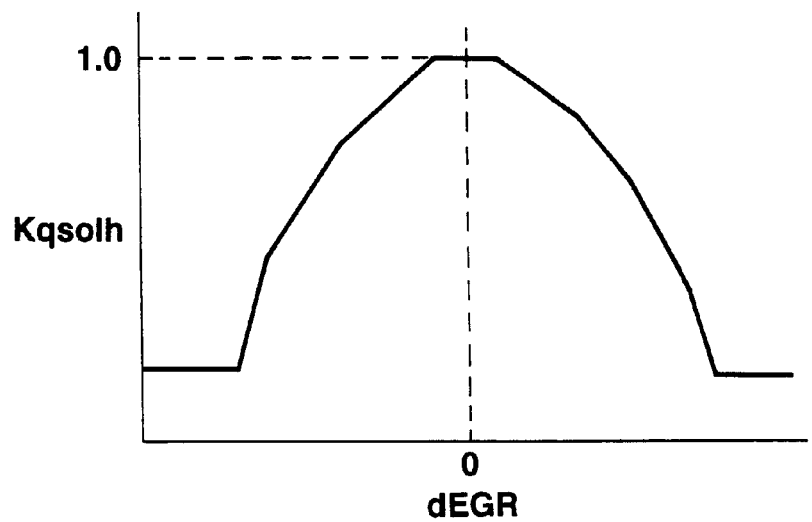
FIG. 46 is a look-up table illustrating the relationship between the deviation (dEGR) between a target EGR rate (Megr) and the actual EGR rate (Regr) and a correction coefficient (Kqsolh).

In step S281, read is the target EGR rate Megr as already discussed in the accompanying FIGS. 19 and 20. In step S282, read is an actual EGR rate Regr of exhaust gas recirculated through the EGR valve. The actual EGR rate Regr is usually obtained in the form of the actual EGR-valve lift Lifts directly detected by way of the EGR-valve lift sensor 34 as shown in FIG. 1. In step S283, the deviation dEGR (=Megr−Regr) between the target EGR rate Megr and the actual EGR rate Regr is calculated. In step S284, a fuel-injection-amount correction factor Kqsolh is retrieved from the EGR-rate difference dEGR in accordance with the look-up table as shown in FIG. 46. In step S285, read is the primarily corrected fuel-injection amount Drvq is read. In step S286, calculated is the deviation Dtq (=Drvq−Qsoln−1) between the primarily corrected fuel-injection amount Drvq and the previous value Qsoln−1 of the fuel-injection amount. In step S287, the secondarily corrected fuel-injection amount Qsolb is derived from both the deviation Dtq and the fuel-injection-amount correction factor Kqsolh, according to the following expression.

$$Qsolb=Qsoln-1+Dtq \times Kqsolh$$

As appreciated from the EGR-rate deviation (dEGR) versus fuel-injection-amount correction factor (Kqsolh) characteristic curve shown in FIG. 46, the correction factor Kqsolh is so designed to be set at "1" when the deviation dEGR of the EGR rate is "0" and to be gradually decreased down to a predetermined decimal fraction less than "1" and slightly greater than "0" along a substantially parabolic curve as the absolute value |dEGR| of the EGR-rate deviation dEGR increases, and to be held at the above-mentioned predetermined decimal fraction when the EGR-rate deviation dEGR exceeds its predetermined upper or lower limit. For instance, in case that the EGR-rate deviation dEGR is "0", the correction factor Kqsolh is "1". In this case, the secondarily corrected fuel-injection amount Qsolb becomes equal to the primarily corrected fuel-injection amount Drvq, because Qsolb=Qsoln−1+Dtq×Kqsolh=Qsoln−1+Dtq=Qsoln−1+Drvq−Qsoln−1=Drvq.

Figure 47:
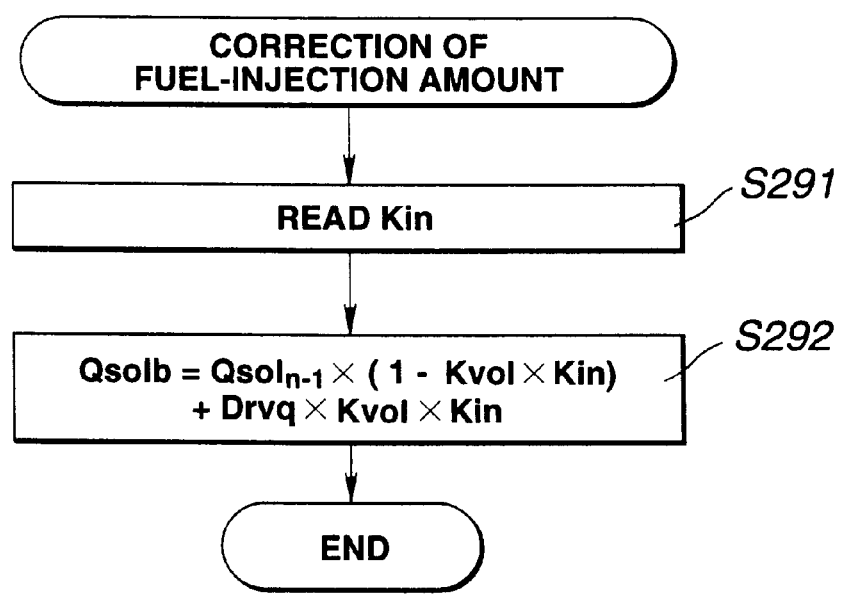
FIG. 47 is a flow chart illustrating another routine for correction of the fuel-injection amount.

Referring now to FIG. 47, there is shown another sub-routine for correction of the fuel-injection amount.

In step S291, the volumetric-efficiency equivalent value Kin is read. The volumetric-efficiency equivalent value Kin can be calculated as the product (Kinn×Kinp) of the engine-speed dependent retrieved correction factor Kinn (see FIG. 10) and the intake-pressure dependent retrieved correction factor Kinp (see FIG. 9), essentially in the same manner as explained previously in FIGS. 8, 9 and 10. In step S292, the secondarily corrected fuel-injection amount (a final fuel-injection amount/cylinder/intake stroke) Qsolb is estimated according to the following first-order-lag expression.

$$Qsolb=Qsoln-1 \times (1-Kvol \times Kin)+Drvq \times Kvol \times Kin$$

where Kvol denotes the previously-noted predetermined volumetric ratio (Vc/Vm) of the volumetric capacity/cylinder (Vc) with respect to the collector and intake-manifold volumetric capacity Vm in the induction system, the product (Kvol×Kin) means what percent of the primarily corrected fuel-injection amount Drvq currently calculated is actually drawn into the cylinder. Therefore, owing to the first-order lag, the first term {Qsoln−1×(1−Kvol×Kin)} corresponds essentially to the rate of the fuel-injection amount which will be drawn into the cylinder from within the previous value Qsoln−1 of the fuel-injection amount calculated at the previous arithmetic-operation cycle (see FIG. 44), while the second term (Drvq×Kvol×Kin) corresponds essentially to the rate of the fuel-injection amount which will be drawn into the cylinder from within the primarily corrected fuel-injection amount Drvq derived at the current arithmetic-operation cycle (see step S273 of FIG. 44).

Figure 48:
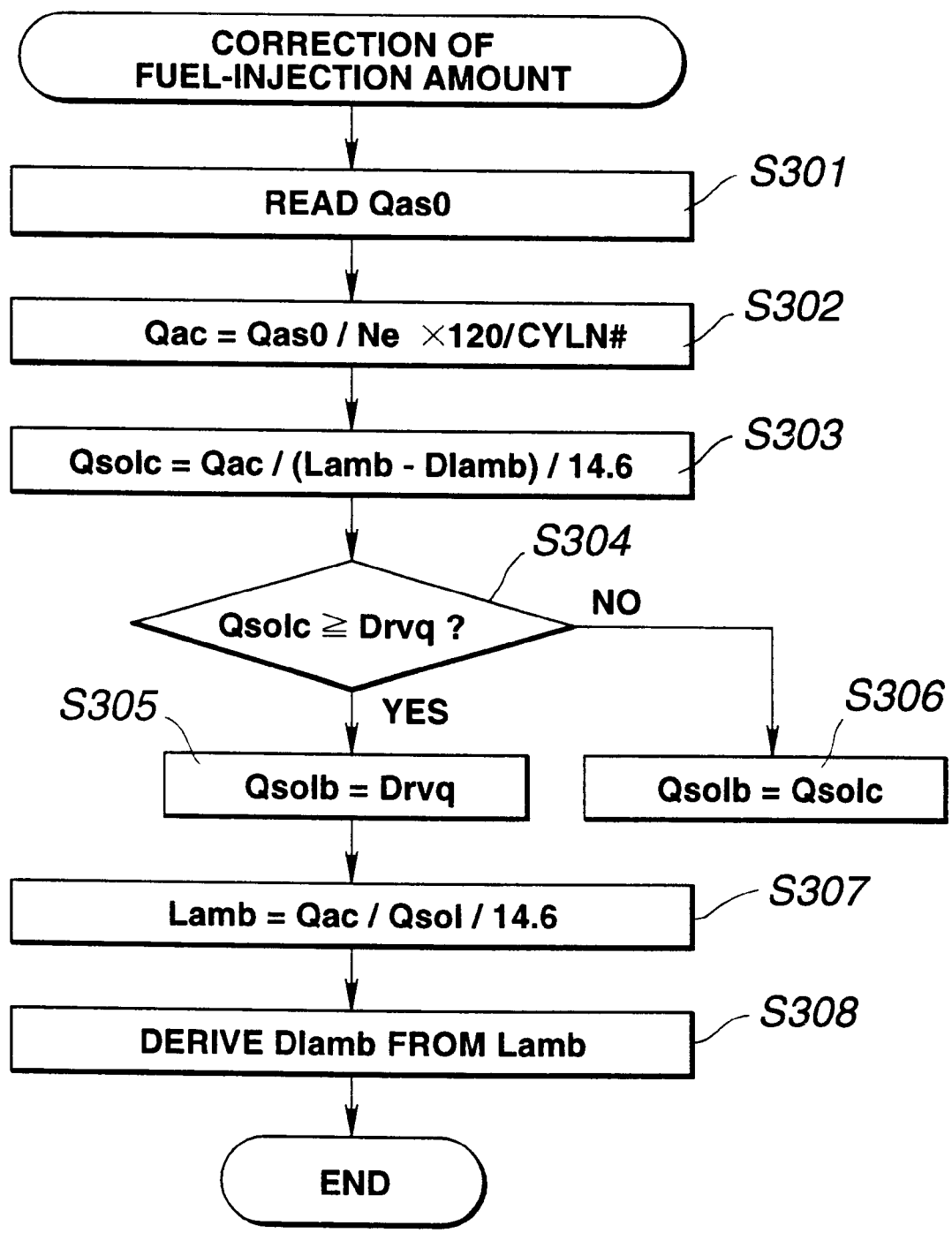
FIG. 48 is a flow chart illustrating another routine for correction of the fuel-injection amount.
Figure 49:
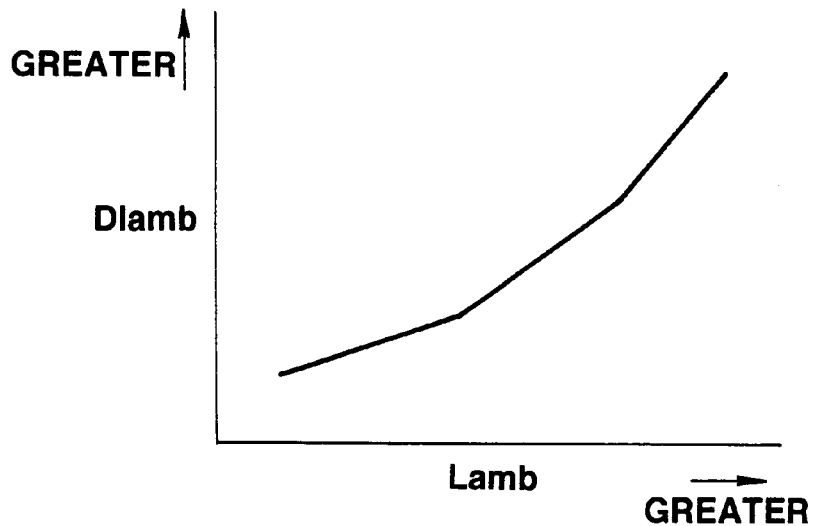
FIG. 49 is a look-up table illustrating the relationship between the excess-air-factor equivalent value (Lamb) and an allowable variation (Dlamb) of the excess-air factor.

Referring now to FIGS. 48 and 49, there is shown another sub-routine for correction of the fuel-injection amount.

In step S301, the induced fresh-air flow rate Qas0 is read. The flow rate Qas0 is obtained as the weighted mean of the intake-air flow rate Qasm through the flow from step S21 via step S22 to step S23 as previously explained in FIG. 4. In the shown embodiment, the intake-air flow rate Qasm is derived from the voltage signal value Qo from the air-flow meter, in accordance with the look-up table as shown in FIG. 53. In step S302, the induced fresh-air flow/cylinder/induction-stroke (abbreviated simply the fresh-air flow per cylinder Qac) is calculated according to the following expression.

$$Qac=Qas0/Ne \times 120/CYLN\#$$

where Qas0 denotes the weighted mean of the intake-air flow Qasm, Ne denotes the engine speed, and CYLN# denotes the number of engine cylinders.

In step S303, an allowable fuel-injection amount Qsolc is derived from three parameters, namely the excess-air-factor equivalent value Lamb (calculated at step S307 one cycle before), the allowable excess-air-factor variation Dlamb (retrieved at step S308 one cycle before), and the fresh-air flow per cylinder Qac, in accordance with the following expression.

$$Qsolc=Qac/(Lamb-Dlamb)/14.6$$

In step S304, the allowable fuel-injection amount Qsolc is compared with the primarily corrected fuel-injection amount Drvq. In case of Qsolc≧Drvq, step S305 proceeds in which the primarily corrected fuel-injection amount Drvq is regarded as the finally corrected fuel-injection amount Qsolb. In contrast, in case of Qsolc<Drvq, step S306 proceeds in which the allowable fuel-injection amount Qsolc is regarded as the finally corrected fuel-injection amount Qsolb. In other words, smaller one of the two calculated fuel-injection amounts Drvq and Qsolc is selected. In step S307, the excess-air-factor equivalent value Lamb is calculated as a function of both the finally corrected fuel-injection amount Qsol (precisely Qsolb) and the fresh-air flow per cylinder Qac, in accordance with the following expression.

$$Lamb=Qac/Qsol/14.6$$

In step S308, the allowable excess-air-factor variation Dlamb is derived or retrieved from the excess-air-factor equivalent value Lamb calculated at step S307, by reference to the look-up table as shown in FIG. 49. As appreciated from the characteristic curve shown in FIG. 49, the allowable excess-air-factor variation Dlamb is preset to be substantially proportional to the magnitude of the excess-air-factor equivalent value Lamb, with the result that the exhaust-emission control performance and the driveability are properly balanced each other.

Figure 50:
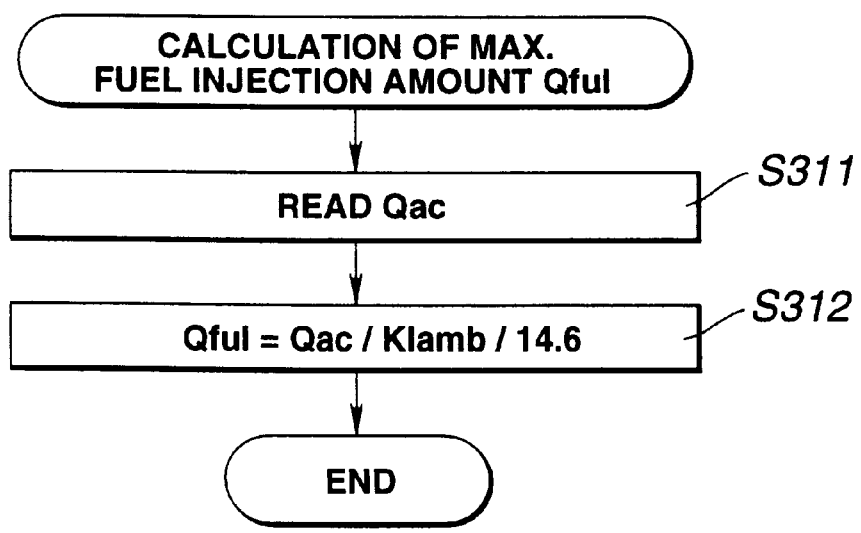
FIG. 50 is a flow chart illustrating a routine for calculation of the maximum fuel-injection amount (Qful).
Figure 51:
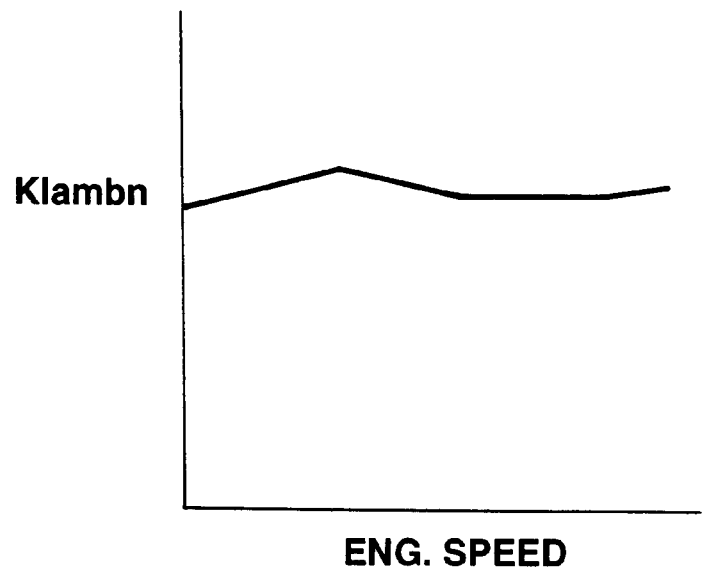
FIG. 51 is a look-up table illustrating the relationship between the engine speed (Ne) and an engine-speed dependent retrieved factor (Klambn) related to a limit excess-air factor (Klamb).
Figure 52:
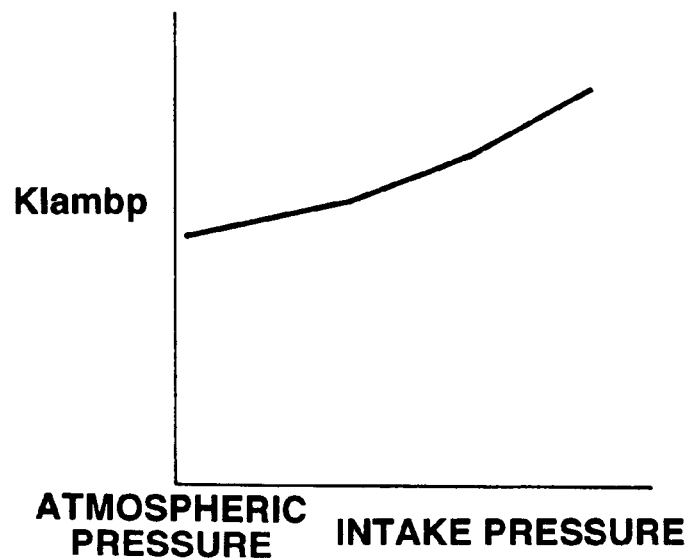
FIG. 52 is a look-up table illustrating the relationship between the intake pressure (Pm) and an intake-pressure dependent retrieved factor (Klambp) related to the limit excess-air factor (Klamb).

Referring now to FIG. 50, there is shown the sub-routine for calculation of the maximum fuel-injection amount Qful.

In step S311, the fresh-air flow per cylinder Qac is read. Precisely, in addition to the fresh-air flow per cylinder Qac, the engine speed Ne and the intake pressure (precisely the intake pressure Pmn−1 derived one cycle before) are read in step S311. In step S312, the limit excess-air factor Klamb is firstly determined as the product (Klambn×Klambp) of the engine-speed dependent retrieved factor Klambn (see the look-up table shown in FIG. 51) and the intake-pressure dependent retrieved factor Klambp (see the look-up table shown in FIG. 52). Then, the maximum fuel-injection amount Qful is calculated as a function of the fresh-air flow per cylinder Qac and the limit excess-air factor Klamb (=Klambn×Klambp), in accordance with the following expression.

$$Qful = Qac/Klamb/14.6$$

According to the system of the fourth embodiment, the fuel-injection amount is accurately corrected depending on the engine operating conditions such as the presence or absence of the exhaust-gas recirculation, and the change in the EGR rate (Megr), thus preventing the excess-air factor from greatly lowering unintendedly. As a consequence, the derivability (an accelerating performance) and the emission control performance are well-balanced each other. Furthermore, the fuel-injection amount is precisely corrected depending on a desired fuel-injection amount (Drvq), the target EGR rate and the actual EGR rate, (particularly the deviation (dEGR) between the target EGR rate and the actual EGR rate), and thus the delivery of fuel-injection amount is optimized. Moreover, in the first modification of the injection-amount correction, in consideration of a first-order lag until the fuel-injection amount instantaneously calculated is actually delivered into the cylinder, the desired injection amount (corresponding to the primarily corrected fuel-injection amount) is further corrected. This enhances an accuracy of the injection-amount correction. In order to more precisely correct the injection amount in the previously-noted modification, uses as a first-order-lag time constant (Kvol×Kin) a plurality of parameters, namely the collector and intake-manifold volumetric capacity Vm, the volumetric capacity/cylinder Vc, and the volumetric-efficiency equivalent value Kin based on the engine speed Ne and the intake pressure Pmn−1. The first-order-lag time constant may be determined by at least one of these parameters Vm, Vc, Kin and the like. Additionally, in the second modification of the injection-amount correction, the fuel-injection amount can be precisely corrected depending on the desired fuel-injection amount (Drvq) and the calculated excess-air factor (Lamb). Particularly, as clearly seen in FIG. 49, the fuel-injection amount can be more precisely corrected and adjusted in consideration of the allowable excess-air-factor variation (Dlamb) estimated from and thoroughly correlated to the calculated excess-air factor (Lamb), and as a result the actual fuel-injection amount is properly adjusted depending on the magnitude of the calculated excess-air factor Lamb so that the variation in the excess-air factor does not extremely increase, thereby preventing the excess-air factor from rapidly lowering. Thus, the exhaust-emission control performance and the driveability are properly well-balanced each other.

Fifth embodiment

Referring now to FIGS. 54 to 72, there is shown a main routine for arithmetic operation of an averaged intake-air flow rate or a weighted mean of the induced fresh-air flow rate.

Figure 55:
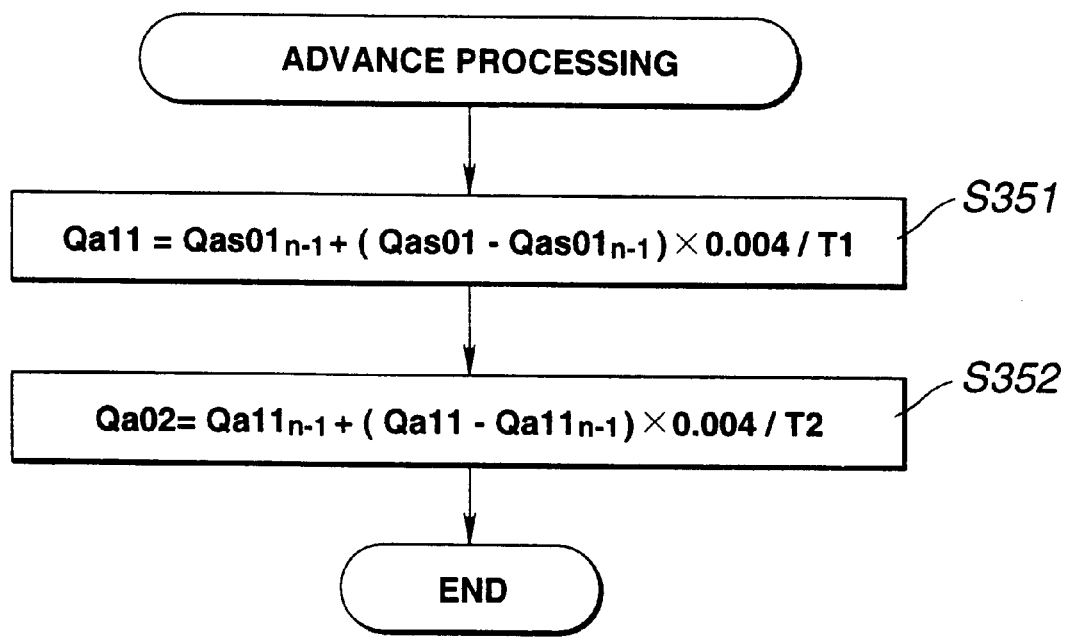
FIG. 55 is a flow chart illustrating a lead processing for the intake-air flow rate.
Figure 56:
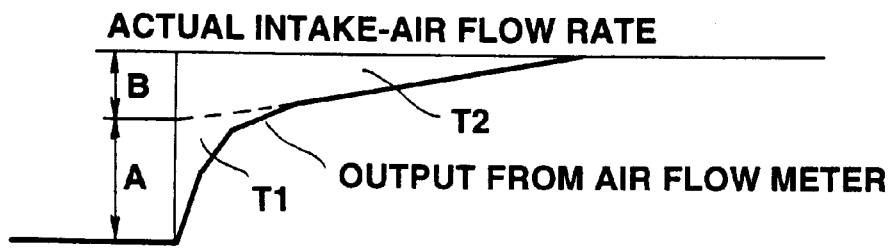
FIG. 56 is an explanatory view of a difference (a phase lag) between a flow rate detected by the air-flow meter and the actual flow rate drawn into the induction system, due to time constants of the air-flow meter.

In step S341, the voltage signal Qo from the air-flow meter 16 (see FIG. 1) is read. In step S342, the voltage signal Qo is converted into an intake-air flow rate (or an induced fresh-air flow rate) Qas01 by way of linearization executed according to the conversion table as shown in FIG. 53. In step S343, in consideration of the response delay or response lag inherent in the air-flow detecting device such as a hot-wire type air flow meter, a so-called advance processing (or a lead processing) is made to the induced fresh-air flow rate Qas01 to produce an advance-processed fresh-air flow rate Qas02. In step 344, a reverse-flow detection is performed utilizing the advance-processed fresh-air flow rate Qas02, and simultaneously a flow-rate correction is performed on the basis of a result of the reverse-flow detection, to produce a corrected fresh-air flow rate (or a reverse-flow corrected value) Qas03. In step S345, an averaging process is made with respect to the corrected fresh-air flow rate Qas03 to produce the averaged intake-air flow rate Qas0. The advance processing of step S343 is hereinbelow described in detail with respect to the sub-routine shown in FIG. 55. The advance-processing indicated in FIG. 55 is executed as time-triggered interrupt routines to be triggered every predetermined time intervals such as 4 msec. As may be appreciated from the air-flow-meter response characteristic curve shown in FIG. 56 (a step-response test data) which is experimentally assured by the inventor, the typical hot-wire type air-flow meter has a first time constant (or a first lag coefficient) T1 as indicated by the zone A and a second time constant (a second lag coefficient) T2 as indicated by the zone B.

Referring now to FIG. 55, in step 351, in consideration of the first time constant T1, a first advance processing is performed in accordance with the following expression.

$$Qa11 = Qas01n-1 + (Qas01 - Qas01n-1) \times 0.004/T1$$

where Qas01n−1 denotes the previous value of the induced fresh-air flow rate converted at step S342, Qas01 denotes the current value of the induced fresh-air flow rate, and T1 denotes the first time constant.

In step S352, in consideration of the second time constant T2, a second advance processing is performed to produce a secondarily-advanced-processed fresh-air flow rate Qas02, in accordance with the following expression.

$$Qas02 = Qa11n-1 + (Qa11 - Qa11n-1) \times 0.004/T2$$

where Qa11n−1 denotes the previous value of the primarily-advance-processed fresh-air flow rate calculated at step S351 one cycle before, Qas11 denotes the current value of the primarily-advance-processed fresh-air flow rate calculated in step S351 at the current arithmetic-operation cycle, and T2 denotes the second time constant.

Figure 57:
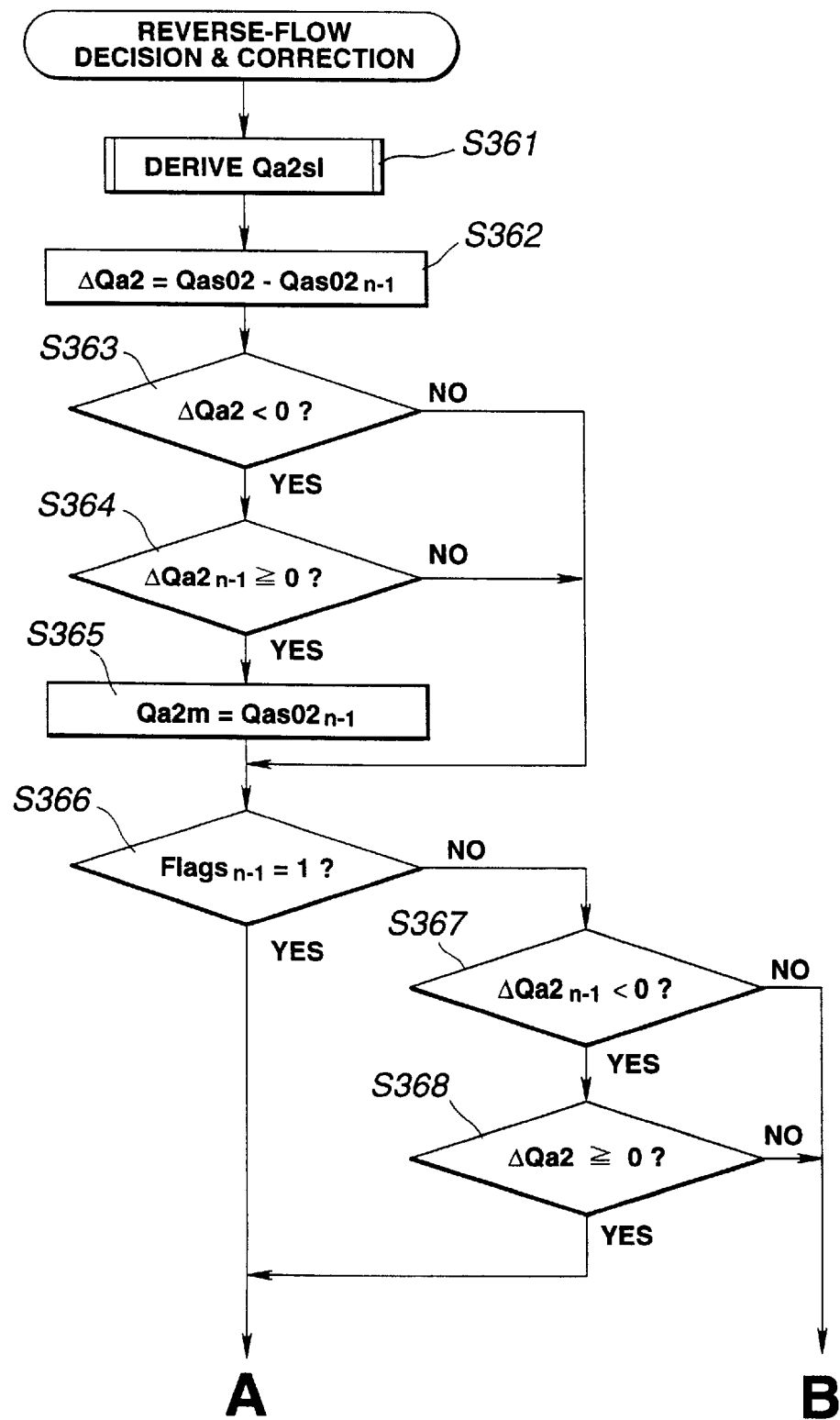
FIG. 57 is the former stage of a flow chart illustrating a routine for a reverse-flow decision and an intake-air-flow-rate correction.
Figure 58:
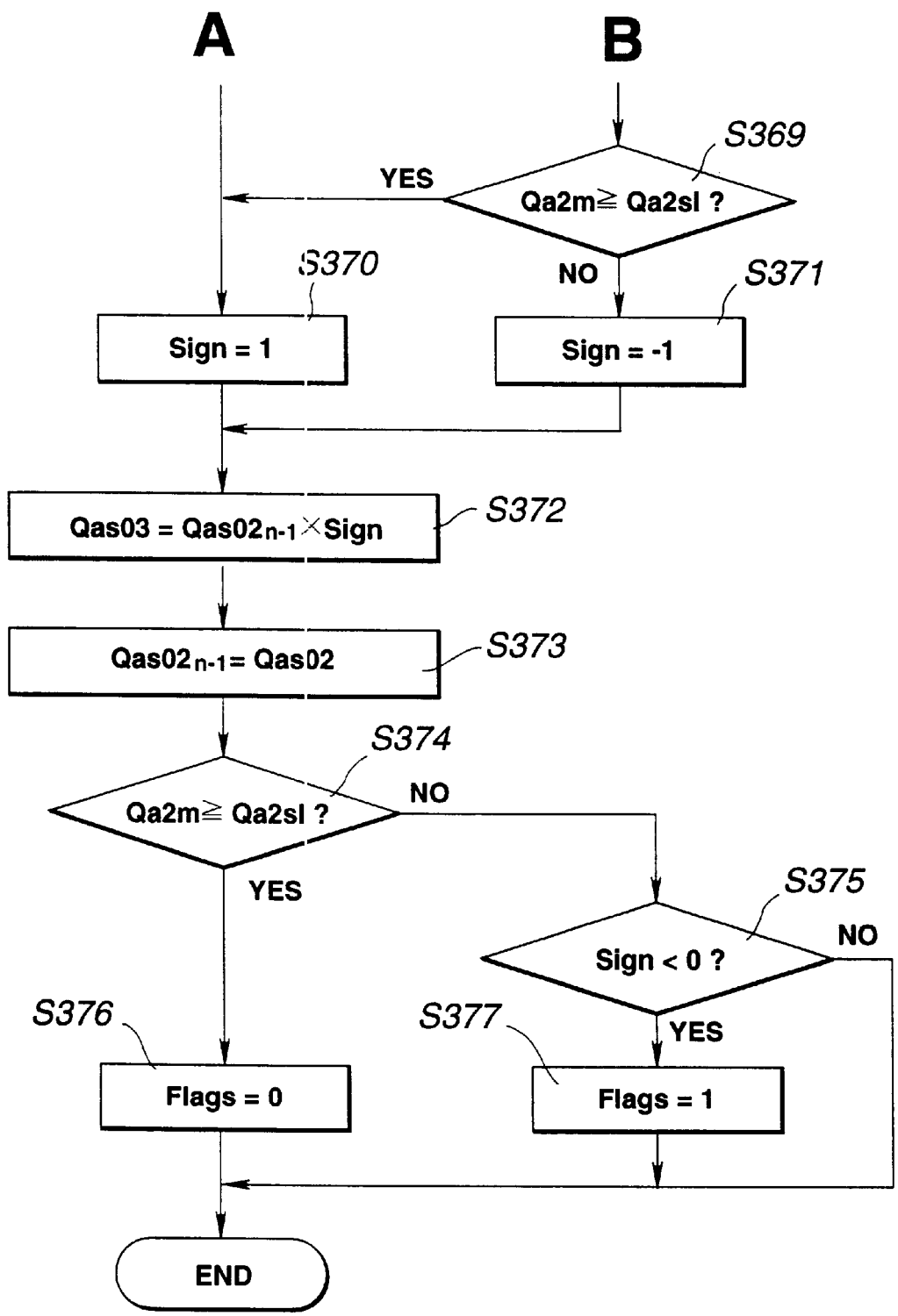
FIG. 58 is the latter stage of the flow chart shown in FIG. 62.

Referring now to FIGS. 57 and 58, there is shown a flow chart required for the reverse-flow detection and the flow-rate correction.

In step S361, calculated is a comparative value (or an upper slice level) Qa2sl which is compared with a maximal value of the induced fresh-air flow rate, considering the engine operating conditions. The comparative value Qa2sl will be hereinafter described in detail with respect to the sub-routine shown in FIG. 59.

In step S362, calculated is the variation from the previous value Qas02n−1 of the secondarily-advance-processed fresh-air flow rate calculated through step S352 one cycle before to the current secondarily-advance-processed fresh-air flow rate Qas02, that is, the deviation ΔQa2 (=Qas02−Qas02n−1) between the current flow rate Qas02 and the previous flow rate Qas02n−1.

In step S363, a test is made to determine whether the deviation ΔQa2 is a negative number. When the answer to step S363 is affirmative (YES), i.e., in case of ΔQa2<0, step S364 proceeds in which a test is made to determine whether the previous value ΔQa2n−1 of the deviation is greater than or equal to "0". In case of ΔQa2≧0 in step S363 or in case of ΔQa2n−1<0 in step S364, the procedure jumps to step S366. When the answer to step S364 is YES (ΔQa2n−1≧0), step S365 enters in which the pervious deviation ΔQa2n−1 is regarded as a maximal value Qa2m, and thus the maximal value Qa2m is updated by the deviation ΔQa2n−1. In step S363 ΔQa2<0 means that the current flow rate Qas02 decreases from the previous flow rate Qas02n−1 at the timing of the current arithmetic operation. Also, in step S364 ΔQa2n−1≧0 means that the previous flow rate Qas02n−1 increases from the secondarily-advance-processed fresh-air flow rate Qas02n−2 calculated at step S352 two cycles before. That is, the flow from step S363 via step S364 to step S365 means that the previous flow rate Qas02n−1 corresponds to a maximal value since the secondarily-advance-processed fresh-air flow rate Qas02 varies from the increasing direction to the decreasing direction. In the case that the two conditions defined in steps S363 and S364 are unsatisfied simultaneously, the maximal value Qa2m stored in the predetermined memory address in the control unit of the system of the fifth embodiment is not updated and as a result the previous value of the maximal value Qa2m is held as the current value.

In step S366, a test is made to determine whether the previous value Flagsn−1 of a sign-decision flag Flags is "1" or "0". When the answer to step S366 is affirmative, i.e., in case of Flagsn−1=1, step S370 proceeds in which a sign flag Sign is set at "1". Conversely, when the answer to step S366 is negative (NO), i.e., in case of Flagsn−1=0, step S367 enters in which a test is made to determine whether the previous deviation ΔQa2n−1 is a negative number. When the answer to step S367 is affirmative, i.e., in case of ΔQa2n−1<0, step S368 proceeds in which a test is made to determine whether the current deviation ΔQa2 is equal to or greater than "0". When the answer to step S368 is affirmative (YES), the procedure flows to step S370 to set the flag Sign at "1". When the answer to step S368 is negative (NO), step S369 proceeds in which a test is made to determine whether the maximal value Qa2m is equal to or greater than the slice level Qa2sl. When the answer to step S367 is negative (NO), the procedure flows to step S369 to compare the maximal value Qa2m with slice level Qa2sl. When the condition of Qa2m≧Qa2sl at step S369 is satisfied, step S370 proceeds in which the sign flag Sign is set at "1". In case of Qa2m<Qa2sl, step S371 proceeds in which the sign flag Sign is set at "−1". Thereafter, in step S372, the corrected fresh-air flow rate Qas03 is obtained by multiplying the previous secondarily-advance-processed fresh-air flow rate Qas02n−1 by the value of the current sign flag Sign, in accordance with the following expression.

$$Qas03 = Qas02n{-}1 \times Sign$$

In step S373, the previous secondarily-advance-processed fresh-air flow rate Qas02n−1 is updated by the current secondarily-advance-processed fresh-air flow rate Qas02 so that the current value Qas02 is stored in the predetermined memory address in the memory of the control unit.

In step S374, a test is made to determine whether the maximal value Qa2m is equal to or greater than the slice level Qa2sl. In case of Qa2m≧Qa2sl, the procedure flows from step S374 to step S376 in which the sign-decision flag Flags is reset at "0". In case of Qa2m<Qa2sl, the procedure flows from step S374 to step S375 in which a test is made to determine whether the sign flag Sign is "−1". In case of Sign<0 at step S375, step S377 proceeds in which the sign-decision flag Flags is set at "1". In case of Sign≧0 at step S375, the value of the sign-decision flag Flags remains unchanged and then one cycle of this sub-routine terminates.

Figure 59:
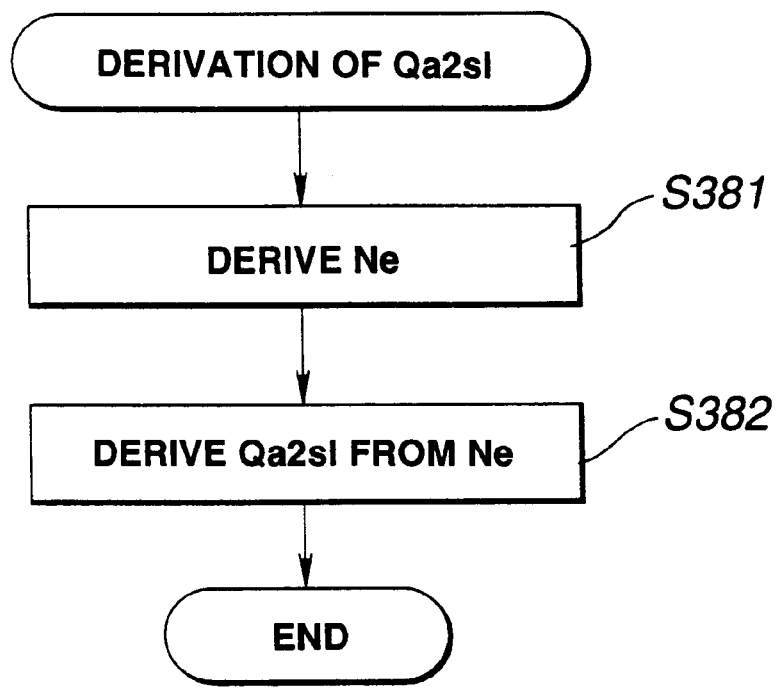
FIG. 59 is a flow chart illustrating a routine for derivation of a comparative value or a slice level (Qa2sl).
Figure 60:
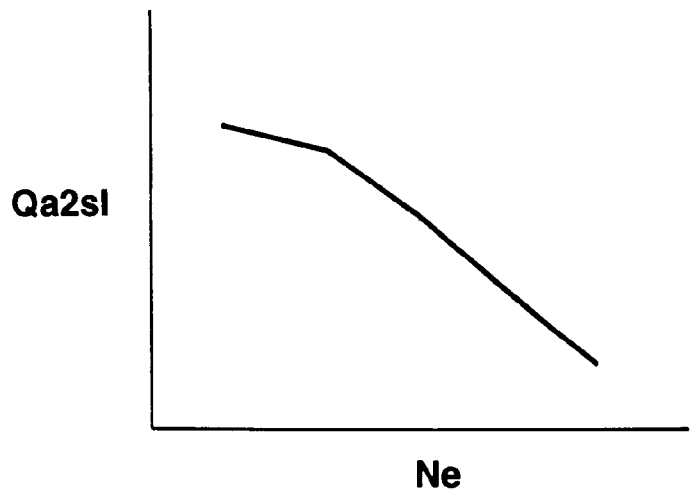
FIG. 60 is a look-up table illustrating the relationship between the engine speed (Ne) and the slide level (Qa2sl).

Referring now to FIG. 59, there is shown one arithmetic-operation sub-routine for calculation of the previously-noted comparative value (the slice level) Qa2sl. In step S381, read as the engine operating condition is the engine speed Ne. In step S382, the comparative value Qa2sl is derived or retrieved from the engine speed Ne by reference to the look-up table as shown in FIG. 60. As can be appreciated from the characteristic curve shown in FIG. 60, the slice level Qa2sl gradually decreases as the engine speed Ne increases, because the reverse-flow component included in the voltage signal generated from the air-flow meter tends to reduce in accordance with the increase in the engine speed Ne. Also in the conventional system, it is desired to improve the accuracy of measurement of the induced fresh air flow particularly within an engine low-speed range.

Figure 61:
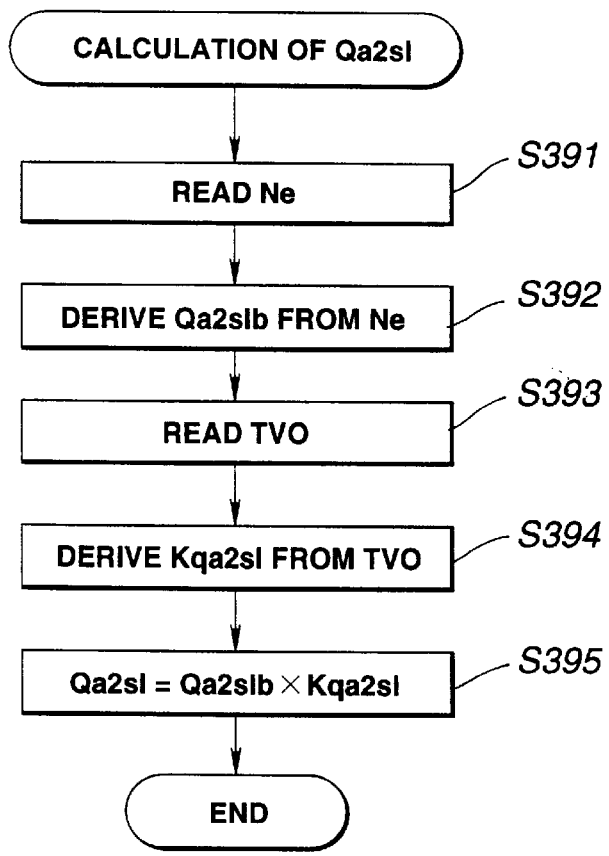
FIG. 61 is a flow chart illustrating another routine for derivation of a slice level (Qa2sl).
Figure 62:
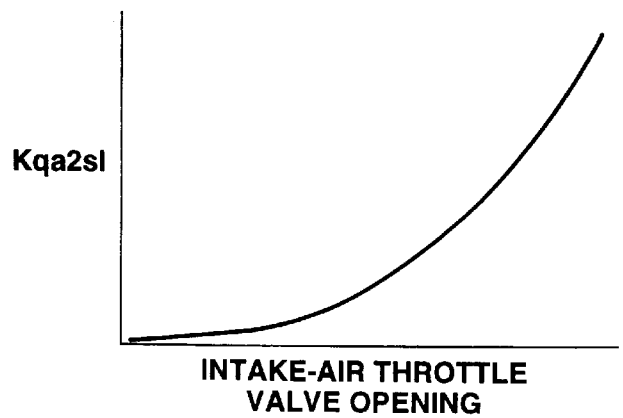
FIG. 62 is a characteristic curve illustrating the relationship between the intake-air throttle-valve-opening (TVO) and a intake-air throttle-valve-opening dependent slice-level correction coefficient (Kqa2sl).

Referring now to FIG. 61, there is shown another arithmetic-operation sub-routine for calculation of the previously-noted comparative value (the slice level) Qa2sl. In the same manner as the flow from step S381 to step S382 in FIG. 59, in another routine, the engine speed Ne is firstly read in step S391 and then in step S392 a basic slice level (or a basic comparative value) Qa2slb is retrieved from the engine speed Ne by reference to the look-up table as shown in FIG. 60. Thereafter, in step S393, the intake-air throttle-valve opening TVO is read. In step S394, a throttle-valve-opening dependent slice-level correction factor Kqa2sl is retrieved from the intake-air throttle-valve opening TVO, by reference to the look-up table as shown in FIG. 62. In step S395, a final comparative value or a final slice level Qa2sl is calculated by multiplying the basic slice level Qa2slb by the correction factor Kqa2sl. As may be appreciated from the characteristic curve shown in FIG. 62, the throttle-valve-opening dependent slice-level correction factor Kqa2sl is designed so that the slice level Qa2sl is set at a comparatively lower level in the case that the throttle-valve opening TVO is less and thus the induced fresh-air flow is reduced and the reverse-flow component included in the induced fresh-air flow reduces owing to the increase in the flow velocity of the induced fresh-air flow, and so that the slice level Qa2sl is set at a comparatively higher level in case of a greater throttle-valve opening wherein there is a greatly increased tendency for the above-mentioned reverse-flow component to increase.

Figure 63:
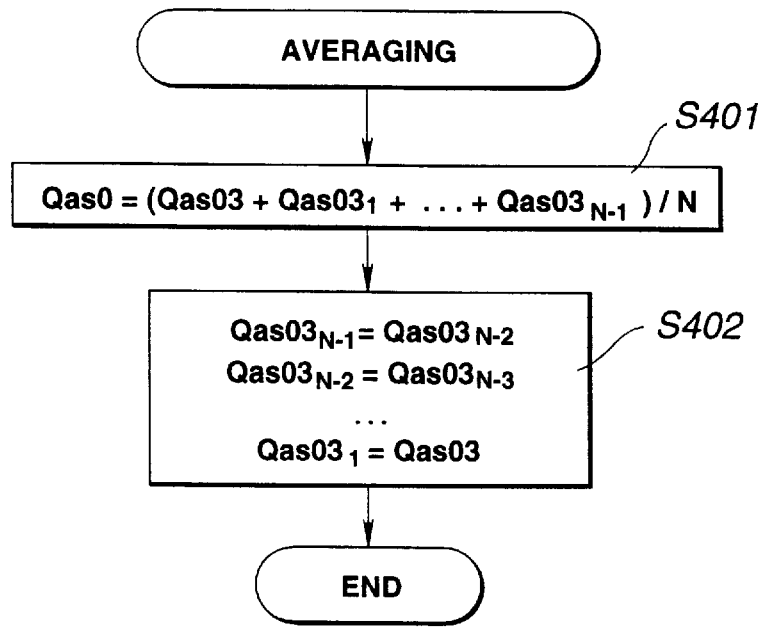
FIG. 63 is a flow chart illustrating an averaging routine for the reverse-flow corrected intake-air flow rates (Qas03).

Referring now to FIG. 63, there is shown the arithmetic-operation sub-routine for averaging the reverse-flow corrected fresh-air flow rate Qas03. In step S401, in order to produce an averaged intake-air flow rate Qas0, averaged are the current reverse-flow corrected fresh-air flow rate datum Qas03 and the other reverse-flow corrected fresh-air flow rate data $Qas03_1, Qas03_2, \ldots, Qas03_{N-2}, Qas03_{N-1}$ which data stored in predetermined memory addresses from (n−1) cycles before. As clearly indicated in the box of step S402, the data stored in the memory addresses are shifted every cycles. As set forth above, the detected fresh-air flow rate indicative voltage signal from the air-flow meter is properly advance-processed in consideration of the response lag (the two time constants T1 and T2) of the air-flow meter, and the reverse-flow of the induced fresh air flow is accurately detected, and the reverse-flow component included in the output signal from the air-flow meter is precisely corrected, and thereafter the precisely corrected fresh-air flow rates (Qas03) are averaged in consideration of pulsation flow of the induced fresh air. As a result of this, the induced fresh-air flow rate can be precisely calculated or estimated on the basis of the output from the air-flow meter, thus ensuring a high-precision air-fuel-ratio control, irrespective of changes in the engine operating conditions including the environmental change as well as engine load and engine speed. As previously explained, particularly in diesel engines, since the EGR control and the fuel-injection-amount control are both based on the induced fresh-air flow rate detected by the air-floe meter, the reverse-flow corrected and properly averaged fresh-air flow rate (Qas0) can assure a more precise EGR control, thus effectively reducing NOx emissions and particulates. Furthermore, the fresh-air flow rate (Qas0) precisely calculated can assure a more precise fuel-injection-amount control, thus preventing black smoke to increase.

Figure 64:
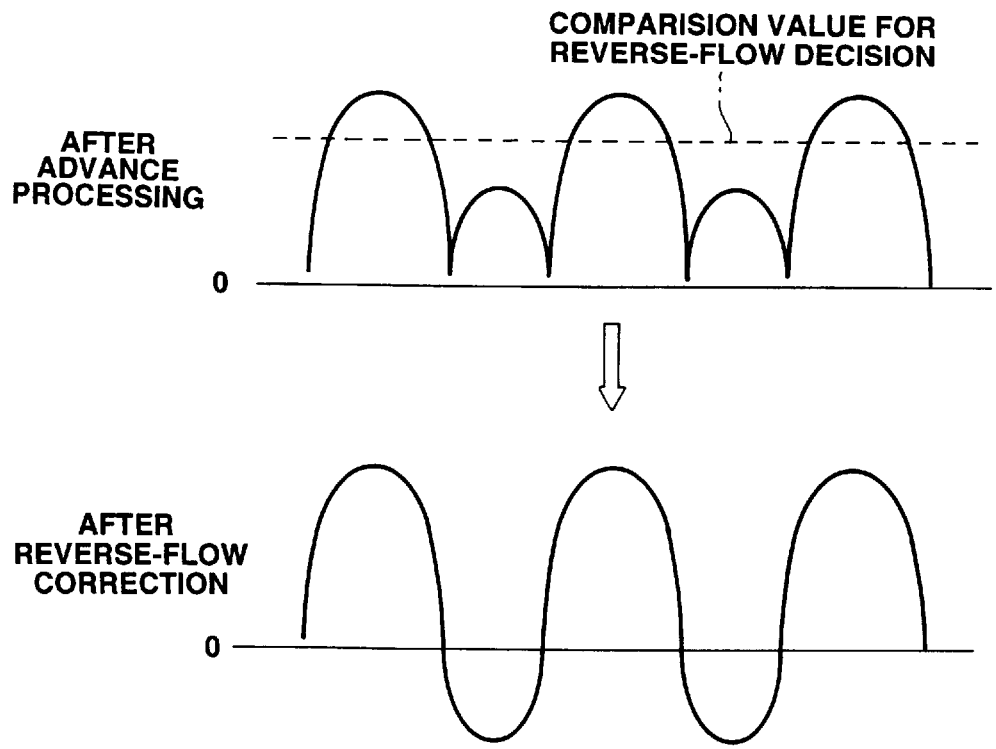
FIG. 64 is an explanatory view illustrating the reverse-flow correction.
Figure 65:
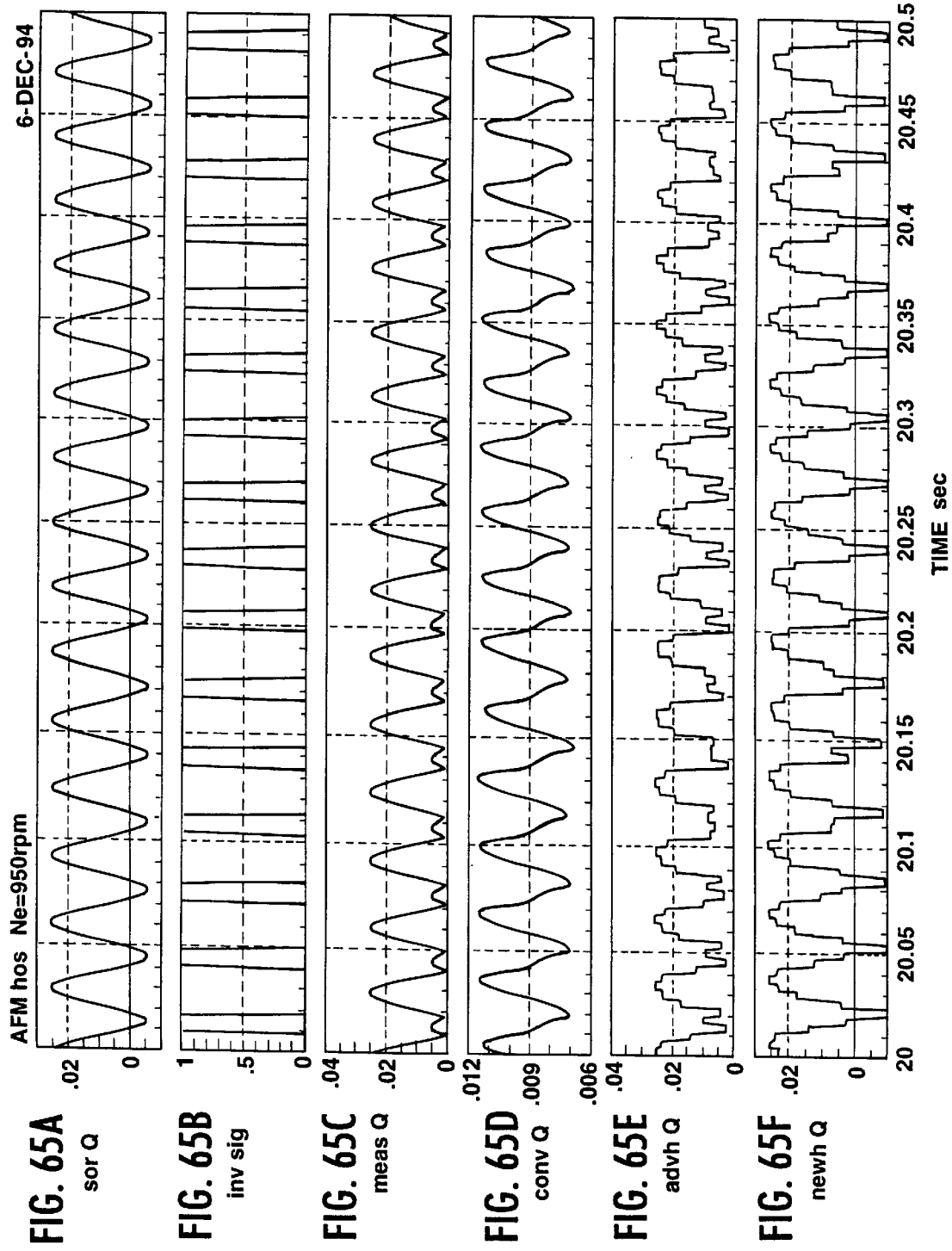
FIGS. 65A–65F are timing charts illustrating various signal waveforms obtained through an arithmetic operation of the system of the fifth embodiment.
Figure 66:
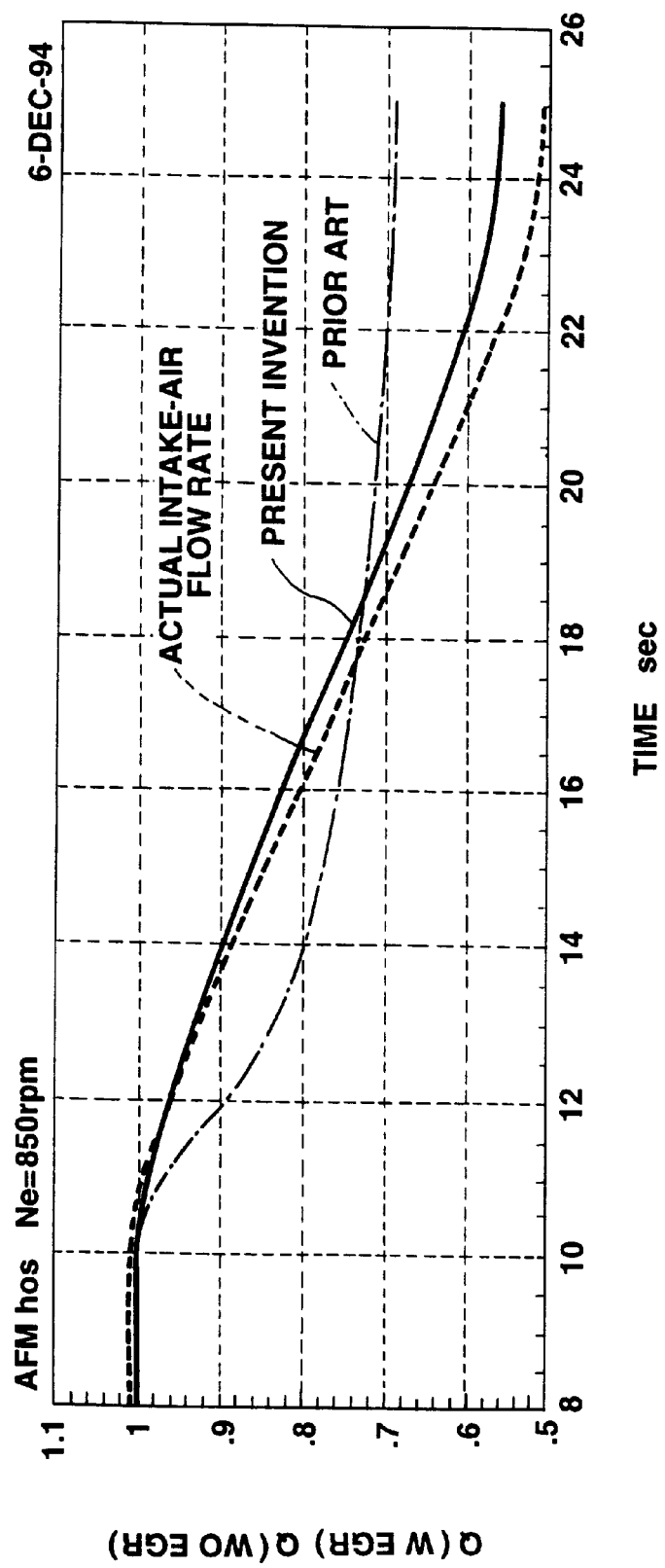
FIG. 66 is a graph illustrating comparative results among the actual intake-air flow rate, the intake-air flow rate (indicated by the solid line) obtained through the arithmetic operation of the system of the fifth embodiment and the intake-air flow rate (indicated by the one-dotted line) obtained through the arithmetic operation of the prior art system.

Referring now to FIG. 64, there is shown a simplified explanatory view illustrating the reverse-flow correction. The upper half of FIG. 64 shows the waveform of the signal advance-processed through step S343, whereas the lower half of FIG. 64 shows the waveform for the signal after the reverse-flow correction. As appreciated from the flow from step S369 via step S371 to step S372 in FIG. 58, when the maximal value Qa2m is less than the slice level Qa2sl, the advance-processed signal Qas02 is properly inversed (see the lower half of FIG. 64), and thus the induced air-flow rate is precisely estimated. As indicated by the broken line of FIG. 64, the characteristics shown in FIGS. 60 and 62 are predetermined so that the slice level Qa2sl is set at a value less than a maximal value of a comparatively greater ridge indicating the forward-flow component of the induced fresh air and greater than a maximal value of a comparatively less ridge indicating the reverse-flow component of the induced fresh air. FIG. 65 shows test results in the form of the timing chart in case that the EGR control system is in operative state in the diesel engine. From the uppermost chart to the lowermost chart, the respective charts respectively indicate the actual intake-air flow rate, the reverse-flow indicative signal, the measured intake-air flow rate detected by the air-flow meter, the intake-air flow-rate indicative signal generated from the prior art system, the intake-air flow rate obtained through the advance-processing of the present invention, and the final output of intake-air flow rate indicative signal obtained through the reverse-flow correction processing. As may be appreciated from comparison of the uppermost chart (the actual intake-air flow rate) and the lowermost chart (the finally corrected signal after the reverse-flow correction), the finally corrected signal obtained through the system of the present invention is more approximate to the actual intake-air flow rate, as compared with the prior art system. FIGS. 66 shows test results under a particular condition in which the engine revolution speed is held at 850 rpm, and the EGR control system is in operative, and the reverse-flow component included in the induced air flow gradually increases from 10 sec after the beginning of the test while keeping the amplitude of pulsation substantially constant. As seen in FIG. 66, the prior art system exhibits such a tendency that its test data (indicated by the one-dotted line) is kept at a considerably lower level in the former half of the measurement duration of the induced fresh-air flow, and that the data is kept at considerably higher level in the latter half of the measurement duration, as compared with the actual flow rate (indicated by the broken line). On the other hand, the system of the present invention exhibits such a tendency that the data (indicated by the solid line) obtained corrections of the present invention is essentially approximate to the actual flow rate.

Figure 67:
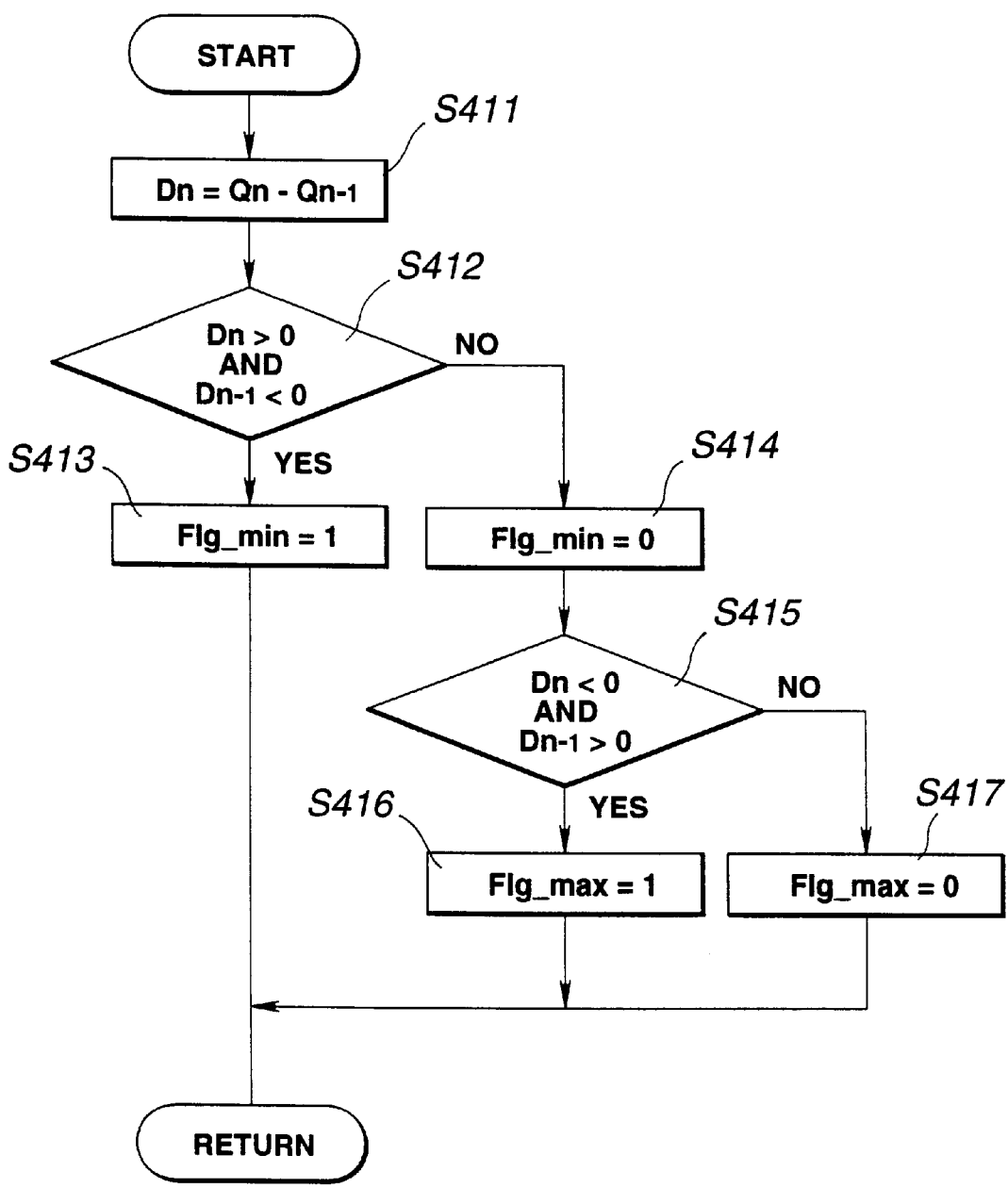
FIG. 67 is a flow chart illustrating another routine for decision of an extreme value of the voltage signal from the air-flow meter.

Referring now to FIG. 67, there is shown another routine for decision of an extreme value (a maximal value or a minimal value) of the output voltage signal Qo from the hot-wire type air-flow meter 16 (see FIG. 1). In step S411, the current value Qn of the air-flow meter output Qo and the previous value Qn−1 are derived from the predetermined memory addresses, and then the deviation Dn (=Qn−Qn−1) between the current value Qn and the previous value Qn−1 is calculated. In step S412, a test is made to determine whether the current deviation Dn is a positive number, i.e., Dn>0, and additionally the previous deviation Dn−1 is a negative number, i.e., Dn−1<0. The condition defined by the inequalities Dn>0 and Dn−1<0 means that the voltage signal value of the air-flow meter varies from a direction of decrease of the voltage signal to a direction of increase of the voltage signal. In such a case, the control unit determines that the signal value of the voltage signal currently generated from the air-flow meter corresponds to a minimal value. When this condition is satisfied, i.e., in case that the answer to step S412 is affirmative (YES), step S413 proceeds in which a minimal-state indicative flag Flg_min is set at "1". In contrast to the above, when the answer to step S412 is negative (NO), step S414 proceeds in which the minimal-state indicative flag Flg_min is set at "0", and then step S415 enters. In step S415, a test is made to determine whether the current deviation Dn is a negative number (Dn<0) and additionally the previous deviation Dn−1 is a positive number (Dn−1>0). The condition defined by the inequalities Dn<0 and Dn−>0 means that the voltage signal value of the air-flow meter varies from a direction of increase of the voltage signal to a direction of decrease of the voltage signal. Thus, the control unit determines that the signal value of the voltage signal currently generated from the air-flow meter corresponds to a maximal value. In case that the answer to step S415 is affirmative (YES), step S416 proceeds in which a maximal-state indicative flag Flg_max is set at "1". In contrast to the above, in case that the answer to step S415 is negative (NO), step S417 proceeds in which the maximal-state indicative flag Flg_max is set at "0". Thereafter, the procedure returns to the main routine.

Figure 68:
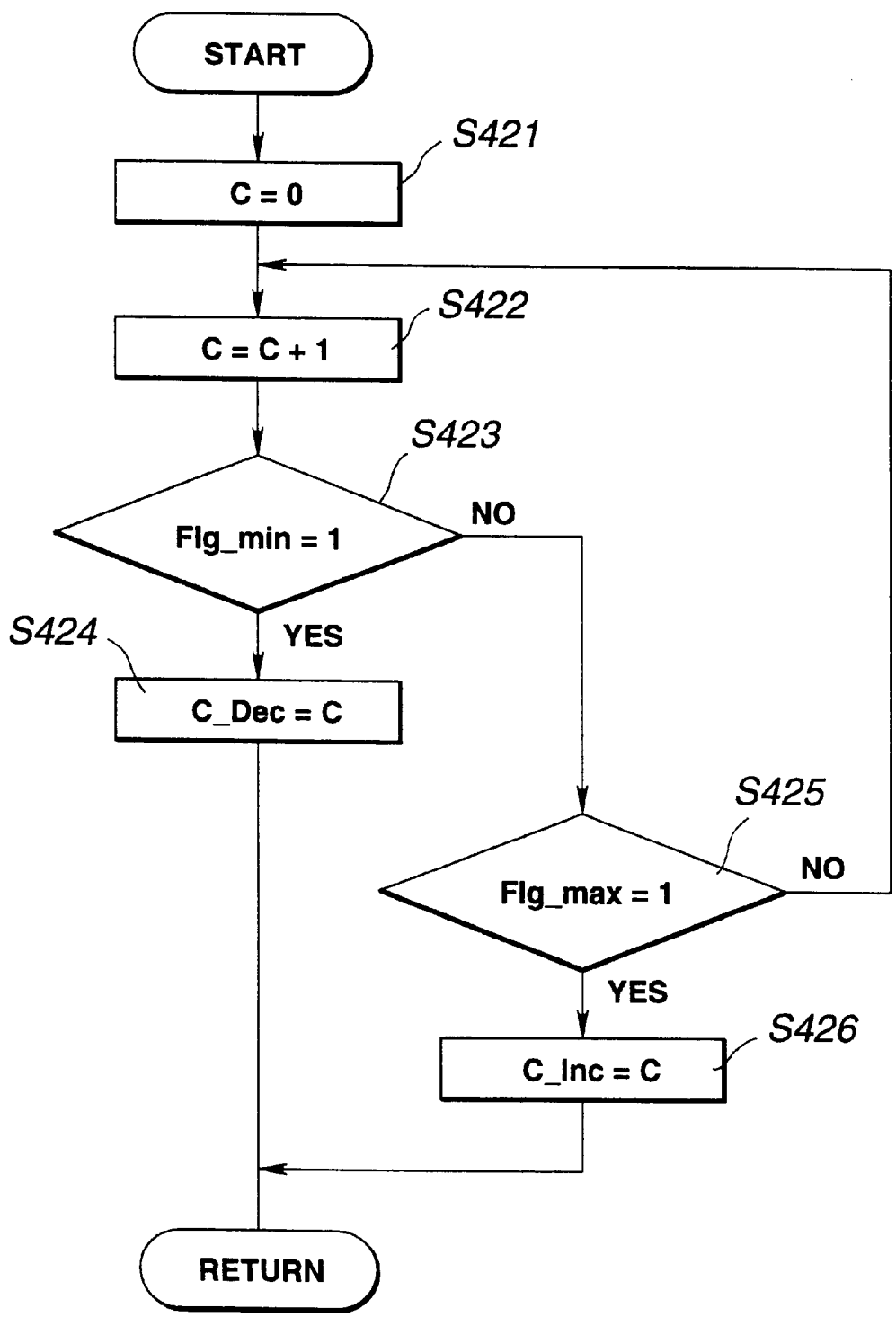
FIG. 68 is a flow chart illustrating a sub-routine for counting both an increasing time-interval and a decreasing time-interval of the voltage signal from the air-flow meter.

Referring now to FIG. 68, there is shown the sub-routine for counting both a signal-value increasing time interval C_Inc and a signal-value decreasing time interval C_Dec with regard to the output voltage signal Qo from the air-flow meter.

In step S421, a counted value C of the counter (or the timer) is reset to "0". In step S422, the counted value C is incremented by "1". In step S423, a test is made to determine whether the minimal-state indicative flag Flg_min is "1". If the condition of Flg_min=1 is satisfied, that is, the minimal state is satisfied, step S424 enters in which the signal-value decreasing time interval C_Dec is updated by the current counted value C. In contrast, when the answer to step S423 is negative (NO), step S425 proceeds in which a test is made to determine whether the maximal-state indicative flag Flg_max is "1". In case that the flag Flg_max is already set at "1" and thus the control unit determines that the maximal state is satisfied at the current timing, step S426 proceeds in which the signal-value increasing time interval C_Inc is updated by the current counted value C. In case that the condition of Flg_max=1 is unsatisfied, that is, both the answers to steps S423 and to step S425 are negative, and thus the control unit determines that the minimal state and the maximal state are both unsatisfied, the procedure returns to step S422 to continuously count up the counted value of the timer. In this manner, the signal-value decreasing time interval C_Dec and the signal-value increasing time interval C_Inc can be precisely measured.

Figure 69:
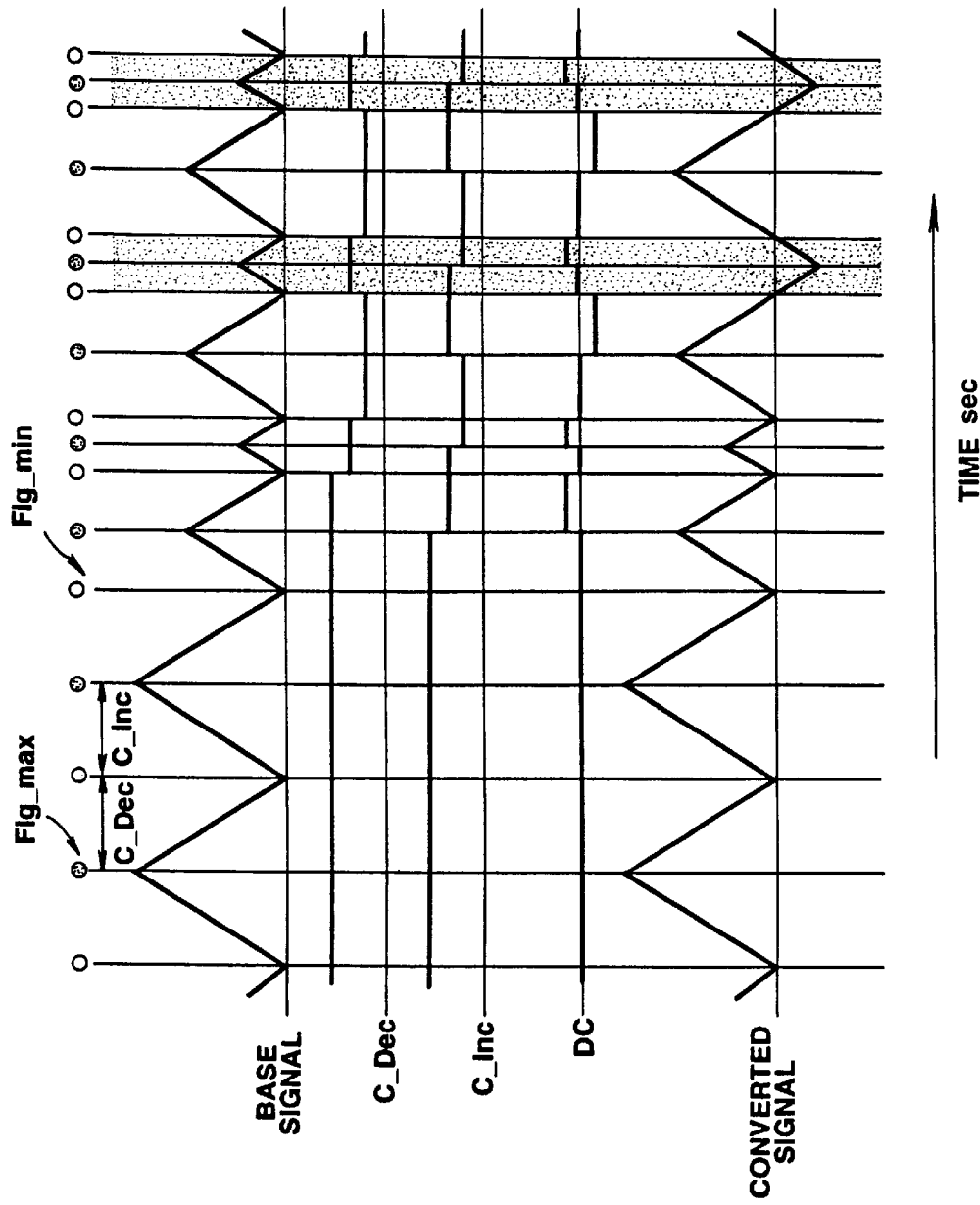
FIG. 69 is a simplified timing chart explaining the relationship between a base signal indicative of simplified pulsation flow, a signal-value decreasing time-interval indicative signal C_Dec, a signal-value increasing time-interval indicative signal C_Inc, a deviation signal DC, and a converted signal (including an inversed signal based on the reverse-flow decision).

Referring now to FIG. 69, there is shown the simplified explanatory timing chart related to the sub-routines shown in FIGS. 67 and 68. The former-half time period of FIG. 69 shows the simplified waveform of a base signal output from the air-flow meter in absence of the reverse flow in the induction passage, while the latter-half time period of FIG. 69 shows the simplified waveform of a base signal output from the air-flow meter in case of occurrence of the reverse flow. In the absence of the reverse flow (as seen from the former half), the base signal periodically oscillates at an essentially identical cycle with a comparatively long wavelength. In the presence of the reverse flow (as seen from the latter half), the waveform of the signal from the air-flow meter is constructed by a medium ridge (corresponding to a forward air flow) and a small ridge (corresponding to a reverse air flow) combined with each other, since the air-flow meter detects and outputs the reverse-flow component as a positive signal value. By way of the routine shown in FIG. 67, the minimal state (Flg__min=1) and the maximal state (Flg__max=1) are detected. By way of the routine shown in FIG. 68, the signal-value increasing time interval C__Inc and the signal-value decreasing time interval C__Dec are measured. As seen from the waveforms of the upper three signals, namely the base signal, the signal-value decreasing time interval indicative signal (C__Dec) and the signal-value increasing time interval indicative signal (C__Inc), at the timing (as marked by the black dot) of decision of the maximal value, i.e., when the condition (Flg__max=1) is satisfied, the measurement for the signal-value decreasing time interval C__Dec begins, and this measurement continues until the minimal value is reached from the maximal value, i.e., the flag Flg__min is set at "1". As soon as the minimal value is reached, the signal-value decreasing time interval C__Dec is updated by a newly measured time interval. Similarly, at the timing (as marked by the small circle) of decision of the minimal value, i.e., when the condition (Flg__min=1) is satisfied, the measurement for the signal-value increasing time interval C__Inc begins, and this measurement continues until the maximal value is reached from the minimal value, i.e., the flag Flg__max is set at "1". As soon as the maximal value is reached, the signal-value increasing time interval C__Inc is updated by a newly measured time interval. In FIG. 69, the signal DC denotes the deviation between the signal-value decreasing time interval indicative signal C__Dec and the signal-value increasing time interval indicative signal C__Inc, and the shaded zones show respective signal-processed zones or inverted signal zones which can be determined depending on the comparison of the decreasing time interval C__Dec and the increasing time interval C__Inc, precisely depending on the deviation DC (=C__Dec−C__Inc). The signal-processing is actually based on the flow chart shown in FIG. 70. The sub-routine shown in FIG. 70 is cooperative with the two sub-routines discussed in FIGS. 67 and 68 so as to decide the presence of the reverse-flow and the time interval of the reverse flow and timely precisely set a signal-inversion flag Flg__neg at "1", as explained later.

Figure 70:
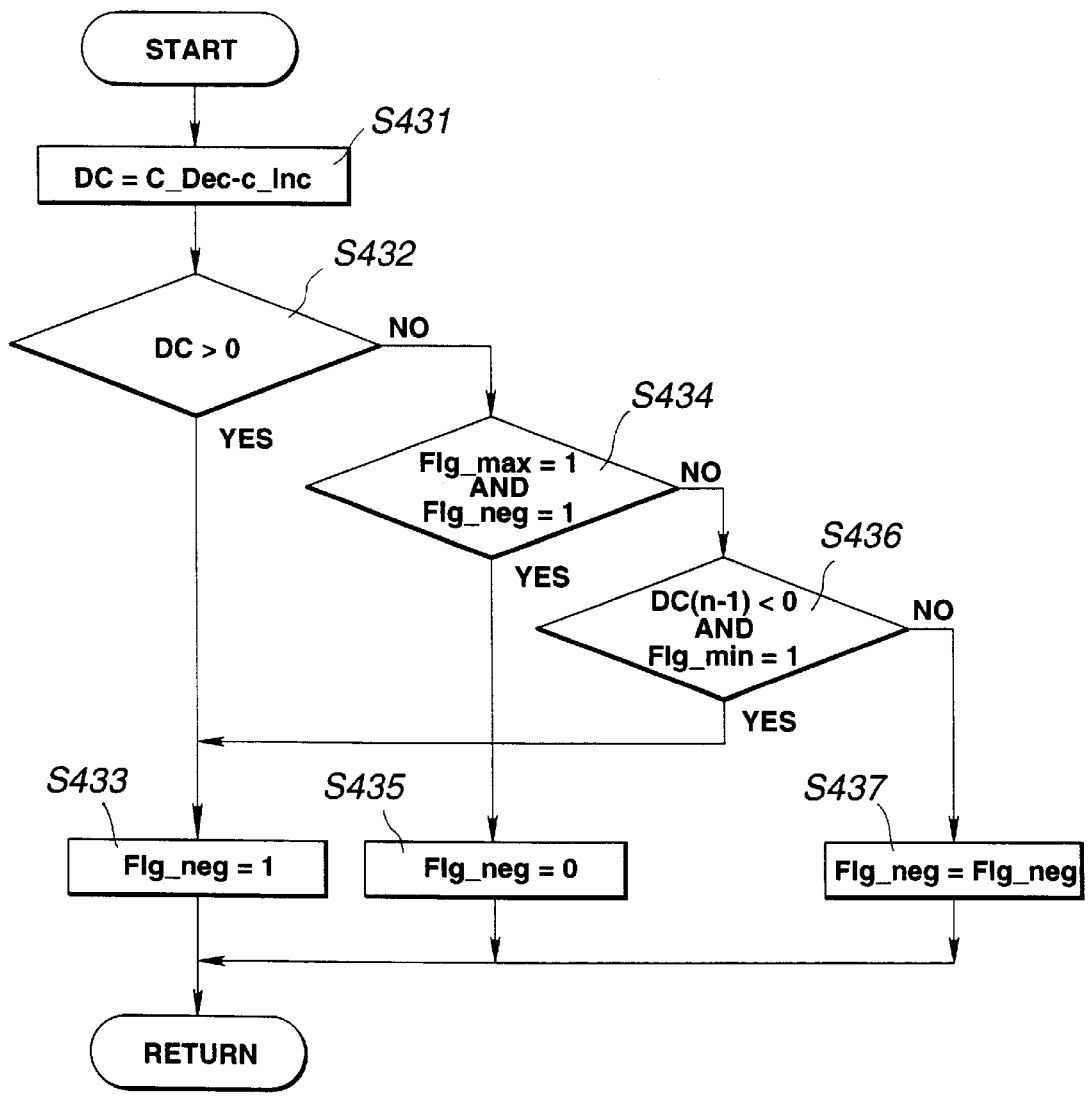
FIG. 70 is a flow chart illustrating a routine for an inversion procedure based on the reverse-flow decision.

Referring to FIG. 70, in step S431, calculated by the expression (DC=C__Dec−C__Inc) is the deviation DC between the current value of the decreasing time interval C__Dec and the current value of the increasing time interval C__Inc. In step S432, a test is made to determine whether the current deviation DC is a positive number, that is DC>0. When the answer to step S432 is affirmative, step S433 proceeds in which the signal-inversion flag Flg__neg is set at "1". When the answer to step S432 is negative, step S434 proceeds in which a test is made to determine whether the maximal-state indicative flag Flg__max and the signal-inversion flag Flg__neg are both set at "1". When the answer to step S434 is affirmative, step S435 enters so that the signal-inversion flag Flg__neg is reset to zero. When the answer to step S434 is negative, step S436 proceeds in which a test is made to determine whether the previous value DC(n−1) of the deviation is a negative number and additionally the minimal-state indicative flag Flg__min is "1". When the answer to step S436 is affirmative (YES), the procedure flows to step S433 so as to set the flag Flg__neg at "1". In contrast to the above, when the answer to step S436 is negative (NO), step S437 proceeds in which the previous value of the flag Flg__neg is regarded as the current value of the flag Flg__neg, that is, the previous value of the flag Flg__neg remains unchanged through the current routine. As may be appreciated from the flow chart of FIG. 70, the control unit decides the presence of the reverse flow and then the signal-inversion flag Flg__neg is set at "1", in the case that the current value of the deviation DC is a positive number or for instance as appreciated from the shaded zones of FIG. 69 in the case that the deviation DC is kept at zero during the time period from the time when the deviation DC is changed from the negative number to zero and additionally the minimal value becomes reached to the time when a next maximal value is reached. Therefore, the previously-noted averaging process is performed on the basis of the converted or inverted signal of FIG. 69, to produce the final fresh-air flow rate indicative signal (Qas0), thereby ensuring a high-precision EGR control and a high-precision fuel-injection amount control (or a high-precision air-fuel-ratio control).

Figure 71A:
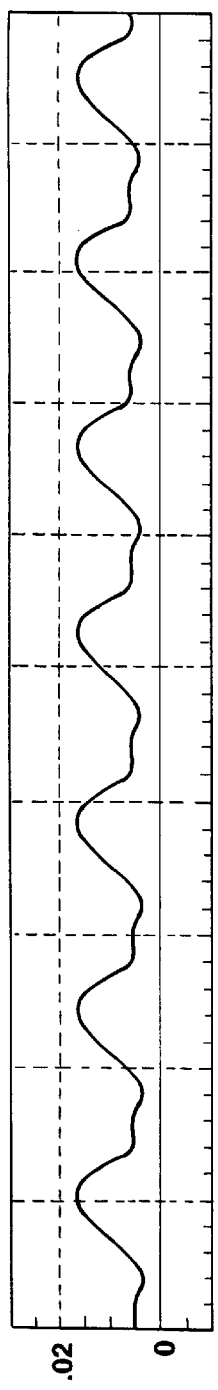
FIGS. 71A to 71C are timing charts respectively illustrating a waveform of a signal from the hot-wire type air-flow meter, a waveform of a signal obtained through the advance-processing, and a waveform of a signal obtained through the reverse-flow correction.
Figure 71B:
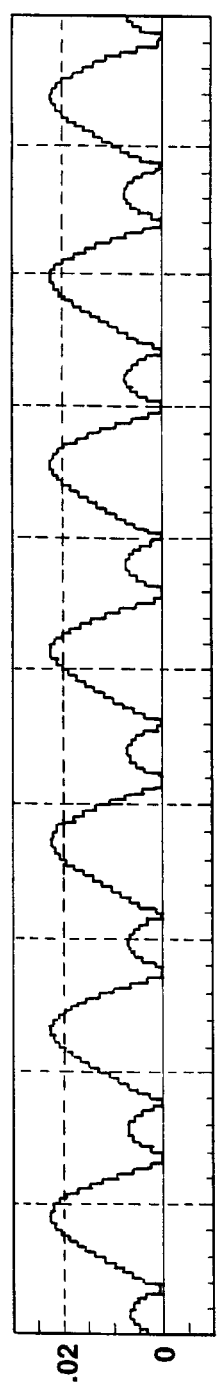
Figure 71C:
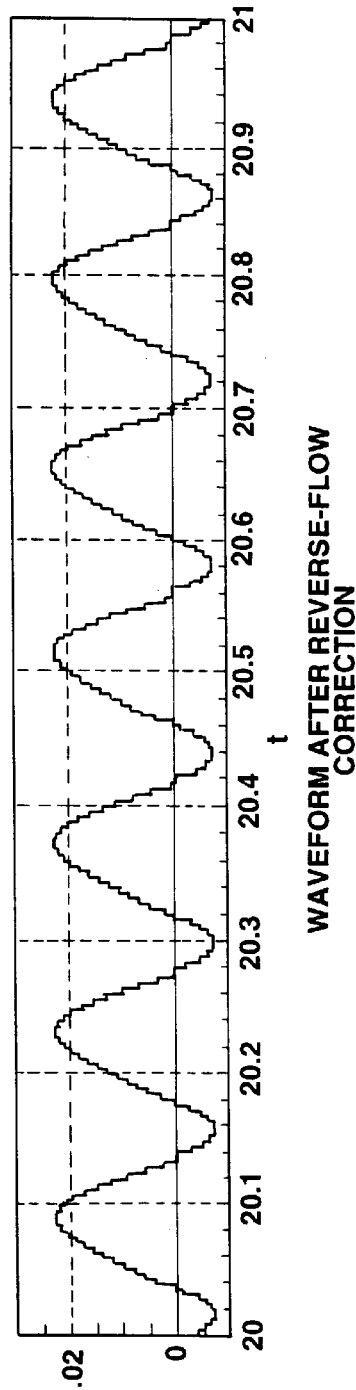

FIGS. 71A through 71C show test results similar to the test shown in FIG. 65, in case of the signal-processing made to the signal output from the hot-wire type air-flow meter for the reverse-flow correction related to the flow charts shown in FIGS. 67, 68 and 70. FIGS. 71A, 71B and 71C respectively indicate the waveform of the signal output from the air-flow meter, the waveform of the signal advance-processed, and the waveform of the signal properly converted or inverted through the reverse-flow correction. On the other hand, FIG. 72 shows simulation results in case that the system of the fifth embodiment is applied to a diesel engine with an EGR control system as shown in FIGS. 1 and 29. The simulation test was performed by the inventor of the present invention under a condition in which the amount of exhaust-gas recirculation (EGR) gradually increases in accordance with an increase in elapsed time during idling so that the actual induced fresh-air flow rate measured by the hot-wire air-flow meter gradually reduces. Additionally, in the test, the engine speed is kept at 850 rpm and the sampling period of time is set at 1 msec, and induced fresh-air pulsation flow is applied in the form of a sinusoidal wave. As seen in FIG. 72, the actual intake-air flow rate, a flow-rate indicative signal obtained through the prior art system, and a properly signal-processed flow-rate indicative signal obtained through the flow shown in FIGS. 67, 68 and 70 are substantially same within a comparatively higher flow-rate range (until the elapsed time 14 sec). Within a comparatively lower flow-rate range (within the time interval from the elapsed time 22 sec to the elapsed time 24 sec), the signal-processed flow-rate indicative signal obtained through the present invention matches the actual flow rate, although the flow-rate indicative signal obtained through the prior art system is output as a signal level considerably higher than the actual flow rate. As will be appreciated from the above, the system of the fifth embodiment utilizes a typical inexpensive hot-wire air-flow meter, thus reducing total production costs of the integrated engine control system of the invention. Additionally, as set out above, the system of the fifth embodiment can insure a high-precision reverse-flow detection and ensure a high-precision induced air flow detection through the advance processing and the reverse-flow correction (the signal processing).

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed:

1. An integrated internal combustion engine control system in combination with an automotive emission control system, said engine control system comprising:

an exhaust-gas recirculation valve employed in an exhaust-gas recirculation system for sending some of exhaust gas back through an internal combustion engine;

air flow rate detection means for detecting a flow rate of intake air drawn into the engine;

engine-operating-condition detection means for detecting an operating condition of the engine;

target exhaust-gas recirculation rate setting means for setting a target exhaust-gas recirculation rate depending on said operating condition of the engine;

target exhaust-gas recirculation amount setting means for setting a target exhaust-gas recirculation amount as a function of said flow rate of intake air and said target exhaust-gas recirculation rate; and valve-opening control means responsive to said target exhaust-gas recirculation amount for controlling an opening of said exhaust-gas recirculation valve.

2. An integrated internal combustion engine control system as set forth in claim 1, wherein said valve-opening control means comprising a command exhaust-gas recirculation amount setting means for setting a command exhaust-gas recirculation amount (Tqec) by performing a predetermined advance processing with respect to said target exhaust-gas recirculation amount (Tqec0), and a controlled variable setting means for setting a controlled variable (Liftt) of the opening of said exhaust-gas recirculation valve depending on said command exhaust-gas recirculation amount.

3. An integrated internal combustion engine control system as set forth in claim 2, wherein a time constant of said predetermined advance processing is set depending on a volumetric capacity in an induction system from said exhaust-gas recirculation valve to an inlet of an engine cylinder and a volumetric capacity of the engine cylinder.

4. An integrated internal combustion engine control system as set forth in claim 3, wherein said command exhaust-gas recirculation amount is determined through said predetermined advance processing which is defined by a first expression represented by $Tqec = GKQE\# \times Tqec0 + (GKQE\# - 1) \times Rqecn-1$, a second expression represented by $Rqec = Rqecn-1 \times (1-Kv) + Tqec0 \times Kv$, and a third expression represented by $Kv = Kin \times Vc/Vm/CYLN\#$, where Tqec denotes said command exhaust-gas recirculation amount, GKQE# denotes an advance-processing gain constant, Tqec0 denotes said target exhaust-gas recirculation amount, Kv denotes a predetermined lag coefficient, Kin denotes a value equivalent to a volumetric efficiency, Vc denotes a volumetric capacity per cylinder, Vm denotes a volumetric capacity of the induction system including an intake manifold and a collector, and CYLN# denotes the number of engine cylinders.

* * * * *

UNITED STATES PATENT AND TRADEMARK OFFICE
CERTIFICATE OF CORRECTION

PATENT NO.      : 5,918,582
DATED           : July 6, 1999
INVENTOR(S)     : Hiroyuki Itoyama et al.

It is certified that error appears in the above-identified patent and that said Letters Patent is hereby corrected as shown below:

<u>Title page,</u>
Add -- [73] Assignee: Nissan Motor Co., Ltd., Japan --

Signed and Sealed this

Seventh Day of May, 2002

Attest:

JAMES E. ROGAN
*Attesting Officer*   *Director of the United States Patent and Trademark Office*